(12) United States Patent
Hasegawa et al.

(10) Patent No.: US 12,440,825 B2
(45) Date of Patent: Oct. 14, 2025

(54) METHOD FOR SYNTHESIZING SiO2Al2O3 CONTAINING SOL SOLUTION AND METHOD FOR FORMING POROUS ALUMINA FILM

(71) Applicants: Renaissance Energy Research Corporation, Kyoto (JP); NATIONAL INSTITUTE OF TECHNOLOGY, Tokyo (JP)

(72) Inventors: Akira Hasegawa, Aomori (JP); Osamu Okada, Kyoto (JP); Hiromi Nakamura, Kyoto (JP); Shizuka Ogasawara, Kyoto (JP)

(73) Assignees: Renaissance Energy Research Corporation, Kyoto (JP); National Institute Of Technology, Tokyo (JP)

( * ) Notice: Subject to any disclaimer, the term of this patent is extended or adjusted under 35 U.S.C. 154(b) by 0 days.

(21) Appl. No.: 19/221,361

(22) Filed: May 28, 2025

(65) Prior Publication Data

US 2025/0288974 A1    Sep. 18, 2025

Related U.S. Application Data

(62) Division of application No. 18/835,990, filed as application No. PCT/JP2023/010790 on Mar. 20, 2023, now Pat. No. 12,343,703.

(30) Foreign Application Priority Data

Mar. 25, 2022   (JP) .................................. 2022-050413

(51) Int. Cl.
 *B01J 21/12*   (2006.01)
 *B01J 23/02*   (2006.01)
 (Continued)

(52) U.S. Cl.
 CPC ............... *B01J 21/12* (2013.01); *B01J 23/02* (2013.01); *B01J 37/009* (2013.01);
 (Continued)

(58) Field of Classification Search
 CPC . B01J 21/12; B01J 23/02; B01J 37/009; B01J 37/0215; B01J 37/0236; B01J 37/031; B01J 37/06; B01J 37/08
 See application file for complete search history.

(56) References Cited

U.S. PATENT DOCUMENTS

| 5,731,261 A | 3/1998 | Balducci et al. |
| 2013/0105883 A1 | 5/2013 | Lee et al. |
| 2013/0324392 A1 | 12/2013 | Hasegawa et al. |

FOREIGN PATENT DOCUMENTS

| WO | 2012096386 A1 | 7/2012 |
| WO | 2021192752 A1 | 9/2021 |

OTHER PUBLICATIONS

PCT Written Opinion from PCT/JP2023/010790 (Japanese Language) dated Jun. 13, 2023, 3 pages.
(Continued)

*Primary Examiner* — James A Fiorito
(74) *Attorney, Agent, or Firm* — Andrew L. Dunlap; Haynes Beffel & Wolfeld LLP

(57) ABSTRACT

A method for synthesizing a sol solution for forming porous alumina films having high heat resistance and high specific surface area and excellent adhesion to various substrate surfaces is provided. The method can include preparing an alkoxysilane and an aluminum solution, precipitating a silicon compound adsorbed on aluminum hydroxide in a solution of the alkoxysilane and the aluminum solution, and washing the precipitate filtered from the mixed solution with water to prepare a precipitate cake. A slurry solution is prepared by adding water to the precipitate cake, a pH adjusting treatment is performed on the slurry solution, and
(Continued)

then an autoclave treatment is performed to prepare $SiO_2Al_2O_3$ containing sol solution. A pH value of the slurry solution is controlled within a specific pH range in which the solution state of the $SiO_2Al_2O_3$ containing sol solution after the autoclave treatment is a sol state.

13 Claims, 59 Drawing Sheets

(51) Int. Cl.
    *B01J 37/00* (2006.01)
    *B01J 37/02* (2006.01)
    *B01J 37/03* (2006.01)
    *B01J 37/06* (2006.01)
    *B01J 37/08* (2006.01)

(52) U.S. Cl.
    CPC ....... *B01J 37/0215* (2013.01); *B01J 37/0236* (2013.01); *B01J 37/031* (2013.01); *B01J 37/06* (2013.01); *B01J 37/08* (2013.01)

(56) References Cited

OTHER PUBLICATIONS

PCT Written Opinion from PCT/JP2023/010790 dated Jun. 13, 2023, 3 pages.

(a) Gel, (b) First half-sol, (c) Sol, (d) Precipitation

METHOD FOR SYNTHESIZING SiO2Al2O3 CONTAINING SOL SOLUTION AND METHOD FOR FORMING POROUS ALUMINA FILM

TECHNICAL FIELD

The present invention relates to a method for synthesizing $SiO_2Al_2O_3$ containing sol solution for forming silica-added porous alumina, and a method for forming a heat-resistant porous alumina film.

BACKGROUND ART

Porous alumina materials having a large specific surface area, such as γ-alumina, are useful as a catalyst carrier, on which a catalytic substance is supported, a filter, or the like. Conventionally, studies for improving the characteristics of such materials have been conducted on an ongoing basis (see, for example, Patent Documents 1 to 5, and the like).

PRIOR ART DOCUMENTS

Patent Documents

PATENT DOCUMENT 1: JP2004-203654 A
PATENT DOCUMENT 2: WO2014/051091 A1
PATENT DOCUMENT 3: WO2012/096386 A1
PATENT DOCUMENT 4: WO2013/111457 A1
PATENT DOCUMENT 5: JP2009-061383 A
PATENT DOCUMENT 6: WO2021/192752 A1

SUMMARY OF THE INVENTION

Problems to be Solved by the Invention

The catalyst carrier is required to suppress a decrease in specific surface area and a change in composition due to a hydration reaction under severe conditions such as high temperature, high pressure, and the presence of water vapor. The inventors of the present application have clarified that $Al_2O_3$ to which $SiO_2$ or Ba is added maintains a high specific surface area even when calcined at 1200° C. for several tens of hours, and that the generation of α-$Al_2O_3$ due to the transition of $Al_2O_3$ is not observed (see the above-mentioned Patent Document 6). Such a highly heat-resistant alumina powder can be molded into pellets or the like and applied to a catalyst carrier for a reaction requiring high heat resistance such as a steam reforming reaction.

However, the pressure-loss of the pelletized catalyst carrier is increased under high SV conditions. As an example in which the reaction proceeds efficiently in the catalyst surface layer under high SV conditions, there is known an automobile exhaust gas purifying catalyst or the like in which a carrier component such as alumina is wash coated on a honeycomb made of cordierite to form an alumina layer and a noble metal is supported. However, since the alumina layer obtained by the existing technology has insufficient heat resistance of the alumina itself, sintering tends to proceed under high temperature, high pressure, and water vapor atmosphere such as a steam reforming reaction, and the catalytic activity is remarkably lowered.

The present invention was made in view of the above problems, and it is an object of the present invention to provide a method for forming a high-heat-resistant and high-specific-surface-area porous alumina film having excellent adhesion to the surface of various substrate (e.g., cordierite, quartz-glass, α-$Al_2O_3$, etc.), and a method for synthesizing a sol solution that serves as an alumina precursor for producing such a porous alumina film.

Means for Solving the Problem

As a result of diligent research on the preparation conditions of a sol solution that serves as an alumina precursor and methods for forming an alumina film on various substrate surfaces, the present inventors have found a method for forming a highly functional catalyst carrier layer on the substrate surface from the perspective of adhesion, heat resistance, and specific surface area, and have reached the present invention to be hereinafter described.

As the first feature of the present invention, a method for synthesizing a sol solution according to the present invention is a method for synthesizing $SiO_2Al_2O_3$ containing sol solution for forming a porous alumina to which silica is added, the method including:

a step for preparing an alkoxysilane solution comprising an alkoxysilane, water, an alcohol, and an inorganic acid;

a step for preparing an aluminum solution comprising an aluminum compound and water, the aluminum compound being selected from among aluminum nitrate, sodium aluminate, aluminum chloride, and aluminum sulfate;

a step for precipitating a precipitate with a silicon compound adsorbed on aluminum hydroxide in a mixed solution of the alkoxysilane solution and the aluminum solution;

a step for filtering the precipitate from the mixed solution and washing the filtered precipitate with water to prepare a precipitate cake; and a step for preparing the $SiO_2Al_2O_3$ containing sol solution by preparing a slurry solution with adding water to the precipitate cake, performing a pH adjusting treatment on the slurry solution and thereafter performing an autoclave treatment on the slurry solution, wherein the pH adjusting treatment on the slurry solution controls pH value of the slurry solution within a specific pH range so that the solution state of the $SiO_2Al_2O_3$ containing sol solution after the autoclave treatment is a sol state.

According to the method for synthesizing a sol solution of the first feature, $SiO_2Al_2O_3$ containing sol solution including highly dispersed sol particles with silica bonded to boehmite particles is obtained through the autoclave treatment in the step for preparing the $SiO_2Al_2O_3$ containing sol solution. Since the solution state of the sol solution is a sol state, when the sol solution is applied to a substrate surface and dried, a gel film of a coating film having a homogeneous film property in which the sol particles are uniformly dispersed is obtained, and a high-heat-resistant and high-specific-surface-area porous alumina film with silica added, which is excellent in adhesion, can be formed to the surface of various substrate by calcining the gel film.

In a preferred implementation of the method for synthesizing a sol solution of the first feature, in the step for precipitating a precipitate, when the aluminum compound is any of the aluminum nitrate, the aluminum chloride, and the aluminum sulfate, the mixed solution is heated under reflux and then subjected to a pH adjusting treatment to co-precipitate the precipitate, when the aluminum compound is the sodium aluminate, the aluminum solution is heated under reflux and then subjected to a pH adjusting treatment, and then mixed with the alkoxysilane solution to prepare the mixed solution, and precipitates with the silicon compound adsorbed on the precipitate of the aluminum hydroxide precipitated during the pH adjusting treatment are precipitated in the mixed solution.

Furthermore, in a preferred implementation of the process for synthesizing a sol solution of the first feature, the specific pH range varies according to $SiO_2$ concentration defined as a mass concentration of $SiO_2$ with respect to $SiO_2Al_2O_3$ in the $SiO_2Al_2O_3$ containing sol solution after preparation, and is in a range of 2.8 or more and 7.8 or less when the aluminum compound is any of the aluminum nitrate, the aluminum chloride, and the aluminum sulfate, and is in a range of 1.0 or more and 6.2 or less when the aluminum compound is the sodium aluminate.

Furthermore, in a preferred implementation of the process for synthesizing a sol solution of the first feature, in the step for preparing the $SiO_2Al_2O_3$ containing sol solution,
- the treatment temperature of the autoclave treatment is controlled to a specific treatment temperature within a range of 100° C. or higher and 200° C. or lower,
- the treatment time of the autoclave treatment is controlled within a specific time range in which the solution state after the autoclave treatment is a sol state, and
- the specific time range is within a range of 1 hour or more and 100 hours or less and varies depending on the specific treatment temperature, a content of $SiO_2Al_2O_3$ in the $SiO_2Al_2O_3$ containing sol solution after preparation, and $SiO_2$ concentration defined as a mass concentration of $SiO_2$ with respect to $SiO_2Al_2O_3$ in the $SiO_2Al_2O_3$ containing sol solution after preparation.

Furthermore, as the second feature of the present invention, a method for synthesizing a sol solution according to the present invention is a method for synthesizing $SiO_2Al_2O_3$ containing sol solution for forming a porous alumina to which silica is added, the method including:
- a step for preparing an alkoxysilane solution comprising an alkoxysilane, water, an alcohol, and an inorganic acid;
- a step for preparing an aluminum solution comprising an aluminum compound and water, the aluminum compound being selected from among aluminum nitrate, sodium aluminate, aluminum chloride, and aluminum sulfate;
- a step for precipitating a precipitate of aluminum hydroxide in the aluminum solution;
- a step for filtering the precipitate from the aluminum solution, and washing the filtered precipitate with water to prepare a precipitate cake;
- a step for preparing $Al_2O_3$ containing sol solution by preparing a slurry solution with adding water to the precipitate cake, performing a pH adjusting treatment on the slurry solution, and thereafter performing an autoclave treatment on the slurry solution; and
- a step for preparing the $SiO_2Al_2O_3$ containing sol solution by adding the alkoxysilane solution to the $Al_2O_3$ containing sol solution,
- wherein the pH adjusting treatment on the slurry solution controls pH value of the slurry solution within a specific pH range so that the solution state of the $Al_2O_3$ containing sol solution after the autoclave treatment is a sol state.

According to the method for synthesizing a sol solution of the second feature, $Al_2O_3$ containing sol solution including highly dispersed boehmite sol particles is obtained through the autoclave treatment in the step for preparing the $Al_2O_3$ containing sol solution, and after the alkoxysilane solution in which the alkoxysilane obtained in the step for preparing the alkoxysilane solution is uniformly dissolved is added to the $Al_2O_3$ containing sol solution, the hydrolysis reaction proceeds with a certain temperature and time-course to produce silica particles, and $SiO_2Al_2O_3$ containing sol solution including highly dispersed sol particles with silica particles bonded to boehmite sol particles is obtained as is the case in the above-mentioned method for synthesizing a sol solution of the first feature. Since the solution state of the sol solution is a sol state, when the sol solution is applied to a substrate surface and dried, a gel film of a coating film having a homogeneous film property in which the sol particles are uniformly dispersed is obtained, and a high-heat-resistant and high-specific-surface-area porous alumina film with silica added, which is excellent in adhesion, can be formed to the surface of various substrate by calcining the gel film.

In a preferred implementation of the method for synthesizing a sol solution of the second feature, in the step for precipitating the precipitate, the aluminum solution is heated under reflux and then subjected to a pH adjusting treatment to precipitate the precipitate.

In a preferred implementation of the method for synthesizing a sol solution of the second feature, the specific pH range is in a range of 3.8 or more and 7.8 or less when the aluminum compound is any of the aluminum nitrate, the aluminum chloride, and the aluminum sulfate, and is in a range of 2.0 or more and 6.2 or less when the aluminum compound is the sodium aluminate.

In a preferred implementation of the method for synthesizing a sol solution of the second feature, in the step for preparing the $Al_2O_3$ containing sol solution,
- the treatment temperature of the autoclave treatment is controlled to a specific treatment temperature within a range of 100° C. or higher and 200° C. or lower,
- the treatment time of the autoclave treatment is controlled within a specific time range in which the solution state after the autoclave treatment is a sol state, and the specific time range is within a range of 1 hour or more and 100 hours or less and varies depending on the specific treatment temperature and a content of $Al_2O_3$ in the $Al_2O_3$ containing sol solution after preparation.

Furthermore, in a preferred implementation of the method for synthesizing a sol solution of the first or second feature, the alkoxysilane is tetraethoxysilane (TEOS).

Furthermore, as the third feature of the present invention, the method for synthesizing a sol solution according to the present invention, in addition to the first or second feature, further includes a step for preparing Ba-added $SiO_2Al_2O_3$ containing sol solution by adding a barium compound to the $SiO_2Al_2O_3$ containing sol solution prepared in the step for preparing the $SiO_2Al_2O_3$ containing sol solution.

According to the method for synthesizing a sol solution according to the third feature, the heat resistance of the porous alumina film obtained by coating, drying, and calcining the sol solution on substrate can be further improved by the addition of barium.

Furthermore, as the fourth feature of the present invention, the method for synthesizing a sol solution according to the present invention, in addition to the third feature, further includes a step for adding an organic solvent having a boiling point higher than that of water and a surface tension lower than that of water to the Ba-added $SiO_2Al_2O_3$ containing sol solution prepared in the step for preparing Ba-added $SiO_2Al_2O_3$ containing sol solution.

Furthermore, as the fifth feature of the present invention, the method for synthesizing a sol solution according to the present invention, in addition to the first or second feature, further includes a step for preparing Ba-added $SiO_2Al_2O_3$ containing sol solution by adding an organic solvent having a boiling point higher than that of water and a surface tension lower than that of water and a barium compound to the $SiO_2Al_2O_3$ containing sol solution prepared in the step for preparing the $SiO_2Al_2O_3$ containing sol solution.

According to the method for synthesizing a sol solution of the fourth or fifth feature, by the addition of barium, the heat resistance of the porous alumina film obtained by coating, drying and calcining the sol solution on substrate surface can be further improved, and by the addition of an organic solvent having a boiling point higher than that of water and a surface tension lower than that of water, the reduction in the total pore volume that occurs when drying the sol solution is suppressed, and the specific surface area of the porous alumina film can be further improved.

Furthermore, as the sixth feature of the present invention, the method for synthesizing a sol solution according to the present invention, in addition to the first or second feature, further includes a step for adding an organic solvent having a boiling point higher than that of water and a surface tension lower than that of water to the $SiO_2Al_2O_3$ containing sol solution prepared in the step for preparing the $SiO_2Al_2O_3$ containing sol solution.

According to the method for synthesizing a sol solution of the sixth feature, by the addition of an organic solvent having a boiling point higher than that of water and a surface tension lower than that of water, the reduction in the total pore volume that occurs when drying the sol solution is suppressed, and the specific surface area of the porous alumina film can be further improved . . .

In a preferred implementation of the method for synthesizing a sol solution of the third to fifth features, the barium compound is at least one selected from among barium nitrate, barium hydroxide, barium chloride, and barium acetate.

In a preferred implementation of the method for synthesizing a sol solution of the fourth to sixth features, the organic solvent is ethylene glycol or N,N-dimethylformamide.

Furthermore, a method for forming a porous alumina film according to the present invention is a method for forming a porous alumina film, the method including:
  a step of preparing $SiO_2Al_2O_3$ containing sol solution or Ba-added $SiO_2Al_2O_3$ containing sol solution which is a sol solution finally synthesized by using the method for synthesizing a sol solution according to any one of the first to sixth features;
  a step for applying the sol solution to a substrate surface;
  a step for drying a coating film of the sol solution; and
  a step for calcining the dried coating film of the sol solution.

Effect of the Invention

According to the method for synthesizing a sol solution according to the present invention, since $SiO_2Al_2O_3$ containing sol solution including highly dispersed sol particles with silica bonded to boehmite particles can be obtained, a high-heat-resistant and high-specific-surface-area porous alumina film with silica added, which is excellent in adhesion, can be formed on a surface of various substrate by applying the sol solution to the substrate surface, and drying and calcining the coating film thereof.

Figure 59:
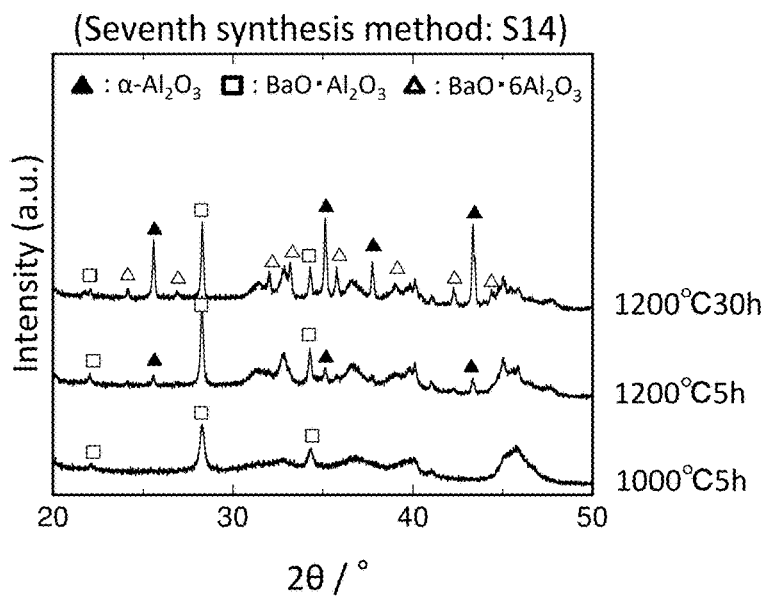

FIG. 59 is an XRD pattern diagram showing the crystal structures after the initial heat treatment, the first heat treatment, and the second heat treatment of the present powder sample S14 having $SiO_2$ concentration of 1 mass % prepared by drying and calcining Ba-added $SiO_2Al_2O_3$ containing sol solution synthesized by Example 21 of the seventh synthesis method.

DESCRIPTION OF EMBODIMENT

Preferred embodiments of the method for synthesizing $SiO_2Al_2O_3$ containing sol solution according to the present invention (hereinafter, referred to as "present synthesis method" as appropriate) and the method for forming a porous alumina film according to the present invention will be described in detail referring to the drawings.

First Embodiment

Hereinafter, the first embodiment of the present synthesis method (the first synthesis method) will be described.

[1] Basic Structure of the First Synthesis Method

Figure 1:
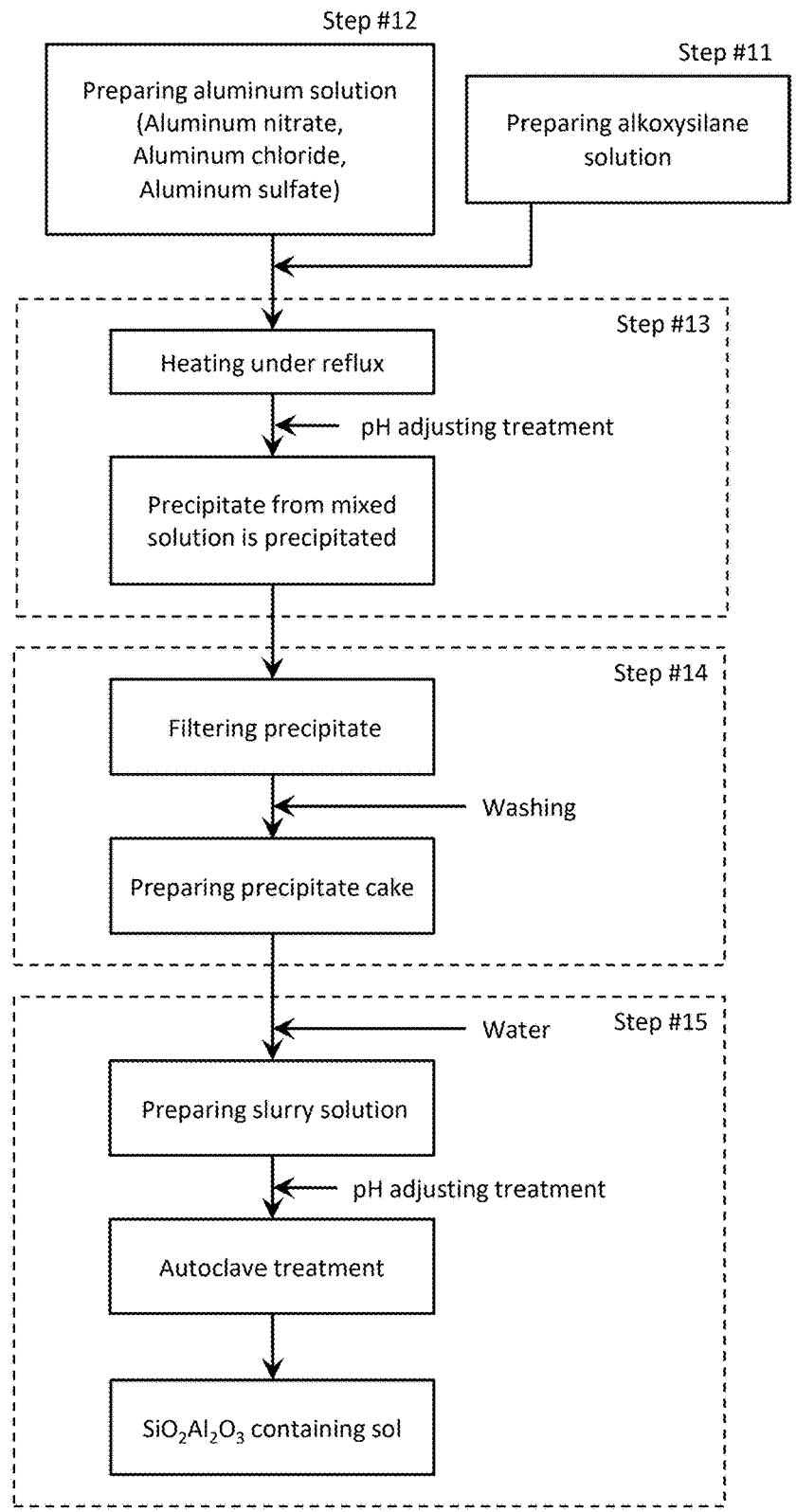
FIG. 1 is a process transition diagram showing an outline of a method for synthesizing $SiO_2Al_2O_3$ containing sol solution according to the first embodiment (the first synthesis method).

As shown in the process transition diagram of FIG. 1, the first synthesis method is roughly divided into the following Steps #11 to #15.

First, an alkoxysilane solution containing an alkoxysilane, water, an alcohol, and an inorganic acid is prepared (Step #11), and an aluminum solution containing an aluminum compound selected from among aluminum nitrate, aluminum chloride, and aluminum sulfate and water is prepared (Step #12). Note that either Step #11 or Step #12 may be performed first. Next, in the mixed solution obtained by mixing the alkoxysilane solution obtained in Step #11 and the aluminum solution obtained in Step #12, a precipitate with a silicon compound adsorbed on aluminum hydroxide is precipitated (Step #13). Subsequently, the precipitate obtained in Step #13 is filtered from the mixed solution, and the filtered precipitate is washed with water to prepare a precipitate cake (Step #14). Subsequently, water is added to the precipitate cake obtained in Step #14 to prepare a slurry solution, and after a pH adjusting treatment is performed on the slurry solution, an autoclave treatment is performed on the slurry solution to prepare $SiO_2Al_2O_3$ containing sol solution (Step #15). Through above Steps #11 to #15, the $SiO_2Al_2O_3$ containing sol solution is synthesized.

In Step #15, as will be described later, the aluminum hydroxide ($Al(OH)_3$) in the slurry solution is partially dehydrated to produce boehmite (AlOOH) under the temperature and pressure of the autoclave treatment, and $SiO_2Al_2O_3$ containing sol solution, in which sol particles with silica bonded to the boehmite particles are present in highly dispersed form, is synthesized.

Hereinafter, a synthesis method in which the $SiO_2Al_2O_3$ containing sol solution is synthesized after the autoclave treatment, as in the first synthesis method, is referred to as the first AC (autoclave) method. That is, the first synthesis method corresponds to the first AC method when the aluminum compound is selected from among aluminum nitrate, aluminum chloride, and aluminum sulfate.

In Step #11, the alkoxysilane is preferably a tetraalkoxysilane. Further, the tetraalkoxysilane is preferably selected from tetramethoxysilane, tetraethoxysilane, tetraisopropoxysilane, and tetra-n-butoxysilane, and in the examples described later, tetraethoxysilane (TEOS) is suitably used. Methanol, ethanol, n-propanol, isopropanol, and the like are used for the alcohol, and in the examples described later, ethanol is suitably used. Hydrochloric acid, nitric acid, and the like are used for the inorganic acid, and in the examples described later, hydrochloric acid is suitably used.

Depending on the charge-in quantity of the alkoxysilane in the alkoxysilane solution prepared in Step #11, the charge-in quantity of the aluminum compound in the aluminum solution prepared in Step #12, and the mixing ratio of the alkoxysilane solution and the aluminum solution mixed in Step #13, the mass concentration of $SiO_2$ relative to $SiO_2Al_2O_3$ in $SiO_2Al_2O_3$ containing sol solution prepared in Step #15 (expressed in mass %, hereinafter simply referred to as "$SiO_2$ concentration") is determined. Therefore, in order to set the $SiO_2$ concentration in the $SiO_2Al_2O_3$ containing sol solution to a desired value, the mixing ratio of both solutions is adjusted in Step #13 with respect to the respective charge-in quantities of Steps #11 and #12.

In one implementation of Step #13, the mixed solution is heated under reflux, and then ammonia water is added dropwise to the mixed solution to adjust pH, and the mixture is stirred. Hydrolysis of the mixed solutions proceeds by the heating under reflux and pH adjustment, and the aluminum hydroxide and the silicon compound are coprecipitated.

In one implementation of Step #15, the amount of water added to the precipitate cake is adjusted to control sol solution concentration (mass %), which indicates a content of $SiO_2Al_2O_3$ relative to the total mass of $SiO_2Al_2O_3$ containing sol solution after synthesis, to be equal to or less than the specific concentration so that the solution state after autoclave treatment is a sol state, and a pH adjusting treatment is performed on the slurry solution to control pH value of the slurry solution to be within a specific pH range so that the solution state after the autoclave treatment is a sol state.

In the present embodiment, in order to set the total mass of the $SiO_2Al_2O_3$ containing sol solution after synthesis to be a constant value with respect to the internal capacity of the autoclave used for the autoclave treatment, the sol solution concentration is controlled by adjusting the respective charge-in quantities of the alkoxysilane and the aluminum compound in Steps #11 and #12 and the amount of water added to the precipitate cake in Step #15.

Here, as will be described later, the specific concentration varies depending on $SiO_2$ concentration and the heating condition (treatment temperature, treatment time) of the autoclave treatment, and the specific pH range varies depending on $SiO_2$ concentration within a range of 2.8 or more and 7.8 or less.

Furthermore, as an implementation of Step #15, the treatment temperature of the autoclave treatment is set to a specific treatment temperature within a range of 100° C. or higher and 200° C. or lower, and the treatment time of the autoclave treatment is set within a specific time range in which the solution state after the autoclave treatment corresponding to the specific treatment temperature is a sol state. However, the specific time range is within a range of 1 hour or more and 100 hours or less.

[2] Examples of the First Synthesis Method

Hereinafter, examples of Steps #11 to #15 for synthesizing $SiO_2Al_2O_3$ containing sol solution having $SiO_2$ concentration of 1 mass % will be described. In the following explanation, for convenience of explanation, $SiO_2Al_2O_3$ with $SiO_2$ concentration of X mass % is expressed as X % $SiO_2Al_2O_3$.

Hereinafter, as the aluminum compound, Example 1 using aluminum nitrate, Example 2 using aluminum chloride, and Example 3 using aluminum sulfate will be described in order.

[2.1] Example 1 (Aluminum Compound: Aluminum Nitrate)

In Step #11, tetraethoxysilane (TEOS) is used as the alkoxysilane, ethanol is used as the alcohol, and hydrochloric acid is used as the inorganic acid. Specifically, 7.52 g of ethanol was added to 5.00 g of TEOS, and the mixture was stirred at room temperature for 5 minutes, then 1.25 g of concentrated hydrochloric acid (37%) was added, and the mixture was further stirred at room temperature for 5 minutes. While the mixed solution was stirred, 71.2 g of water was added dropwise and mixed to obtain a clear and uniform 5.88% TEOS solution (alkoxysilane solution).

In Step #12, aluminum nitrate was used as the aluminum compound, and 14.57 g of aluminum nitrate nonahydrate was dissolved in 57.10 g of water to obtain an aluminum nitrate aqueous solution (aluminum solution).

In Step #13, 1.18 g of 5.88% TEOS solution obtained in Step #11 was added to the aluminum nitrate aqueous solution obtained in Step #12, and the obtained homogeneous mixed solution was heated under reflux at 100° C., and 28% ammonia water was added dropwise until pH9.0 was obtained, and the mixture was stirred. Aluminum hydroxide and silicon compounds were co-precipitated along with the dropping of ammonia water, and a precipitate was formed in the mixed solution.

Subsequently, in Step #14, the mixed solution containing the precipitate was filtered by suction filtration using a No. 1 filter paper, and the precipitate was filtered off. The filtered precipitate was washed with ion-exchange water at room temperature to obtain a precipitate cake.

Subsequently, in Step #15, water was added to the obtained precipitate cake so that the total amount was 80 g, and the mixture was stirred to prepare a slurry solution. Nitric acid (60% aqueous solution) was added to the slurry solution until pH5.0 was obtained, and the autoclave treatment was performed at 150° C. for 15 hours to obtain 1% $SiO_2Al_2O_3$ containing sol solution. For the autoclave treatment, an autoclave composed of a Teflon® container with an internal capacity 100 ml enclosed in a stainless-steel jacket was used.

The total amount of 1% $SiO_2Al_2O_3$ containing sol solution obtained in Step #15 is 80 g, and the amount of 1% $SiO_2Al_2O_3$ powder obtained by drying this sol solution is 2.0 g. The sol solution concentration of a total amount 80 g of the sol solution containing 2.0 g of 1% $SiO_2Al_2O_3$ powder is 2.5 mass %. Since the additive amount of nitric acid (60% aqueous solution) used for the pH adjustment on the slurry solution is as small as about 400 to 600 μL, the total amount of 1% $SiO_2Al_2O_3$ containing sol solution is approximately the same 80 g as the total amount of the slurry solution. The internal capacity and structure of the autoclave used in the autoclave treatment of the present synthesis method are not limited to the internal capacity and structure of the autoclave used in Example 1, and for example, an autoclave having an internal capacity corresponding to the total amount of $SiO_2Al_2O_3$ containing sol solution to be synthesized may be used.

Hereinafter, for convenience of explanation, $SiO_2Al_2O_3$ containing sol solution having $SiO_2$ concentration of X mass % and sol solution concentration of Y mass % is referred to as X % $SiO_2Al_2O_3$Y % sol. Thus, 1% $SiO_2Al_2O_3$ containing sol solution obtained in Step #15 is expressed as 1% $SiO_2Al_2O_3$2.5% sol.

[2.2] Example 2 (Aluminum Compound: Aluminum Chloride)

In Example 2, 1% $SiO_2Al_2O_3$ containing sol solution could be synthesized under the same conditions as in Example 1, except that in Step #12, 9.38 g of aluminum chloride (III) hexahydrate was dissolved in 83.24 g of water to obtain an aluminum chloride aqueous solution (aluminum solution). That is, also in Example 2, as in Example 1, a total amount 80 g of 1% $SiO_2Al_2O_3$2.5% sol was obtained. Therefore, descriptions that overlap with Example 1 will be omitted. In Example 1, the concentration of the aluminum nitrate aqueous solution was prepared at about 20 mass % (including crystalline water), whereas in Example 2, since 20 mass % is too small as the amount of water relative to the precipitate amount and stirring cannot be performed sufficiently, the concentration of the aluminum chloride aqueous solution was prepared at a low concentration of about 10 mass % (including crystalline water).

[2.3] Example 3 (Aluminum Compound: Aluminum Sulfate)

In Example 3, similar to Examples 1 and 2, in order to synthesize a total amount 80 g of 1% $SiO_2Al_2O_3$2.5% sol, 6.64 g of aluminum sulfate (anhydrous) needs to be dissolved in 58.58 g of water to obtain an aluminum sulfate aqueous solution (aluminum solution) in Step #12. However, in Step #15, even if pH value of the slurry solution was controlled within the same specific pH range as when the aluminum compound was aluminum nitrate, when the sol solution concentration exceeded 0.63 mass % under the same heating conditions (150° C. for 15 hours) of the autoclave treatment as in Example 1, the solution state became a state in which unpeptized precipitate was mixed in the sol (second half-sol described later). Therefore, the respective charge-in quantities of the alkoxysilane and the aluminum compound in Steps #11 and #12 and the amount of water to be added to the precipitate cake in Step #15 were adjusted to control the sol solution concentration of the total amount 80 g to 0.63 mass % or less, and thereby 1% $SiO_2Al_2O_3$ containing sol solution could be synthesized. Except for the above, the conditions are the same as those of Example 1, and therefore, descriptions that overlap with Example 1 will be omitted. In Example 1, the concentration of the aluminum nitrate aqueous solution was prepared at about 20 mass % (including crystalline water), whereas in Example 3, since 20 mass % is too small as the amount of water relative to the precipitate amount and stirring cannot be performed sufficiently, the concentration of the aluminum sulfate aqueous solution was prepared at a low concentration of about 10 mass %.

Even if the concentration of the sol solution concentration exceeds 0.63 mass %, there is a possibility that the solution state becomes a sol state from the second half-sol by adjusting the heating conditions in the autoclave treatment and increasing the heating amount, as will be described later.

[3] Examination for Conditions of Autoclave Treatment in the First Synthesis Method The solution state after the autoclave treatment of Step #15 may be any of six states of sol, first half-sol, second half-sol, gel, precipitation, and cloudy sol depending on $SiO_2$ concentration and sol solution concentration of $SiO_2Al_2O_3$ containing sol solution after synthesis, pH value of the slurry solution, and heating conditions of the autoclave treatment (treatment temperature, treatment time). Hereinafter, the $SiO_2$ concentration and sol solution concentration of $SiO_2Al_2O_3$ containing sol solution after synthesis, the pH value of the slurry solution, and the heating conditions of the autoclave treatment (treatment temperature, treatment time) are collectively referred to as autoclave treatment conditions.

In the following examination results, which of the five solution states of the sol, the first half-sol, the second half-sol, the gel, and the precipitation is determined according to $SiO_2$ concentration and pH value of the slurry solution under the sol solution concentration and the heating condition in which the solution state can be a sol. In addition, which of the four solution states of the sol, the second half-sol, the cloudy sol, and the gel is determined according to the sol solution concentration and the heating conditions under the combination of $SiO_2$ concentration and pH value of the slurry solution in which the solution state can be a sol.

The sol is a slightly whitened, transparent solution that indicates a solution state in which light-scattering due to the Tyndall phenomena is confirmed by laser light irradiation. The "transparency" of the sol has a degree of transparency such that when the sol solution is accommodated in a water-white glass container having an inner diameter of 8 cm, characters and figures on the side surface of the glass container can be visually confirmed through the sol solution from the other side. The gel is in a state in which the viscosity becomes higher than that of the sol. The precipitation indicates a state in which the white precipitate and the solution separate when left to stand, and the white precipitate is opaque. The first half-sol indicates a state in which a part of the sol solution is gelled in an intermediate state in a process from the sol to the gel, and the gelled part is transparent. The second half-sol is opaque with the precipitate not sufficiently peptized and some precipitates remaining in the solution.

Figure 2:
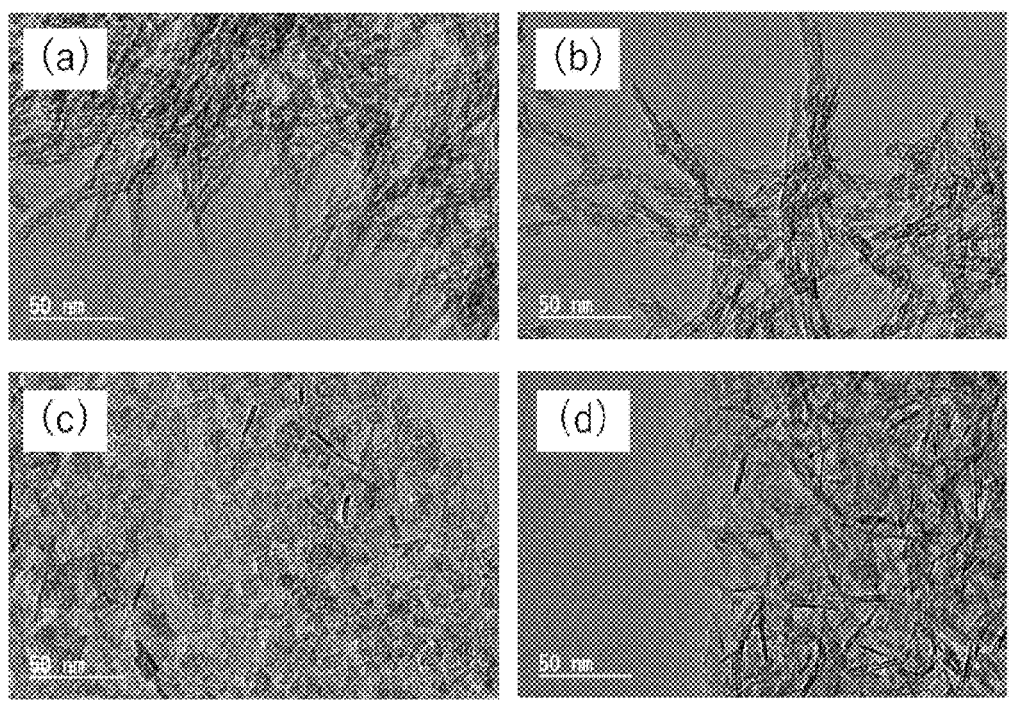
FIG. 2 is TEM photographs of four types of $SiO_2Al_2O_3$ containing sol solutions whose solution states are sol, gel, first half-sol, and precipitate.

In Step #15 of Example 1 with $SiO_2$ concentration of 1 mass %, four types of $SiO_2Al_2O_3$ containing sol solutions in which the solution states were the sol, the gel, the first half-sol, and the precipitation were prepared by changing pH value of the slurry solution, and TEM (transmission electron microscope) observations were performed on these four types of sol solutions. A field emission type JEM-2100 manufactured by JEOL Ltd. was used as the transmission electron microscope. FIG. 2 shows a TEM photograph. The respective solutions were diluted with ethanol and observed on Cu meshes. The gel in the photograph (a) was in a state where needle-like particles with a width of 5 nm and a length of 50 to 100 nm aggregated. In the first half-sol in the photograph (b), needle-like particles similar to those of the gel were observed. However, in the sol in the photograph (c), thin plate-like particles with one side of 10 to 15 nm were observed. In addition, in the precipitation in the photograph (d), needle-like particles with a width of 2 to 3 nm and a length of 20 to 30 nm and thin plate-like particles with one side 10 to 15 nm were observed. As shown in FIG. 2, it was found that the particle morphology greatly differs depending on the solution state, and in particular, the sol exhibits a structure clearly different from that of the gel having high viscosity and the precipitation.

The second half-sol indicates a state in which the precipitate of boehmite with silica adsorbed (boehmite without silica adsorbed when $SiO_2$ concentration is 0 mass %) is not completely peptized and partially remains due to insufficient heating during the autoclave treatment. The cloudy sol indicates a state in which the sol becomes cloudy due to excessive heating during the autoclave treatment, resulting in precipitation formation due to growth of sol particles and gel formation due to boehmite polymerization. In this embodiment, the cloudy sol is distinguished as a solution state different from the first half-sol, the second half-sol, the gel, and the precipitation.

It is possible that a porous alumina film having a certain degree of heat resistance and a specific surface area can be formed even if the solution state after the autoclave treatment is any of five states other than the sol. However, in order to form a homogeneous porous alumina film having excellent adhesion to various substrate surfaces, as will be described later, it is most preferable that the solution state is the sol. Therefore, in the following, conditions for the autoclave treatment by which the solution state after the autoclave treatment becomes the sol will be examined.

[3.1] $SiO_2$ Concentration Dependence in the Specific pH Range

The relationship between a range of pH value of the slurry solution (specific pH range) in which the solution state after the autoclave treatment is the sol and $SiO_2$ concentration was examined in the following manner.

Multiple sets of samples (total amount 80 g of slurry solutions) were prepared in which $SiO_2$ concentration was changed in a range of 0 mass % to 10 mass % and pH value after the pH adjusting treatment on the slurry solution of Step #15 was changed in a range of 1.01 to 10.68, and the solution states after the autoclave treatment were visually confirmed. In each sample, the sol solution concentration was set to the same 2.5 mass % as in Example 1, as the heating conditions of the autoclave treatment, the same 150° C. for 15 hours as in Example 1 was used, and as the aluminum compound, the same aluminum nitrate as in Example 1 was used.

Figure 3:
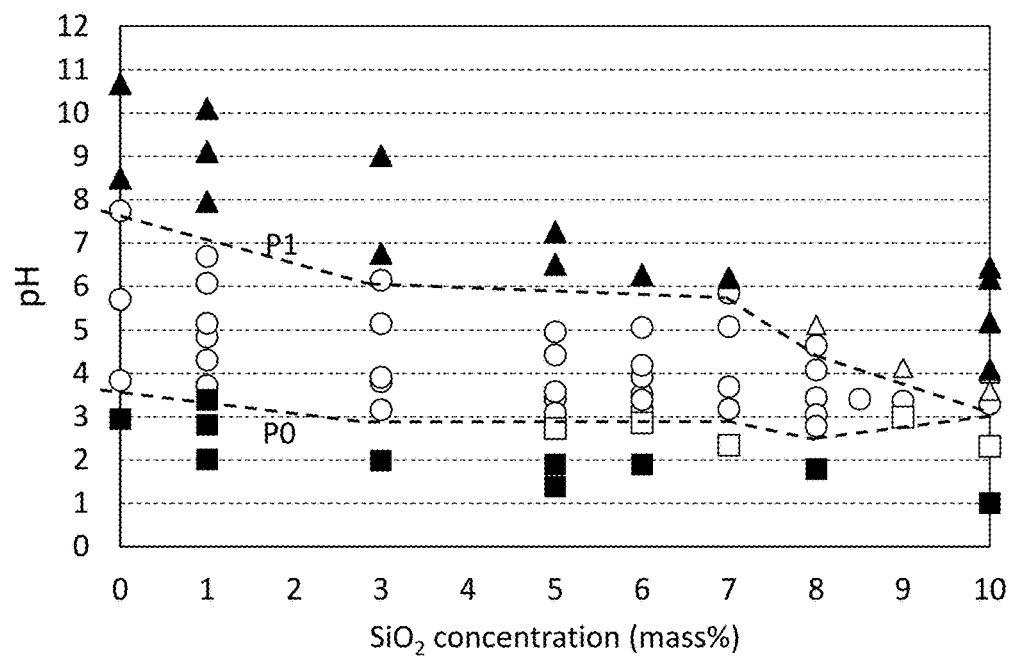
FIG. 3 is a scatter plot showing the relationship between the solution state, pH value of the slurry solution, and $SiO_2$ concentration of $SiO_2Al_2O_3$ containing sol solutions synthesized by the first synthesis method.

The results of checking the solution states are shown as a scatter plot in FIG. 3. The vertical axis of the scatter plot indicates pH value of the slurry solution, and the horizontal axis indicates $SiO_2$ concentration. In the drawing, the sol is indicated by open circles ○, the gel is indicated by solid squares, the precipitate is indicated by solid triangles ▲, the first half-sol is indicated by open squares, and the second half-sol is indicated by open triangles ▵.

It can be seen from FIG. 3 that the specific pH range (from the lower limit to the upper limit) falls within the range of 2.8 to 7.8, where $SiO_2$ concentration is in the range of 0 to 10 mass %, and the width of the specific pH range (the difference between the upper limit and the lower limit) decreases with increasing $SiO_2$ concentration. It can also be seen that at the same $SiO_2$ concentration, gelation occurs when pH value is less than the specific pH range, and precipitation occurs when pH value is greater than the specific pH range.

In the case of a sol solution without silica added ($SiO_2$ concentration of 0 mass %), the solution state remains in a sol state when pH value is within the specific pH range (3.84 to 7.74). However, since a transparent gel is formed in the region where pH value is less than pH3.84, it is considered that the acid catalyst promoted polymerization of the sol and led to gelation. In this sense, even in the region below pH3.84, if the heating conditions of the autoclave treatment are relaxed (shorter treatment time and/or lower treatment temperature) and gelation is suppressed, it is possible to convert the solution state into the sol. Therefore, in the case of silica-added $SiO_2Al_2O_3$ containing sol solution, the specific pH range shown in FIG. 3 may be extended toward the lower side by relaxing the heating conditions.

Since the isoelectric point of silica sol is pH1 to pH1.5, near neutrality of the region where boehmite sol exists, silica will be dispersed in the liquid with its surface negatively charged. Near neutrality, boehmite is positively charged and silica is considered to be electrostatically bound to boehmite. Therefore, the reason why the upper limit of the specific pH range decreases as the $SiO_2$ concentration increases in FIG. 3 is considered to be due to the influence of the silica sol. Considering that precipitation occurs when the potential on the particle surface becomes zero and the particles agglomerate, when silica and boehmite, which have significantly different isoelectric points, are mixed, the silica adsorbs to the boehmite near neutrality, so that it is considered that the apparent isoelectric point is lowered, and the upper limit of the specific pH range is lowered.

In FIG. 3, assuming that $SiO_2$ concentration is X (mass %), the lower limit of the specific pH range is P0, and the upper limit thereof is P1, P0 and P1 are given by the following calculation formulas as approximate values. The approximate values of P0 and P1 are illustrated by polygonal dashed lines in FIG. 3, respectively, for reference.

When $0 < X \leq 3$, $$P0 = -0.68 \times X/3 + 3.84$$

$$P1 = -1.6 \times X/3 + 7.74$$

When $3 < X \leq 7$, $$P0 = 3.16$$

$$P1 = -0.075 \times (X - 3) + 6.14$$

When $7 < X \leq 8$, $$P0 = -0.38 \times (X - 7) + 3.16$$

$$P1 = -1.2 \times (X - 7) + 5.84$$

When $8 < X \leq 10$, $$P0 = 0.255 \times (X - 8) + 2.78$$

$$P1 = -0.675 \times (X - 8) + 4.64$$

As described above, in one implementation of the pH adjusting treatment on the slurry solution in Step #15, the pH adjusting treatment can be performed so that pH value of the slurry solution is within the specific pH range determined by P0 and P1 which are given by the above calculation formulas when $SiO_2$ concentration is X (mass %).

[3.2] $SiO_2$ Concentration Dependence of the Specific Concentration

The relationship between $SiO_2$ concentration and the upper limit of the sol solution concentration (specific concentration) in which the solution state after the autoclave treatment is the sol under the predetermined heating conditions (treatment temperature, treatment time) of the autoclave treatment was examined in the following manner.

Multiple sets of samples (total amount 80 g of slurry solutions) were prepared in which $SiO_2$ concentration was varied within a range of 0 mass % to 10 mass % and the sol solution concentration (mass %) was varied, and the solution states after the autoclave treatment were visually confirmed. In each sample, pH value of the slurry solution was set to the same pH5.0 as in Example 1 when $SiO_2$ concentration is within a range of 0 mass % to 7 mass %, and was set to pH value within the specific pH range in which the solution state is the sol in FIG. 3 when $SiO_2$ concentration is within a range of 8 mass % to 10 mass %. In addition, as the heating conditions of the autoclave treatment, the same 150° C. for 15 hours as in Example 1 was used, and the same aluminum nitrate as in Example 1 was used as the aluminum compound.

Figure 4:
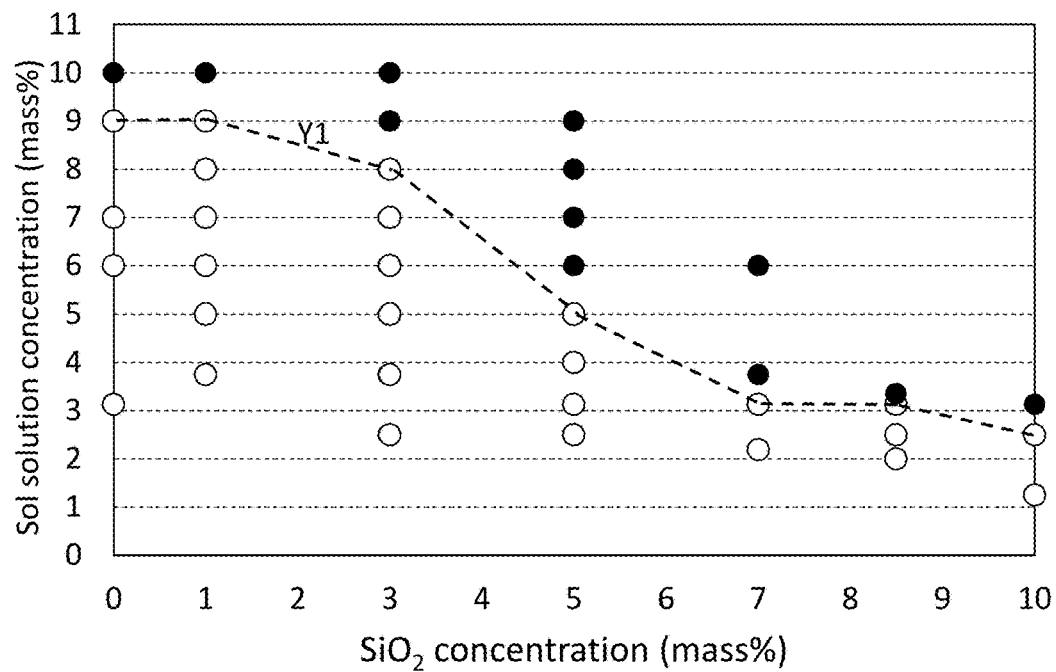
FIG. 4 is a scatter plot showing the relationship between solution state, sol solution concentration, and $SiO_2$ concentration of $SiO_2Al_2O_3$ containing sol solutions synthesized by the first synthesis method.

The results of checking the solution states are shown as a scatter plot in FIG. 4. The vertical axis of the scatter plot indicates the sol solution concentration (mass %), and the horizontal axis indicates $SiO_2$ concentration. In the drawing, the sol is indicated by open circles ○, and the second half-sol is indicated by solid circles ●.

It can be seen from FIG. 4 that, regardless of $SiO_2$ concentration, when the sol solution concentration is higher than the specific concentration, unpeptized precipitate remains in the sol. It can also be seen from FIG. 4 that under the heating condition of 150° C. for 15 hours, the specific concentration falls within a range of 2.5 mass % or more and 9.0 mass % or less in the range of 0 to 10 mass % of $SiO_2$ concentration and decreases with increasing $SiO_2$ concentration. This is considered to be because $SiO_2$ is present in adsorbed form on the precipitate of aluminum hydroxide. That is, when $SiO_2$ concentration is increased, $SiO_2$ which is not peptized by the autoclave treatment is increased, and since the aluminum hydroxide is hardly peptized by the adsorption of $SiO_2$ on the precipitated surface of the aluminum hydroxide, the specific concentration decreases with the increase in $SiO_2$ concentration in FIG. 4.

As will be described later, even when the sol solution concentration becomes higher than the specific concentration at a certain $SiO_2$ concentration and the solution state becomes the second half-sol, if the heating condition of the autoclave treatment is appropriately adjusted so that the heating amount is increased, the solution state may become the sol state.

In FIG. 4, where $SiO_2$ concentration is X (mass %) and the specific concentration is Y1, Y1 is given by the following calculation formulas as an approximate value. The approximate value of Y1 is shown in a polygonal dashed line in FIG. 4 for reference.

When $0 < X \leq 1$, $Y1 = 9$

When $1 < X \leq 3$, $Y1 = -0.5 \times (X - 1) + 9$

When $3 < X \leq 5$, $Y1 = -1.5 \times (X - 3) + 8$

When $5 < X \leq 7$, $Y1 = -0.935 \times (X - 5) + 5$

When $7 < X \leq 8.5$, $Y1 = 3.13$

When $8.5 < X \leq 10$, $Y1 = -0.42 \times (X - 8.5) + 3.13$

As described above, when the heating condition of the autoclave treatment is 150° C. for 15 hours, in one implementation in controlling the sol solution concentration of Step #15 to the specific concentration or less, when $SiO_2$ concentration is X (mass %), the respective charge-in quantities of the alkoxysilane and the aluminum compound in Steps #11 and #12 and the amount of water to be added to the precipitate cake in Step #15 can be adjusted so that the sol solution concentration is equal to or less than the specific concentration Y1 given by the above calculation formula. It should be noted that, as described in Example 3, when the same 150° C. for 15 hours of the heating condition is used and aluminum sulfate is used as the aluminum compound, the specific concentration Y1 is 0.63 mass % or less.

[3.3] Heating Conditions for Autoclave Treatment (1)

For each of the three treatment temperatures (100° C., 150° C., 200° C.), the treatment time was changed in three or five ways within a range of 1 to 100 hours, and a total of 13 samples (Samples 1 to 13, slurry solution) were subjected to the autoclave treatment under different heating conditions, and the solution states after the autoclave treatment were visually confirmed. The respective samples were for 1% $SiO_2Al_2O_3$3.75% sol having $SiO_2$ concentration of 1 mass % and sol solution concentration of 3.75 mass %, and pH value of the slurry solution was adjusted to about pH5.0 using nitric acid in Step #15. As the aluminum compound, the same aluminum nitrate as in Example 1 was used.

The results of checking the solution state are shown in Table 1 below and as a scatter plot in FIG. 5. The vertical axis of the scatter plot indicates the treatment time, and the horizontal axis indicates the treatment temperature. In the drawing, the sol is indicated by open circles ○, the second half-sol is indicated by solid circles ●, and the cloudy sol is indicated by x marks.

TABLE 1

| Sample | pH value | Treatment temperature (° C.) | Treatment time (h) | Solution state |
|---|---|---|---|---|
| 1 | 5.26 | 100 | 2 | Second half-sol |
| 2 | 4.73 | | 24 | Sol |
| 3 | 4.95 | | 48 | Sol |
| 4 | 4.95 | | 72 | sol |
| 5 | 5.07 | | 100 | Sol |
| 6 | 4.80 | 150 | 2 | Second half-sol |
| 7 | 4.92 | | 15 | Sol |
| 8 | 5.12 | | 48 | Sol |
| 9 | 5.05 | | 72 | Cloudy sol |
| 10 | 4.73 | | 100 | Cloudy sol |
| 11 | 5.01 | 200 | 1 | Sol |
| 12 | 5.03 | | 5 | Cloudy sol |
| 13 | 5.04 | | 15 | Cloudy sol |

Figure 5:
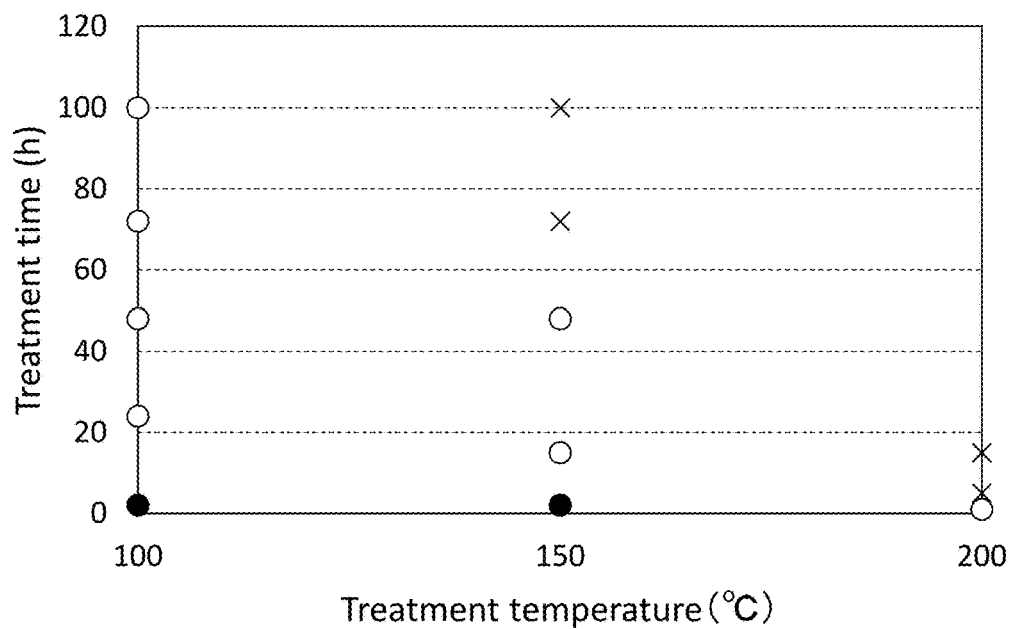
FIG. 5 is a scatter plot showing the relationship between the solution state and the heating condition (treatment temperature, treatment time) of the autoclave treatment of $SiO_2Al_2O_3$ containing sol solutions synthesized by the first synthesis method.

As shown in Table 1 and FIG. 5, each isolated for 1 hour at a treatment temperature of 200° C., for 15 to 48 hours at a treatment temperature of 150° C., and for 24 to 100 hours at a treatment temperature of 100° C. From the above results, it can be seen that when the heating amount is increased by increasing at least one of the treatment temperature and the treatment time, the solution state transitions from the sol to the cloudy sol, and when the heating amount is decreased by decreasing at least one of the treatment temperature and the treatment time, the solution state transitions from the sol to the second half-sol. Therefore, in the case that the treatment temperature of 150° C. and the treatment time of 15 to 48 hours were set up as the heating conditions in which the solution state is the sol, for example, when the treatment temperature is increased from 150° C. with maintaining the solution state at the sol, it turns out that the treatment time may be shorter than 15 to 48 hours in order to inhibit increasing of the heating amount, conversely, when the treatment temperature is decreased from 150° C., it turns out that the treatment time may be longer than 15 to 48 hours in order to inhibit decreasing of the heating amount, and furthermore, when the treatment time is increased from 15 to 48 hours, it turns out that the treatment temperature may be decreased from 150° C. in order to inhibit increasing of the heating amount, conversely, when the treatment time is decreased from 15 to 48 hours, it turns out that the treatment temperature may be increased from 150° C. in order to inhibit decreasing of the heating amount.

[3.4] Heating Conditions for Autoclave Treatment (2)

From Table 1 above, when the sol solution concentration becomes higher than the specific concentration under a certain heating condition and the solution state becomes the second half-sol, it is predicted that the solution state may become the sol by increasing the heating amount by increasing at least one of the treatment temperature and the treatment time with such sol solution concentration. To confirm this, by changing the treatment time in three or five ways within a range of 2 to 100 hours at the treatment temperature 150° C. of the autoclave treatment for three types of slurry solutions with differing $SiO_2$ concentrations and sol solution concentrations, a total of 13 samples (Samples 14 to 26, slurry solution) were subjected to the autoclave treatment, and the solution states after the autoclave treatment were visually confirmed. The breakdown of the 13 samples is as follows. Samples 14 to 18 are for 1% $SiO_2Al_2O_3$3.75% sol having $SiO_2$ concentration of 1 mass % and sol solution concentration of 3.75 mass %, Samples 19 to 21 are for 1% $SiO_2Al_2O_3$10% sol having $SiO_2$ concentration of 1 mass % and sol solution concentration of 10 mass %, and Samples 22 to 26 are for 7% $SiO_2Al_2O_3$6% sol having $SiO_2$ concentration of 7 mass % and sol solution concentration of 6 mass %. The respective samples were prepared using aluminum nitrate as the aluminum compound as in Example 1, and pH value of the slurry was adjusted to about pH5.0 using nitric acid in Step #15.

Figure 6:
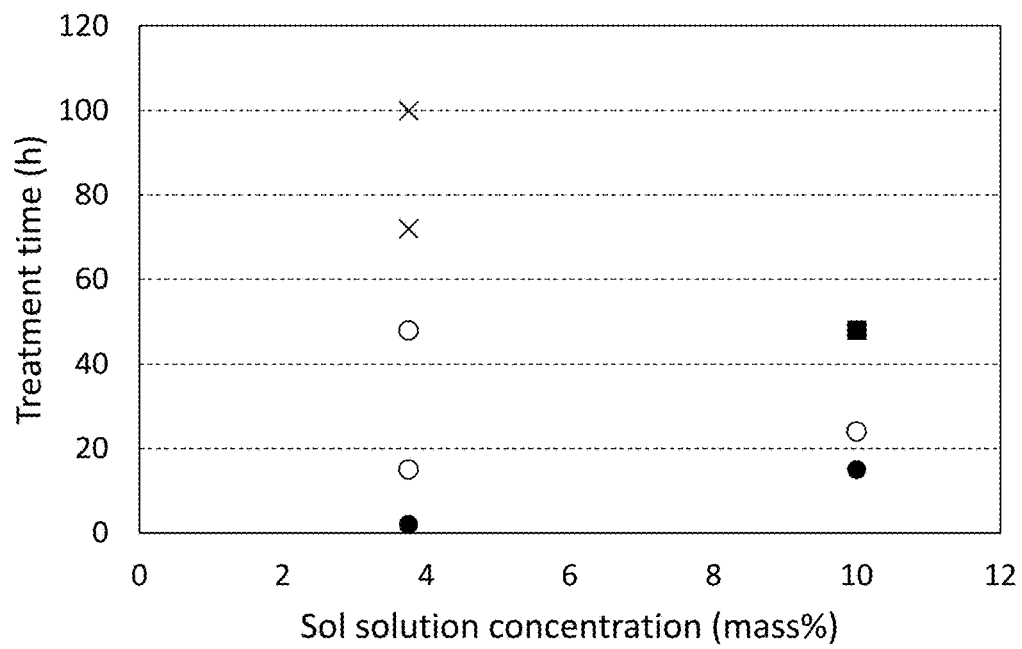
FIG. 6 is a scatter plot showing the relationship between solution state, sol solution concentration, and treatment time of the autoclave treatment of $SiO_2Al_2O_3$ containing sol solutions synthesized by the first synthesis method.

The scatter plot in FIG. 6 shows the solution states of Samples 14 to 21 after the autoclave treatment. Table 2 below shows the solution states of Samples 22 to 26 after the autoclave treatment. The vertical axis of the scatter plot indicates the treatment time, and the horizontal axis indicates the sol solution concentration. In the drawing, the sol is indicated by open circles ○, the second half-sol is indicated by solid circles ●, the cloudy sol is indicated by x marks, and the gel is indicated by solid squares ■.

TABLE 2

| Sample | pH value | Treatment temperature (° C.) | Treatment time (h) | Solution state |
|---|---|---|---|---|
| 22 | 5.39 | 150 | 15 | Second half-sol |
| 23 | 5.10 | | 24 | Second half-sol |
| 24 | 5.10 | | 48 | Gel |
| 25 | 4.98 | | 72 | Gel |
| 26 | 5.20 | | 100 | Gel |

As shown in FIG. 6, the solution states after the autoclave treatment at 150° C. of Samples 14 to 18 having sol solution concentration of 3.75 mass % were the second half-sol at the treatment time of 2 hours but became the sol at the treatment times of 15 hours and 48 hours, and further became the cloudy sol at the treatment times of 72 hours and 100 hours. On the other hand, the solution state after the autoclave treatment at 150° C. of Samples 19 to 21 having sol solution concentration of 10 mass % were the second half-sol at the treatment time of 15 hours but became the sol at the treatment time of 24 hours, and further became the gel at the treatment time of 48 hours. In 1% $SiO_2Al_2O_3$10% sols of Samples 19 to 21, it was found that by applying the autoclave treatment for a long time, peptization progressed and the solution state became the sol, and if the treatment time was further extended, the solution state transitioned to the gel. When the sol solution concentration is 10 mass %, the range of the treatment time in which the sol state can be maintained is narrower than when the sol solution concentration of 3.75 mass %, and it is necessary to appropriately control the treatment time.

As shown in Table 2, in Samples 22 to 26 having $SiO_2$ concentration of 7 mass % and sol solution concentration of 6 mass %, the solution state after the autoclave treatment at 150° C. was the second half-sol at the treatment times of 15 and 24 hours, but did not become the sol at the treatment times of 48 to 100 hours. When both $SiO_2$ concentration and sol solution concentration are high, it is considered that, as the treatment time elapses, the solution state proceeds from the second half-sol without passing through the sol state, and polymerization immediately progresses to gelation, or, as in Samples 19 to 21 shown in FIG. 6, the treatment time that can result in the sol state remains within a narrow range of more than 24 hours and less than 48 hours.

As described above, it can be seen from the results of the solution states shown in FIGS. 4 to 6, Table 1, and Table 2 that as at least one of $SiO_2$ concentration and sol solution concentration decreases or increases, the ranges of the treatment time and the treatment temperature in which the solution state can become the sol state increase or decrease, and when both $SiO_2$ concentration and sol solution concentration increase, the ranges of the treatment time and the treatment temperature in which the solution state can become the sol state disappears. Therefore, when $SiO_2$ concentration and sol solution concentration have an upper limit of about 10 mass %, respectively, and one is set to be higher, the other must be set to be lower so that the solution state can be the sol state. However, when viewed as a whole, it can be said that there is extremely high degree of flexibility in combinations of $SiO_2$ concentration, sol solution concentration, the treatment time and the treatment temperature of the autoclave treatment in which the solution state can become the sol state.

[3.5] Conditions of Autoclave Treatment for 1% $SiO_2Al_2O_3$ Containing Sol Solution From the above results, one example of the conditions of the autoclave treatment for synthesizing 1% $SiO_2Al_2O_3$ containing sol solution by the first synthesis method is as follows.

pH value of the slurry solution: pH4 to pH7
Sol solution concentration: 9 mass % or less
Heating conditions: 150° C. for 15 hours Incidentally, as described above, when $SiO_2$ concentration of $SiO_2Al_2O_3$ containing sol solution is increased to more than 1 mass %, pH value and sol solution concentration of the slurry solution can be adjusted accordingly in the manner described above. The heating conditions are not limited to 150° C. for 15 hours described above, and the treatment temperature and the treatment time may be changed so as to suppress an increase/decrease in the heating amount, as described above.

[4] Evaluation of Heat Resistance of the First Synthesis Method (1)

The heat resistance of $SiO_2Al_2O_3$ powder obtained by drying and calcining $SiO_2Al_2O_3$ containing sol solution synthesized by the first synthesis method (hereinafter, collectively referred to as "present powder sample S1") was evaluated. In order to evaluate the effect on the heat resistance of the process of making the precipitate cake into a sol by the autoclave treatment in Step #15 of the first synthesis method, the heat resistance of $SiO_2Al_2O_3$ powder obtained by directly drying and calcinating the precipitate cake prepared through Steps #11 to #14 without making it into a sol (hereinafter collectively referred to as "comparative example C1") was evaluated, and the heat resistances of the present powder sample S1 and the comparative example C1 were compared.

Incidentally, the method for synthesizing $SiO_2Al_2O_3$ powder of the comparative example C1 corresponds to the case of synthesizing the silica-added porous alumina without adding barium oxide in the precipitation method (refer to FIG. 16 of Patent Document 6) which is one of the methods for synthesizing the silica-added porous alumina with barium oxide disclosed in Patent Document 6. Hereinafter, the methods for synthesizing the comparative example C1 and the comparative examples C2 and C7 to be described later will be referred to as "precipitation method" as appropriate, regardless of whether barium oxide is added or not.

In evaluating the heat resistance, since the comparative example C1 is a powder sample, further, in order to easily examine the change in the heat resistance due to the difference in $SiO_2$ concentration, the powder sample was used instead of the coating film.

The steps until the precipitate cake is produced in the method for synthesizing the silica-added porous alumina of the comparative example C1 is the same as Steps #11 to #14 of the first synthesis method. In the comparative example C1, the obtained precipitate cake was dried at 150° C., then pulverized into a powder, and then subjected to calcination at 1000° C. for 5 hours (initial heat treatment) in the air to prepare $SiO_2Al_2O_3$ powder (comparative sample C1A). Furthermore, comparative sample C1B obtained by adding the first heat treatment at 1200° C. for 5 hours to the comparative sample C1A, and comparative sample C1C obtained by adding the second heat treatment at 1200° C. for 30 hours to the comparative sample C1A were prepared as needed. The comparative sample C1A is the comparative example C1 on which only the initial heat treatment is performed and neither the first heat treatment nor the second heat treatment is performed. In the first heat treatment, the temperature was raised from room temperature to 1200° C. at a rate of 10° C./min, and then held at 1200° C. for 5 hours. In the second heat treatment, the temperature was raised from room temperature to 1200° C. at a rate of 10° C./min, and then held at 1200° C. for 30 hours.

On the other hand, as the present powder sample S1, following Steps #11 to #14 of the first synthesis method, $SiO_2Al_2O_3$ containing sol solution obtained through Step #15 was dried at 150° C., subsequently pulverized into a powder, and the powder was calcined in the air at 1000° C. for 5 hours (initial heat treatment), so that $SiO_2Al_2O_3$ powder (present sample S1A) was prepared. In addition, a present sample S1B obtained by adding the first heat treatment at 1200° C. for 5 hours to the present sample S1A, and a present sample S1C obtained by adding the second heat treatment at 1200° C. for 30 hours to the present sample S1A were prepared as needed. The present sample S1A is the present powder sample S1 on which only the initial heat treatment is performed and neither the first heat treatment nor the second heat treatment is performed.

In the preparation of the present samples S1A to S1C and the comparative samples C1A to C1C, aluminum nitrate was used as the aluminum compound. The specific process details of Step #11 to Step #15 are as described in Example 1 when $SiO_2$ concentration is 1 mass %, and the mixing ratio of the aluminum nitrate aqueous solution and 5.88% TEOS solution in Step #13 was adjusted according to the set value of $SiO_2$ concentration except when $SiO_2$ concentration is 1 mass %.

In the present powder sample S1 and the comparative example C1, the contents of the drying treatment, the initial heat treatment, the first heat treatment, and the second heat treatment are the same. Furthermore, since the contents of the respective treatments are the same in the evaluation of the heat resistance in the second to sixth embodiments, duplicate descriptions in the respective embodiments will be omitted.

In evaluating the heat resistance, the specific surface area, the pore distribution, and the total pore volume were measured, and X-ray diffractometry (XRD) analysis of the crystalline structure was performed on the respective samples of the present powder sample S1 and the comparative Example C1. In evaluating the heat resistance in the second to seventh embodiments, measurements of the specific surface area and the like and XRD analysis were performed as needed. The specific surface area of the sample was used as an index of the heat resistance.

The specific surface area was measured by the nitrogen adsorption BET method using a fully automated gas adsorption amount measuring device (BELSORP-max manufactured by MicrotracBEL). The pore distribution and the total pore volume were measured by the BJH method using a fully automated gas-adsorption measuring device (BELSORP-max manufactured by MicrotracBEL). The XRD pattern of the crystal structure was measured using an X-ray diffractometer (ULTIMA III manufactured by Rigaku) by irradiating Cukα with a two-dimensional high-speed detector.

Figure 7:
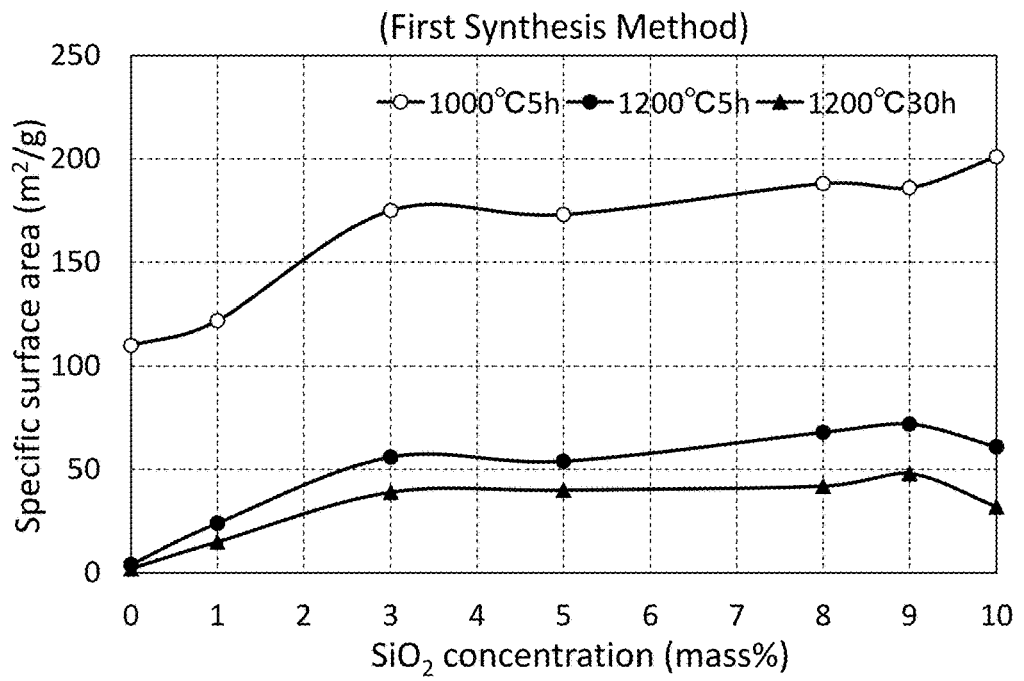
FIG. 7 is a graph showing the measurement results of the respective specific surface areas after the initial heat treatment, the first heat treatment, and the second heat treatment of the present powder samples S1 prepared by drying and calcining $SiO_2Al_2O_3$ containing sol solutions synthesized by the first synthesis method.
Figure 8:
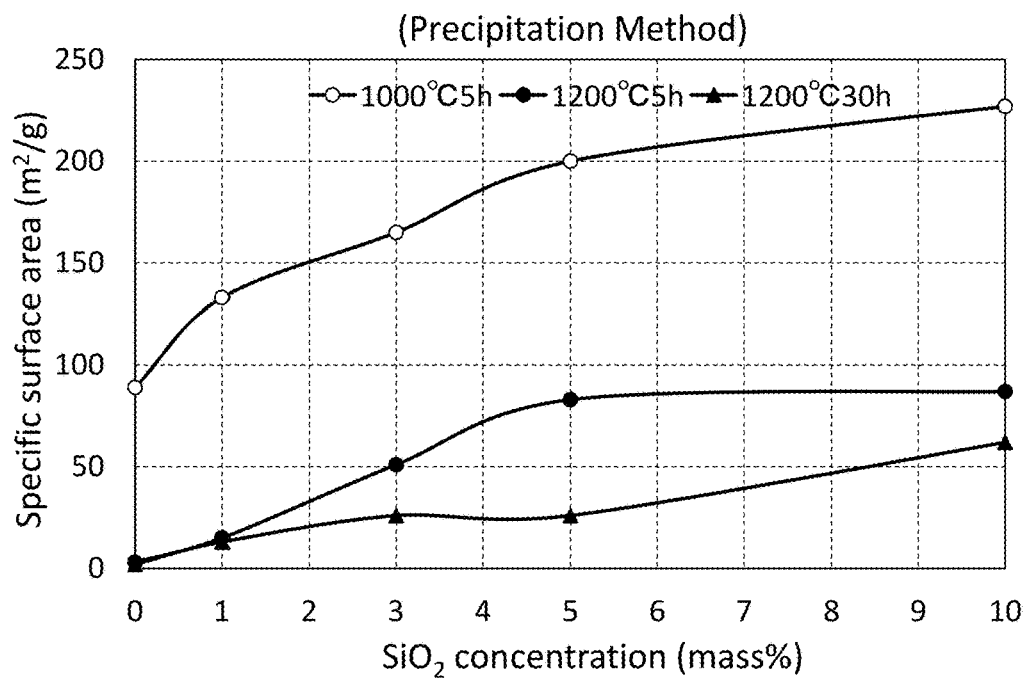
FIG. 8 is a graph showing the measurement results of the respective specific surface areas after the initial heat treatment, the first heat treatment, and the second heat treatment of the comparative examples C1 prepared by a precipitation method.

FIG. 7 shows the measurement results of the respective specific surface areas of the present samples S1A, the present samples S1B, and the present samples S1C (a total of 21 present powder samples S1) which were prepared by changing $SiO_2$ concentration in seven ways: 0 mass %, 1 mass %, 3 mass %, 5 mass %, 8 mass %, 9 mass %, and 10 mass %. FIG. 8 shows the measurement results of the respective specific surface areas of the comparative samples C1A, the comparative samples C1B, and the comparative samples C1C (a total of 15 comparative examples C1) which were prepared by changing $SiO_2$ concentration in five ways: 0 mass %, 1 mass %, 3 mass %, 5 mass %, and 10 mass %. In graphs showing the measurement results of specific surface areas such as FIG. 7 and FIG. 8, the vertical axis indicates the specific surface area ($m^2/g$), and the horizontal axis indicates $SiO_2$ concentration (mass %).

As shown in FIGS. 7 and 8, in the additive amount of silica for $SiO_2$ concentration of 0 mass % to 3 mass %, the specific surface area increases with increasing $SiO_2$ concentration for both the present powder sample S1 and the comparative example C1. When the specific surface areas of the present sample S1A and the comparative sample C1A having $SiO_2$ concentration of 3 mass % are compared, the specific surface area of the present sample S1A is 175 $m^2/g$, the specific surface area of the comparative sample C1A is 165 $m^2/g$, and the heat resistances of approximately the same degree are obtained.

As shown in FIGS. 7 and 8, in the additive amount of silica for $SiO_2$ concentration of 3 mass % to 10 mass %, the specific surface area of the comparative sample C1A increases with increasing $SiO_2$ concentration, while the specific surface area of the present sample S1A hardly increases. When the specific surface areas of the present sample S1A and the comparative sample C1A having $SiO_2$ concentration of 10 mass % are compared, the specific surface area of the present sample S1A is 201 $m^2/g$, the specific surface area of the comparative sample C1A is 227 $m^2/g$, and the present sample S1A exhibits a slightly lower specific surface area.

Figure 9:
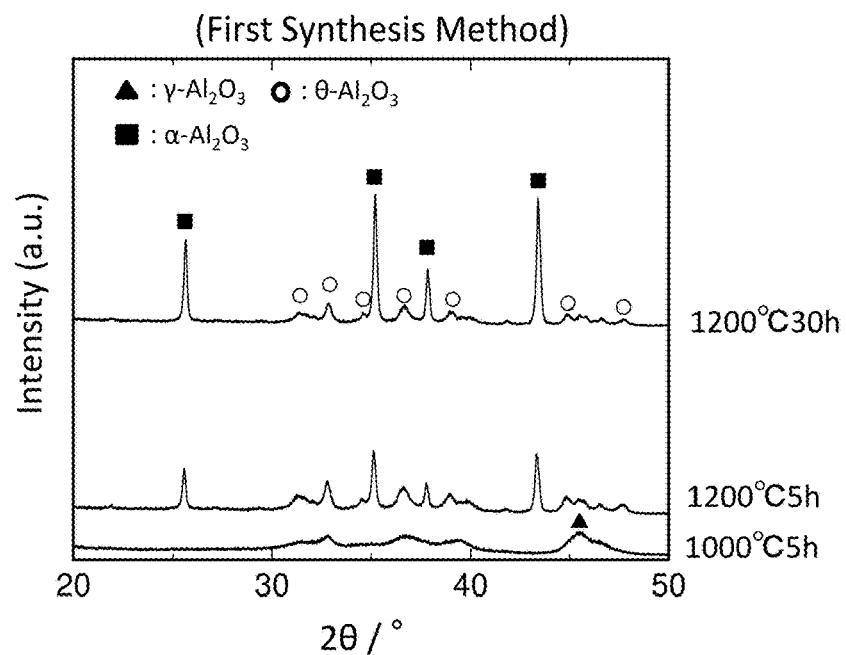
FIG. 9 is an XRD pattern diagram showing the crystal structures after the initial heat treatment, the first heat treatment, and the second heat treatment of the present powder samples S1 having $SiO_2$ concentration of 1 mass % prepared by drying and calcining $SiO_2Al_2O_3$ containing sol solution synthesized by the first synthesis method.
Figure 10:
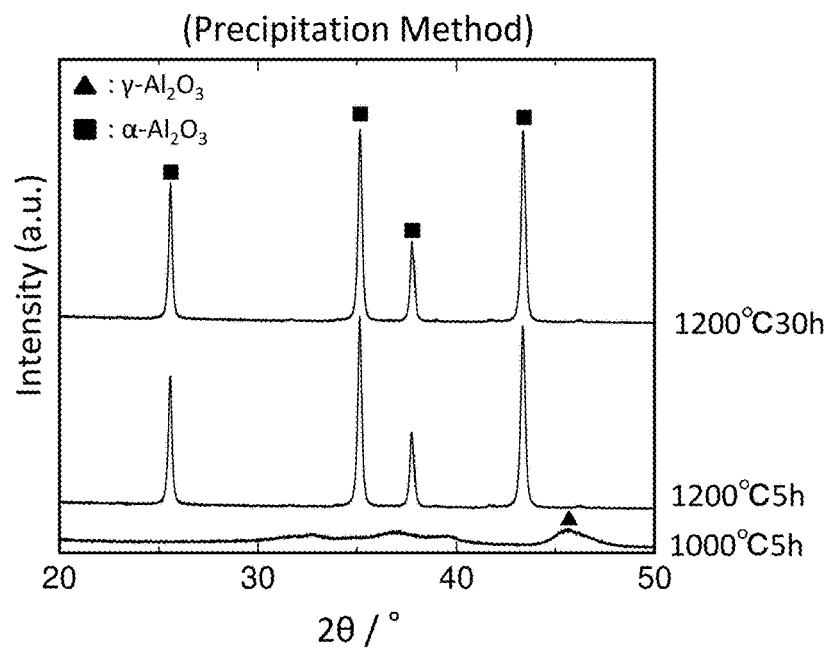
FIG. 10 is an XRD pattern diagram showing the crystal structures after the initial heat treatment, the first heat treatment, and the second heat treatment of the comparative examples C1 having $SiO_2$ concentration of 1 mass % prepared by a precipitation method.
Figure 11:
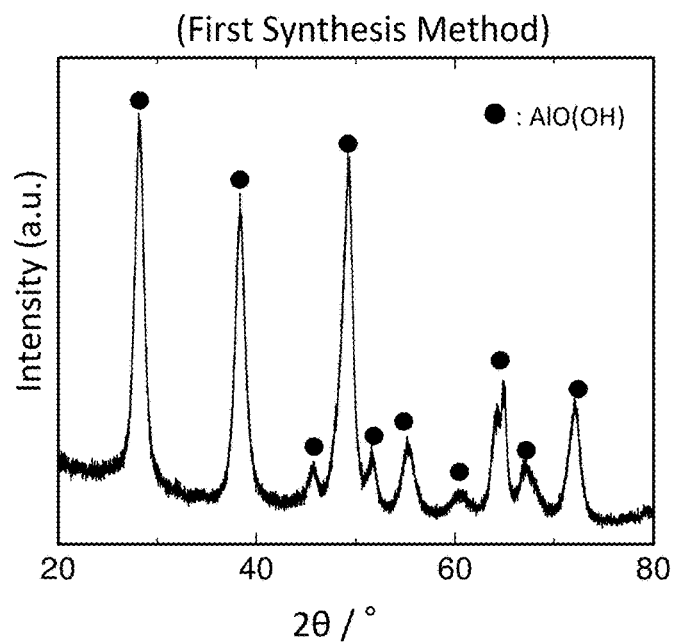
FIG. 11 is an XRD pattern diagram showing the crystal structure before the initial heat treatment of the present powder sample S1 (present dry sample S1D) obtained by drying $SiO_2Al_2O_3$-containing sol solution synthesized by the first synthesis method.
Figure 12:
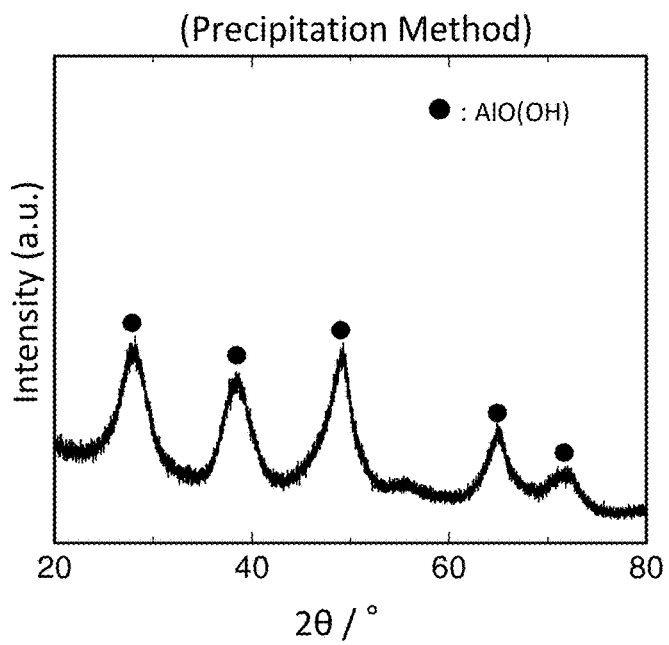
FIG. 12 is an XRD pattern diagram showing the crystal structure before the initial heat treatment of the comparative example C1 (comparative dry sample C1D).

FIG. 9 shows XRD patterns showing the crystal structures after the respective heat treatments in the present sample S1A, the present sample S1B, and the present sample S1C, each having $SiO_2$ concentration of 1 mass %. FIG. 10 shows XRD patterns showing the crystal structure after the respective heat treatments in the comparative sample C1A, the comparative sample C1B, and the comparative sample C1C, each having $SiO_2$ concentration of 1 mass %. Furthermore, FIG. 11 shows an XRD pattern showing the crystal structure of the pre-heat treatment sample of the present powder sample S1 (present dry sample S1D) not subjected to the initial heat treatment after drying $SiO_2Al_2O_3$ containing sol solution at 150° C. FIG. 12 shows an XRD pattern showing the crystal structure of the pre-heat treatment sample of the comparative example C1 (comparative dry sample C1D) not subjected to the initial heat treatment after drying the precipitate cake at 150° C.

As shown in FIGS. 9 and 10, while in the comparative example C1 by the precipitation method, the phase transition to $\alpha\text{-}Al_2O_3$ occurred completely by the first heat treatment (1200° C., 5 hours) (comparative sample C1B), in the present powder sample S1 subjected to the autoclave treatment, the phase transition completely to the α phase did not occur even after the second heat treatment (1200° C., 30 hours). As shown in the XRD patterns of the present dry sample S1D and the comparative dry sample C1D in FIGS. 11 and 12, in the present dry sample S1D, the autoclave treatment promoted the production of boehmite and developed small fibrous particles, making it difficult for the mass transfer of $Al_2O_3$ to occur, and as a result, it is considered that sintering was suppressed. As shown in FIG. 11, it is considered that aluminum hydroxide in the slurry solution was partially dehydrated under the temperature and pressure of the autoclave treatment to produce boehmite.

Figure 13:
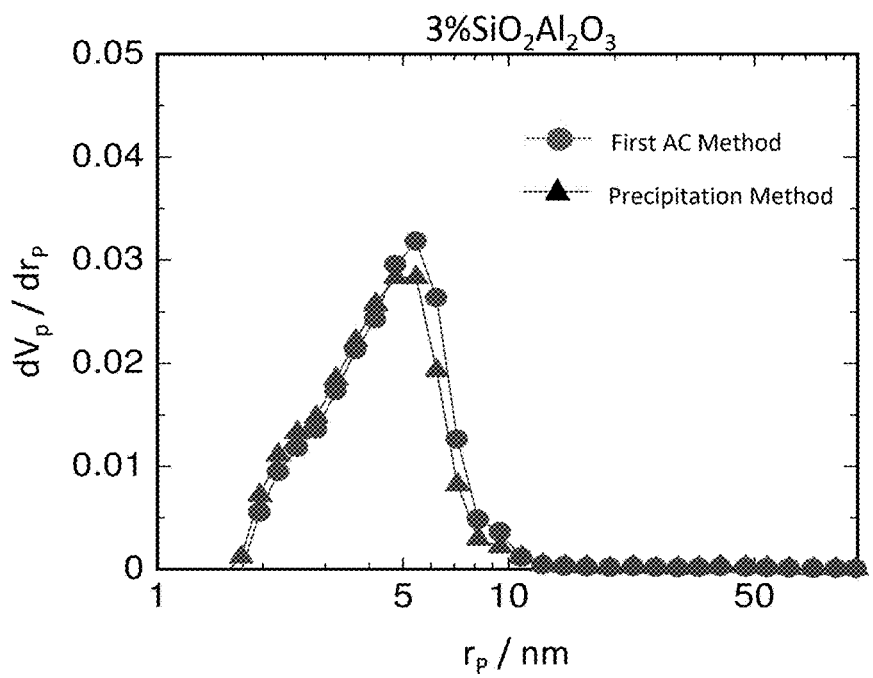
FIG. 13 is a BJH plot showing the pore distribution of the present powder sample S1 and the comparative sample C1B after the first heat treatment having $SiO_2$ concentration of 3 mass %.
Figure 14:
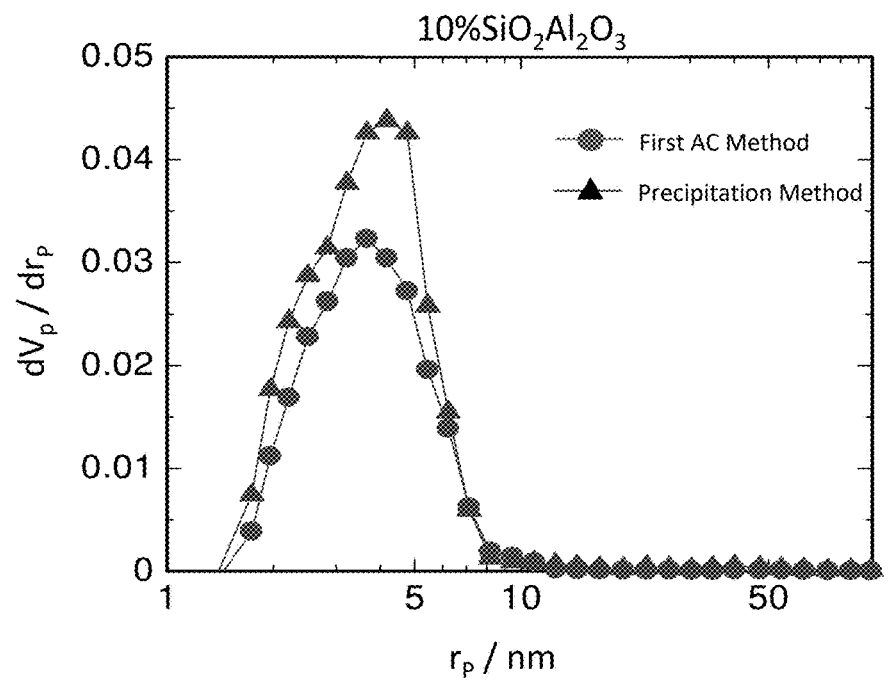
FIG. 14 is a BJH plot showing the pore distribution of the present powder sample S1 and the comparative example C1 after the first heat treatment having $SiO_2$ concentration of 10 mass %.

FIG. 13 shows the pore distributions (BJH plots) of the present sample S1B and the comparative sample C1B subjected to the first heat treatment (1200° C. for 5 hours) having $SiO_2$ concentration of 3 mass %. FIG. 14 shows the pore distributions (BJH plots) of the present sample S1B and the comparative sample C1B subjected to the first heat treatment having $SiO_2$ concentration of 10 mass %. In FIG. 13 and FIG. 14, circles (●) indicate the pore distribution of the present samples S1B, triangles (▲) indicate the pore distribution of the comparative samples C1B, the vertical axis indicates the differential pore volume $dV_p/dr_p$ ($m^3/g/nm$, and the horizontal axis indicates the pore diameter $r_p$ (nm). In addition, Table 3 below shows the specific surface areas ($m^2/g$) and total pore volumes ($cm^3/g$) of the present samples S1B and the comparative samples C1B having $SiO_2$ concentrations of 3 mass % and 10 mass %.

TABLE 3

| $SiO_2$ concentration | Sample | Specific surface area ($m^2/g$) | Total pore volume ($cm^3/g$) |
|---|---|---|---|
| 3 mass % | S1B | 56 | 0.1391 |
| | C1B | 51 | 0.1281 |
| 10 mass % | S1B | 61 | 0.1275 |
| | C1B | 87 | 0.1813 |

As shown in Table 3, at $SiO_2$ concentration of 3 mass %, the pore distribution and the specific surface area were not significantly different between the present sample S1B and the comparative sample C1B. However, at $SiO_2$ concentration of 10 mass %, the total pore volume of the present sample S1B was 0.1275 cm$^3$/g, whereas the total pore volume of the comparative sample C1B was 0.1813 cm$^3$/g, and the total pore volume was decreased in the present sample S1B. This is because the present powder sample S1 is obtained by drying $SiO_2Al_2O_3$ containing sol solution to form a transparent gel and calcining the transparent gel, and it is considered that the total pore volume of $Al_2O_3$ is reduced by the surface tension of the evaporating water in the process of forming the transparent gel from the sol solution. A countermeasure against the reduction in the total pore volume will be described in the fourth embodiment described later.

[5] Evaluation of Heat Resistance of the First Synthesis Method (2)

Next, the specific surface area when the aluminum compound used in the present samples S1A to S1C was changed from aluminum nitrate to aluminum chloride and aluminum sulfate, respectively, was examined.

Table 4 below shows the specific surface areas (m$^2$/g) of the present samples S1A to S1C in which the aluminum compounds are aluminum nitrate, aluminum chloride, and aluminum sulfate.

TABLE 4

| Aluminum compound | Specific surface area (m$^2$/g) | | |
|---|---|---|---|
| | (1000° C. 5 h) S1A | (1200° C. 5 h) S1B | (1200° C. 30 h) S1C |
| Aluminum nitrate | 122 | 24 | 15 |
| Aluminum chloride | 129 | 24 | 16 |
| Aluminum sulfate | 108 | 13 | 12 |

As shown in Table 4, when the aluminum compound is aluminum chloride, the specific surface areas of the present samples SIA to SIC are almost the same as those in the case of aluminum nitrate. On the other hand, when the aluminum compound was aluminum sulfate, the specific surface areas of the present samples S1A to SIC are lower than those in the case of aluminum nitrate and aluminum chloride, and the heat resistances are slightly lower than those in the case of the other two aluminum compounds.

[6] Evaluation of Heat Resistance of the First Synthesis Method (3)

As described above, when the specific surface areas of the present powder sample S1 and the comparative example C1 are compared, the specific surface area is not extremely different from each other. Therefore, in the pH adjusting treatment on the slurry solution in Step #15 of the first synthesis method, even if pH value of the slurry solution is not controlled within a specific pH range in which the solution state after the autoclave treatment is the sol state, that is, even if the solution state is the gel or the precipitate other than the sol state, it is considered that $SiO_2Al_2O_3$ powder obtained by drying and calcining such a solution may also have a specific surface area similar to that of the present powder sample S1 described above.

Therefore, in order to verify this, six types of sol solutions were prepared by changing pH value of the slurry solution in six ways in the pH adjusting treatment on the slurry solution of Step #15 in the same manner as the present powder sample S1. Then, six types of powder samples SA were prepared by drying the six types of sol solutions and calcining them by the initial heat treatment of 1000° C. and 5 hours, and six types of powder samples SB with the first heat treatment of 1200° C. and 5 hours added respectively to the six types of powder samples SA were prepared, and six types of powder samples SC with the second heat treatment of 1200° C. and 30 hours added respectively to the six types of powder samples SA were prepared, so that a total of 18 types of different powder samples with different pH values of the slurry solution and different heat treatment conditions were prepared.

Table 5 below shows the measurement results of the specific surface areas (m$^2$/g) of the six powder samples SA, the six powder samples SB, and the six powder samples SC. Table 6 below shows the total pore volume (cm$^3$/g) of three samples (pH=2.77, 3.69, 9.57) out of the six types of powder samples SA.

TABLE 5

| Solution state | pH value of slurry solution | Specific surface area (m$^2$/g) | | |
|---|---|---|---|---|
| | | (1000° C. 5 h) SA | (1200° C. 5 h) SB | (1200° C. 30 h) SC |
| Gel | 2.77 | 127 | 17 | 14 |
| Sol | 3.69 | 125 | 19 | 10 |
| | 5.13 | 119 | 39 | 22 |
| | 6.09 | 133 | 12 | 13 |
| Precipita- | 7.96 | 139 | 18 | 11 |
| tion | 9.57 | 140 | 22 | 16 |

TABLE 6

| Solution state | Total pore volume (cm$^3$/g) (1000° C. 5 h) SA |
|---|---|
| Gel (pH 2.77) | 0.3067 |
| Sol (pH 3.69) | 0.3564 |
| Precipitation (pH 9.57) | 0.4348 |

According to Tables 5 and 6, both the specific surface area and the total pore volume tend to increase in the order of the gel, the sol, and the precipitation in the solution state. The specific surface area and the total pore volume in the case where the solution state is the sol are slightly inferior to those in the case where the solution state is the precipitate, but as described in the seventh embodiment described later, when the immobilization of the coating film to substrate is considered, the adhesiveness to substrate surface is poor in the solution state other than the sol, which is unsuitable for forming the coating film.

Second Embodiment

Hereinafter, the second embodiment of the present synthesis method (the second synthesis method) will be described.

[7] Basic Structure of the Second Synthesis Method

Figure 15:
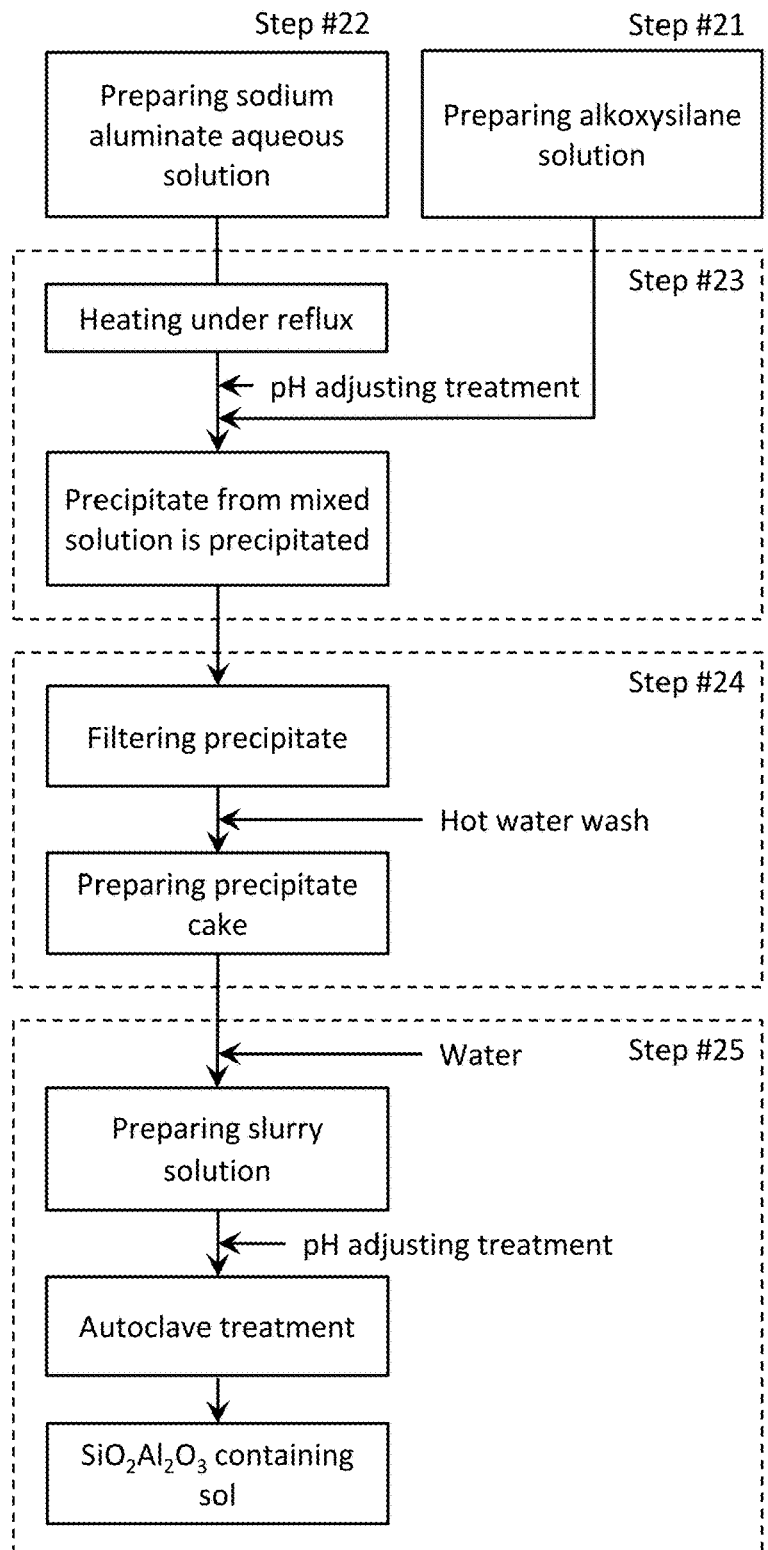
FIG. 15 is a process transition diagram showing an outline of a method for synthesizing $SiO_2Al_2O_3$ containing sol solution according to the second embodiment (the second synthesis method).

As shown in the process transition diagram of FIG. 15, the second synthesis method is roughly divided into the following Steps #21 to #25. Steps #21 to #25 are basically the same processing contents as Steps #11 to #15 of the first synthesis method shown in FIG. 1, but in the second synthesis method, the aluminum compound is sodium aluminate and is different from aluminum nitrate, aluminum chloride, and aluminum sulfate used as the aluminum compound of the first synthesis method.

The second synthesis method is a synthesis method in which $SiO_2Al_2O_3$ containing sol solution is synthesized after the autoclave treatment as in the first synthesis method, and the second synthesis method corresponds to the first AC method when the aluminum compound is sodium aluminate.

Due to the difference in the aluminum compound, the processing contents of Steps #22, #23, #24, and #25 are partially different from those of Steps #12 to #15 of the first synthesis method in detail. Step #21 is the same as Step #11 of the first synthesis method. Step #22 differs from Step #12 of the first synthesis method only in the aluminum compound used. Therefore, duplicate descriptions of Steps #21 and #22 will be omitted. Furthermore, the method of adjusting $SiO_2$ concentration and the method of adjusting the sol solution concentration are the same as those of the first synthesis method, and duplicate descriptions will be omitted.

In Step #23, in the mixed solution obtained by mixing the alkoxysilane solution obtained in Step #21 and the aluminum solution obtained in Step #22, the precipitate with the silicon compound adsorbed on the aluminum hydroxide is precipitated. This is the same as in Step #13 of the first synthesis method.

However, in the second synthesis method, as one implementation of Step #23, the aluminum solution obtained in Step #22 is heated under reflux, and then subjected to a pH adjusting treatment with nitric acid being added dropwise, and then mixed with the alkoxysilane solution obtained in Step #21 to prepare a mixed solution. In the mixed solution, the precipitate with the silicon compound adsorbed on the precipitate of aluminum hydroxide, which was precipitated during the pH adjusting treatment of the aluminum solution, is precipitated. That is, Step #23 differs from Step #13 in that in Step #13, the heating under reflux and the pH adjustment are performed on the mixed solution, whereas in Step #23, these treatments are performed on the aluminum solution.

Step #24 is the same as Step #14 of the first synthesis method in that the precipitate obtained in Step #23 is filtered off from the mixed solution and the filtered precipitate is washed with water to produce the precipitate cake. However, Step #24 differs from Step #14 in that when washing the filtered precipitate with water, in the examples of the first synthesis method, the filtered precipitate is washed with ion-exchange water at room temperature, but in the examples of the second synthesis method, the filtered precipitate is washed with ion-exchange water at 60° C., for example. If the sodium contained in the aluminum compound is present in $SiO_2Al_2O_3$ containing sol solution synthesized in Step #25, sintering of the alumina is promoted when the sol solution is dried and calcinated, and therefore, in Step #24, the washability is enhanced by using hot water at 60° C. when washing the filtered precipitate, and the sodium is removed from the precipitate.

Step #25 is the same as Step #15 of the first synthesis method in that water is added to the precipitate cake obtained in Step #24 to prepare a slurry solution, and the slurry solution is subjected to a pH adjusting treatment, followed by the autoclave treatment to prepare $SiO_2Al_2O_3$ containing sol solution. In addition, it is also the same as Step #15 of the first synthesis method in that the sol particles of silica bonded to the boehmite particles are present in the prepared $SiO_2Al_2O_3$ containing sol solution in highly dispersed form.

Furthermore, as an implementation of Step #25, the sol solution concentration (mass %) is controlled to be equal to or less than the specific concentration at which the solution state after the autoclave treatment is the sol state, and the pH adjusting treatment is performed on the slurry solution to control pH value of the slurry solution to be within the specific pH range in which the solution state after the autoclave treatment is the sol state. This is also the same as Step #15 of the first synthesis method.

Furthermore, as an implementation of Step #25, the treatment temperature of the autoclave treatment is set to a specific treatment temperature within a range of 100° C. or higher and 200° C. or lower, the treatment time of the autoclave treatment is set within a specific time range in which the solution state after the autoclave treatment according to the specific treatment temperature becomes the sol state, and the specific time range is within a range of 1 hour or more and 100 hours or less. This is also the same as Step #15 of the first synthesis method.

As will be described later, the specific concentration varies depending on $SiO_2$ concentration and the heating conditions (treatment temperature, treatment time) of the autoclave treatment, and the specific pH range varies depending on $SiO_2$ concentration within a range of 1.0 or more and 6.2 or less. The specific concentration and the specific pH range in Step #25 are different from Step #15 of the first synthesis method.

[8] Examples of the Second Synthesis Method

Hereinafter, Example 4 of Steps #21 to #25 for synthesizing $SiO_2Al_2O_3$ containing sol solution having $SiO_2$ concentration of 1 mass % will be described. Sodium aluminate is used as the aluminum compound.

In Step #21, a clear and uniform 5.88% TEOS solution (alkoxysilane solution) was obtained in the same manner as in Step #11 of Example 1.

In Step #22, sodium aluminate 3.57 g was dissolved in 66.56 g of water to obtain a sodium aluminate aqueous solution (aluminum solution).

In Step #23, the sodium aluminate aqueous solution obtained in Step #22 was heated under reflux, and nitric acid was added dropwise until pH8.0 was obtained, and the mixture was stirred. A precipitate of aluminum hydroxide was precipitated along with the dropping of nitric acid. Subsequently, 5.88% TEOS solutions of 1.18 g obtained in Step #21 were added dropwise to the sodium aluminate aqueous solution in which the precipitate of aluminum hydroxide was precipitated, and the mixture was stirred at room temperature for 30 minutes. As a result, in the mixed solution of the sodium aluminate aqueous solution and TEOS solution, a precipitate with a silicon compound adsorbed on aluminum hydroxide was obtained.

Subsequently, in Step #24, the mixed solutions containing the precipitate obtained in Step #23 was filtered by suction filtration using No. 1 filter paper, and the precipitate was filtered off. The filtered precipitate was washed with ion-exchange water at 60° C. to obtain a precipitate cake.

Subsequently, in Step #25, water was added to the obtained precipitate cake so that the total amount was 80 g, and the mixture was stirred to prepare a slurry solution. Nitric acid (60% aqueous solution) was added to the slurry solution until pH3.0 was obtained, and the autoclave treatment was performed at 150° C. for 15 hours to obtain 1% $SiO_2Al_2O_3$ containing sol solution. In the autoclave treatment, an autoclave having an internal capacity 100 ml was used in the same manner as in Examples 1 to 3.

The total amount of 1% $SiO_2Al_2O_3$ containing sol solution obtained in Step #25 is 80 g, and the amount of 1% $SiO_2Al_2O_3$ powder obtained by drying this sol solution is 2.0 g. The sol solution concentration of a total amount 80 g of the sol solution containing 2.0 g of 1% $SiO_2Al_2O_3$ powder is 2.5 mass %. Thus, 1% $SiO_2Al_2O_3$ containing sol solution obtained in Step #25 is 1% $SiO_2Al_2O_3$2.5% sol. Since the additive amount of nitric acid (60% aqueous solution) used for the pH adjustment on the slurry solution is a small amount as in the first synthesis method, the total amount of 1% $SiO_2Al_2O_3$ containing sol solution is approximately the same 80 g as the total amount of the slurry solution.

[9] Examination for Conditions of Autoclave Treatment in the Second Synthesis Method The solution state after the autoclave treatment of Step #25 may be any of six states of sol, first half-sol, second half-sol, gel, precipitate, and cloudy sol depending on $SiO_2$ concentration and sol solution concentration of $SiO_2Al_2O_3$ containing sol solution after synthesis, pH value of the slurry solution, and the heating conditions of the autoclave treatment (treatment temperature, treatment time). This point is the same as the first synthesis method. The above six solution states have already been described in "[3] Examination for Conditions of Autoclave Treatment in the First Synthesis Method" described above, and duplicate description thereof will be omitted.

In the following, conditions for the autoclave treatment by which the solution state after the autoclave treatment in the second synthesis method becomes the sol will be examined.

[9.1] $SiO_2$ Concentration Dependence in the Specific pH Range

The relationship between a range of pH value of the slurry solution (specific pH range) in which the solution state after the autoclave treatment is the sol and $SiO_2$ concentration was examined in the following manner.

Multiple sets of samples (total amount 80 g of slurry solutions) were prepared in which $SiO_2$ concentration was changed in the range of 0 mass % to 5 mass % and pH value after the pH adjusting treatment on the slurry solution of Step #25 was changed in a range of 0.22 to 7.65, and the solution state after the autoclave treatment was visually confirmed. In each sample, the sol solution concentration was set to the same 2.5 mass % as in Example 4, and as the heating conditions of the autoclave treatment, the same 150° C. for 15 hours as in Example 4 was used.

Figure 16:
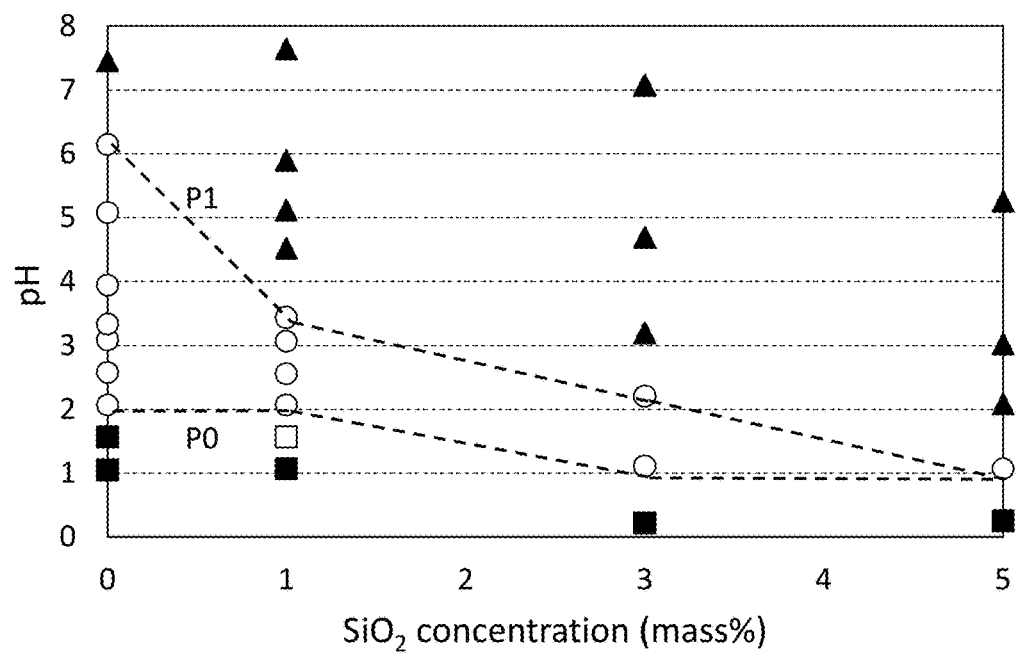
FIG. 16 is a scatter plot showing the relationship between the solution state, pH value of the slurry solution, and $SiO_2$ concentration of $SiO_2Al_2O_3$ containing sol solutions synthesized by the second synthesis method.

The results of checking the solution states are shown as a scatter plot in FIG. 16. The vertical axis of the scatter plot indicates pH value of the slurry solution, and the horizontal axis indicates $SiO_2$ concentration. In the drawing, the sol is indicated by open circles ○, the gel is indicated by solid squares ■, the precipitate is indicated by solid triangles ▲, and the first half-sol is indicated by open squares □. In the measurement results shown in FIG. 16, the second half-sol was not confirmed.

From FIG. 16, it can be seen that the specific pH range (from the lower limit to the upper limit) falls within the range of 1.0 or more and 6.2 or less, where $SiO_2$ concentration is in the range of 0 to 5 mass %, and decreases with increasing $SiO_2$ concentration. Also, similar to the first synthesis method, it can be seen that at the same $SiO_2$ concentration, gelation occurs when pH value is less than the specific pH range, and precipitation occurs when pH value is greater than the specific pH range.

In the case of a sol solution without silica added ($SiO_2$ concentration of 0 mass %), the solution state remains in a sol state when pH value is within the specific pH range (2.07 to 6.15). However, since a transparent gel is formed in the region where pH value is less than pH2.07, it is considered that the acid catalyst promoted polymerization of the sol and led to gelation. In this sense, even in regions below pH2.07, if the heating conditions of the autoclave treatment are relaxed (shorter treatment time and/or lower treatment temperature) and gelation is suppressed, it is possible to convert the solution state into the sol. Therefore, in the case of silica-added $SiO_2Al_2O_3$ containing sol solution, the specific pH range shown in FIG. 16 may be extended to the lower side by relaxing the heating conditions.

Since the isoelectric point of silica sol is pH1 to pH1.5, near neutrality of the region where boehmite sol exists, the silica sol will be dispersed in the liquid with its surface negatively charged. Near neutrality, boehmite is positively charged and silica is considered to be electrostatically bound to boehmite. Therefore, as in the first synthesis method, the reason why the upper limit of the specific pH range decreases as $SiO_2$ concentration increases in FIG. 16 is considered to be due to the influence of the silica sol. Considering that precipitation occurs when the potential on the particle surface becomes zero and the particles agglomerate, when silica and boehmite, which have significantly different isoelectric points, are mixed, the silica adsorbs to the boehmite near neutrality, so that it is considered that the apparent isoelectric point is lowered, and the upper limit of the specific pH range is lowered.

In FIG. 16, assuming that $SiO_2$ concentration is X (mass %), the lower limit of the specific pH range is P0, and the upper limit thereof is P1, P0 and P1 are given by the following calculation formulas as approximate values. The approximate values of P0 and P1 are illustrated by polygonal dashed lines in FIG. 16, respectively, for reference.

When $0 < X \leq 1$, $P0 = 2.07$ $P1 = -2.71 \times X + 6.15$

When $1 < X \leq 3$, $P0 = -0.48 \times (X - 1) + 2.07$ $P1 = -0.615 \times (X - 1) + 3.44$ When $3 < X \leq 5$, $P0 = -0.02 \times (X - 3) + 1.11$ $P1 = -0.57 \times (X - 3) + 2.21$ As described above, in one implementation of the pH adjusting treatment on the slurry solution in Step #25, the pH adjusting treatment can be performed so that pH value of the slurry solution is within the specific pH range determined by P0 and P1 which are given by the above calculation formulas when $SiO_2$ concentration is X (mass %).

[9.2] $SiO_2$ Concentration Dependence of the Specific Concentration

The relationship between $SiO_2$ concentration and the upper limit of the sol solution concentration (specific concentration) in which the solution state after the autoclave treatment is the sol under the predetermined heating conditions (treatment temperature, treatment time) of the autoclave treatment was examined in the following manner.

Multiple sets of samples (total amount 80 g of slurry solutions) were prepared in which $SiO_2$ concentration was varied within a range of 0 mass % to 5 mass % and the sol solution concentration (mass %) was varied, and the solution states after the autoclave treatment were visually confirmed. In each sample, pH value of the slurry solution was set to pH value within the specific pH range in which the solution state is the sol in FIG. 16. In addition, as the heating conditions of the autoclave treatment, the same 150° C. for 15 hours as in Example 4 was used.

Figure 17:
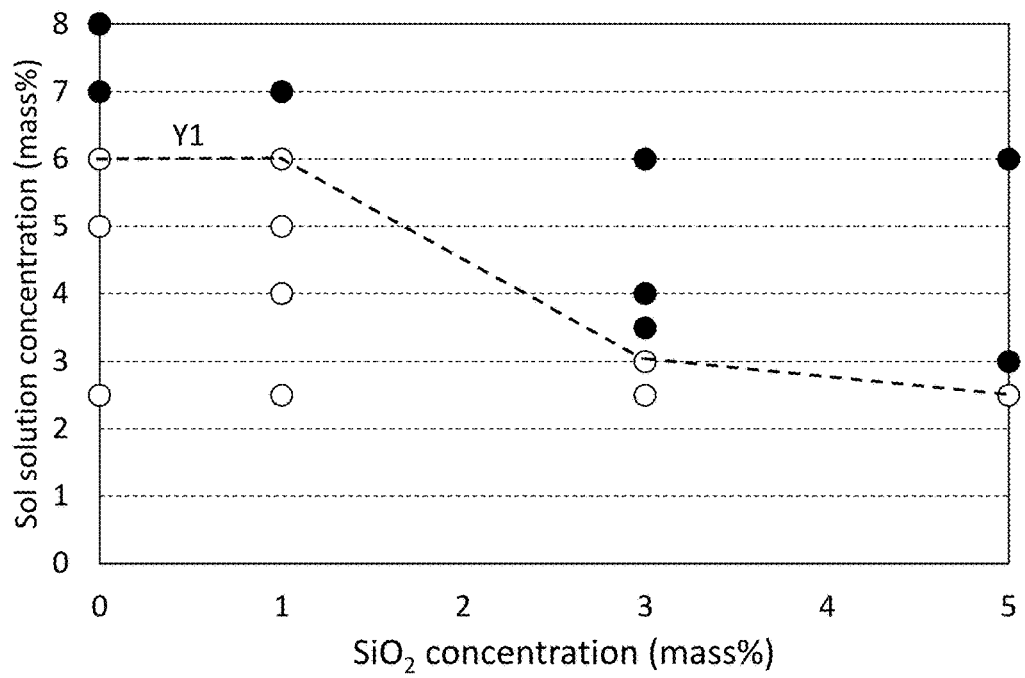
FIG. 17 is a scatter plot showing the relationship between solution state, sol solution concentration, and $SiO_2$ concentration of $SiO_2Al_2O_3$ containing sol solutions synthesized by the second synthesis method.

The results of checking the solution states are shown as a scatter plot in FIG. 17. The vertical axis of the scatter plot indicates the sol solution concentration (mass %), and the horizontal axis indicates $SiO_2$ concentration. In the drawing, the sol is indicated by open circles ○, and the second half-sol is indicated by solid circles ●.

It can be seen from FIG. 17 that, regardless of $SiO_2$ concentration, when the sol solution concentration is higher than the specific concentration, unpeptized precipitate remains in the sol. It can be seen from FIG. 17 that under the heating condition of 150° C. for 15 hours, the specific concentration falls within a range of 2.5 mass % or more and 6.0 mass % or less in the range of 0 to 5 mass % of $SiO_2$ concentration and decreases with increasing $SiO_2$ concentration. It can be seen from the above that the relationship between the sol solution concentration and $SiO_2$ concentration in the second synthesis method shows a similar tendency to the relationship between the sol solution concentration and $SiO_2$ concentration in the first synthesis method. Furthermore, as in the first synthesis method, even when the sol solution concentration becomes higher than the specific concentration at a certain $SiO_2$ concentration and the solution state becomes the second half-sol, if the heating condition of the autoclave treatment is appropriately adjusted and the heating amount is increased, the solution state may become the sol state.

In FIG. 17, where $SiO_2$ concentration is X (mass %) and the specific concentration is Y1, Y1 is given by the following calculation formulas as an approximate value. The approximate value of Y1 is shown in a polygonal dashed line in FIG. 17 for reference.

When $0 < X \leq 1$, $Y1 = 6$

When $1 < X \leq 3$, $Y1 = -1.5 \times (X - 1) + 6$

When $3 < X \leq 5$, $Y1 = -0.25 \times (X - 3) + 3$

As described above, when the heating condition of the autoclave treatment is 150° C. for 15 hours, in one implementation in controlling the sol solution concentration of Step #25 to the specific concentration or less, when $SiO_2$ concentration is X (mass %), the respective charge-in quantities of the alkoxysilane and the sodium aluminate in Steps #21 and #22 and the amount of water to be added to the precipitate cake in Step #25 can be adjusted so that the sol solution concentration is equal to or less than the specific concentration Y1 given by the above calculation formula.

[9.3] Conditions of Autoclave Treatment for 1% $SiO_2Al_2O_3$ Containing Sol Solution From the above results, one example of the conditions of the autoclave treatment for synthesizing 1% $SiO_2Al_2O_3$ containing sol solution by the second synthesis process is as follows.

pH value of the slurry solution: pH2.1 to pH3.4
Sol solution concentration: 6 mass % or less
Heating conditions: 150° C. for 15 hours Incidentally, as described above, when $SiO_2$ concentration of $SiO_2Al_2O_3$ containing sol solution is increased to more than 1 mass %, pH value and sol solution concentration of the slurry solution can be adjusted accordingly in the manner described above. The heating conditions are not limited to 150° C. for 15 hours described above, and the treatment temperature and the treatment time may be changed so as to suppress an increase/decrease in the heating amount as described in the first synthesis method.

[10] Evaluation of Heat Resistance of the Second Synthesis Method

The heat resistance of $SiO_2Al_2O_3$ powder obtained by drying and calcining $SiO_2Al_2O_3$ containing sol solution synthesized by the second synthesis method (hereinafter, collectively referred to as "present powder sample S2") was evaluated. In order to evaluate the effect on the heat resistance of the process of making the precipitate cake into a sol by the autoclave treatment in Step #25 of the second synthesis method, the heat resistance of $SiO_2Al_2O_3$ powder obtained by directly drying and calcinating the precipitate cake prepared through Steps #21 to #24 without making it into a sol (hereinafter collectively referred to as "comparative example C2") was evaluated, and the heat resistances of the present powder sample S2 and the comparative example C2 were compared. Hereinafter, the method for synthesizing the comparative example C2 will be referred to as "precipitation method" as appropriate in the same manner as the method for synthesizing the comparative example C1.

In evaluating the heat resistance, since the comparative example C2 is a powder sample, further in order to easily examine the change in the heat resistance due to the difference in $SiO_2$ concentration, the powder sample is used instead of the coating film.

The steps until the precipitate cake is produced in the method for synthesizing the silica-added porous alumina of the comparative example C2 is the same as Steps #21 to #24 of the second synthesis method. In the comparative example C2, the obtained precipitate cake was dried at 150° C., then pulverized into a powder, and then subjected to calcination at 1000° C. for 5 hours (initial heat treatment) in the air to prepare $SiO_2Al_2O_3$ powder (comparative sample C2A). Furthermore, a comparative sample C2B obtained by adding the first heat treatment at 1200° C. for 5 hours to the comparative sample C2A, and a comparative sample C2C obtained by adding the second heat treatment at 1200° C. for 30 hours to the comparative sample C2A were prepared as needed.

On the other hand, as the present powder sample S2, following Steps #21 to #24 of the second synthesis method, $SiO_2Al_2O_3$ containing sol solution obtained through Step #25 was dried at 150° C., subsequently pulverized into a powder, and the powder was calcined in the air at 1000° C. for 5 hours (initial heat treatment), so that $SiO_2Al_2O_3$ powder (present sample S2A) was prepared. In addition, a present sample S2B obtained by adding the first heat treatment at 1200° C. for 5 hours to the present sample S2A, and a present sample S2C obtained by adding the second heat treatment at 1200° C. for 30 hours to the present sample S2A were prepared as needed.

In the present powder sample S2 and the comparative example C2, the specific process details of Step #21 to Step #25 are as described in Example 4 when $SiO_2$ concentration is 1 mass %, and the mixing ratio of the sodium aluminate aqueous solution and 5.88% TEOS solution in Step #23 was adjusted according to the set value of $SiO_2$ concentration except when $SiO_2$ concentration of 1 mass %.

Figure 18:
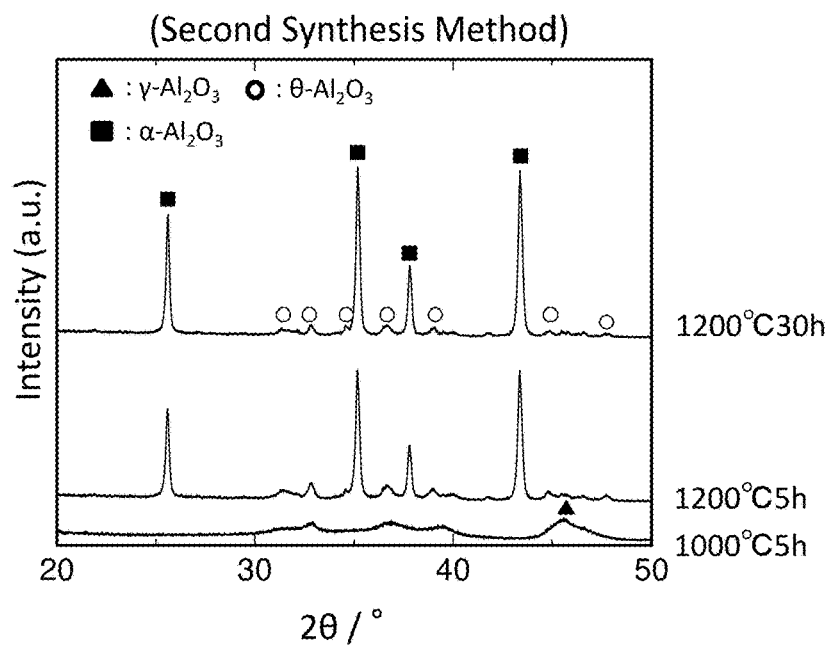
FIG. 18 is an XRD pattern diagram showing the crystal structures after the initial heat treatment, the first heat treatment, and the second heat treatment of the present powder samples S2 having $SiO_2$ concentration of 1 mass % prepared by drying and calcining $SiO_2Al_2O_3$ containing sol solution synthesized by the second synthesis method.
Figure 19:
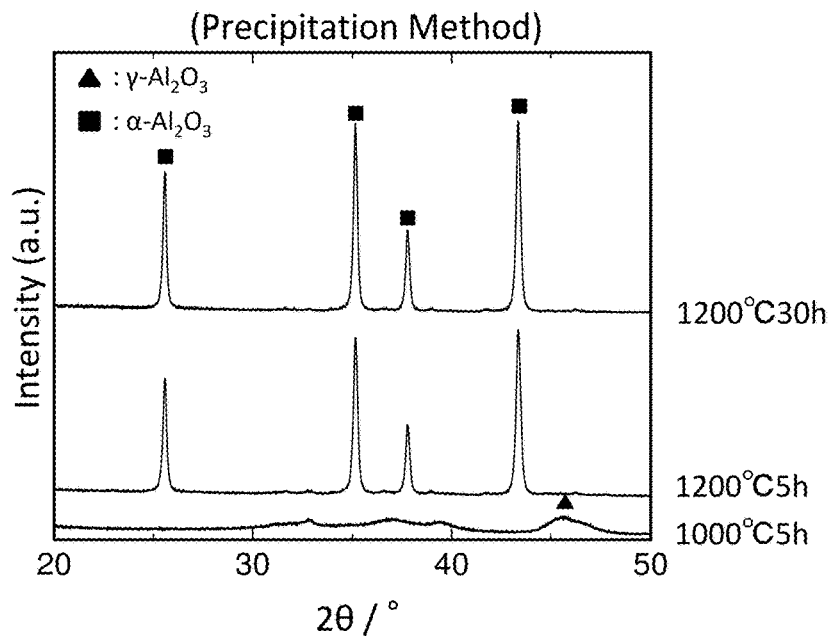
FIG. 19 is an XRD pattern diagram showing the crystal structures after the initial heat treatment, the first heat treatment, and the second heat treatment of the comparative examples C2 having $SiO_2$ concentration of 1 mass % prepared by a precipitation method.

FIG. 18 shows XRD patterns showing the crystal structures after the respective heat treatments in the present sample S2A, the present sample S2B, and the present sample S2C, each having $SiO_2$ concentration of 1 mass %. FIG. 19 shows XRD patterns showing the crystal structure after the respective heat treatments in the comparative sample C2A, the comparative sample C2B, and the comparative sample C2C, each having $SiO_2$ concentration of 1 mass %.

From FIGS. 18 and 19, it was found that even when the aluminum compound is sodium aluminate, $SiO_2Al_2O_3$ can be obtained similarly to the case where the aluminum compound is aluminum nitrate (see FIGS. 9 and 10). Furthermore, it turns out that, after the second heat treatment at 1200° C. for 30 hours, the phase transition completely to the α phase occurred in the comparative sample C2C by the precipitation method but did not occur in the present sample S2C subjected to the autoclave treatment.

Figure 20:
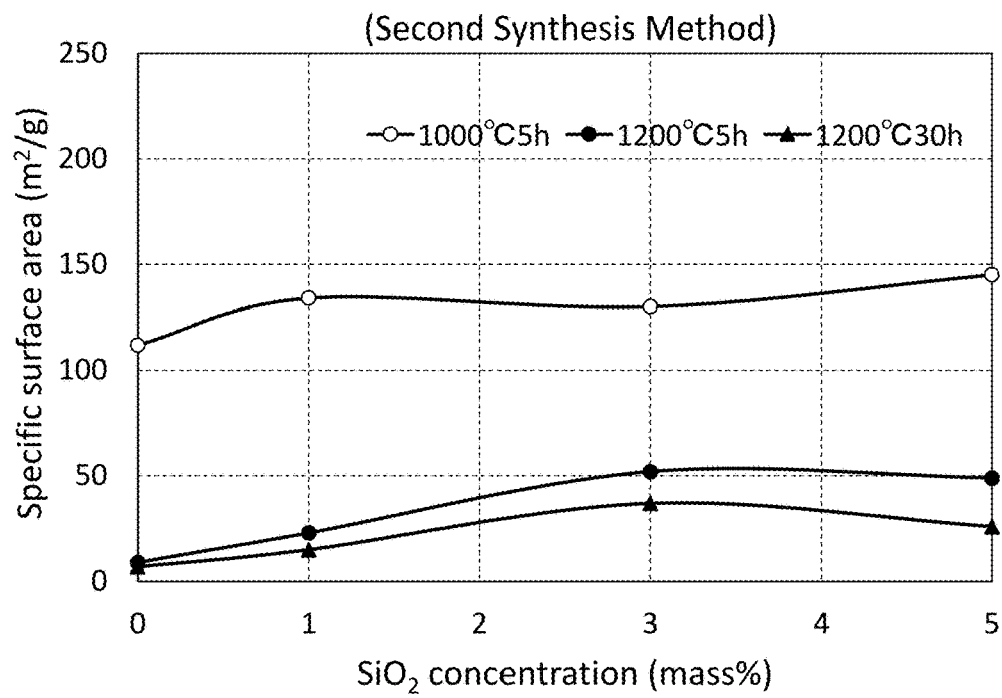
FIG. 20 is a graph showing the measurement results of the respective specific surface areas after the initial heat treatment, the first heat treatment, and the second heat treatment of the present powder samples S2 prepared by drying and calcining $SiO_2Al_2O_3$ containing sol solutions synthesized by the second synthesis method.
Figure 21:
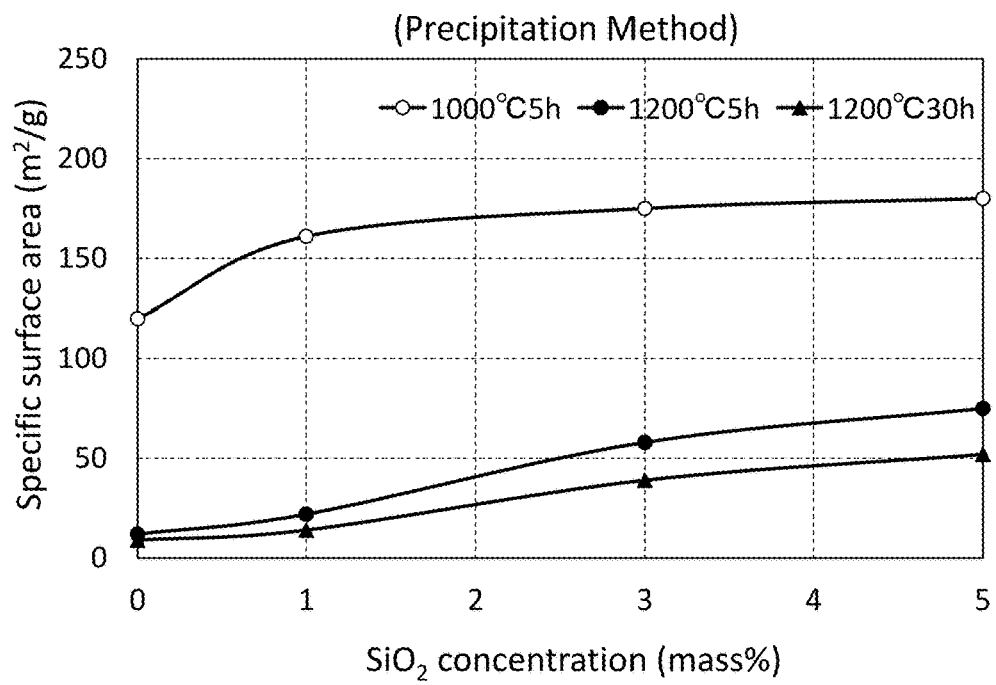
FIG. 21 is a graph showing the measurement results of the respective specific surface areas after the initial heat treatment, the first heat treatment, and the second heat treatment of the comparative examples C2 prepared by a precipitation method.

FIG. 20 shows the measurement results of the respective specific surface areas of the present samples S2A, the present samples S2B, and the present samples S2C (a total of 12 present powder samples S2) which were prepared by changing $SiO_2$ concentration in four ways: 0 mass %, 1 mass %, 3 mass %, and 5 mass %. FIG. 21 shows the measurement results of the respective specific surface areas of the comparative samples C2A, the comparative samples C2B, and the comparative samples C2C (a total of 12 comparative examples C2) which were prepared by changing $SiO_2$ concentration in four ways: 0 mass %, 1 mass %, 3 mass %, and 5 mass %. In FIG. 20 and FIG. 21, the vertical axis indicates the specific surface area ($m^2/g$), and the horizontal axis indicates $SiO_2$ concentration (mass %).

As shown in FIG. 21, the specific surface areas of the comparative sample C2A, the comparative sample C2B, and the comparative sample C2C after the initial, first, and second heat treatments are approximately the same as those of the comparative sample C1A, the comparative sample C1B, and the comparative sample C1C after the initial, first, and second heat treatments when the aluminum compound is aluminum nitrate (see FIG. 8).

As shown in FIG. 20, the specific surface area of the present sample S2B and the present sample S2C after the first and second heat treatments are approximately the same as those of the present sample S1B and the present sample S1C after the first and second heat treatments in the case where the aluminum compound is aluminum nitrate (see FIG. 7). However, the specific surface area of the present sample S2A after the initial heat treatment at 1000° C. for 5 hours is substantially constant when $SiO_2$ concentration is 1 mass % or more. This is considered to be due to the reduction in the total pore volume associated with the drying treatment of the sol solution as in the case where the aluminum compound is aluminum nitrate.

Third Embodiment

Hereinafter, the third embodiment of the present synthesis method (the third synthesis method) will be described.

[11] Basic Structure of the Third Synthesis Method

Figure 22:
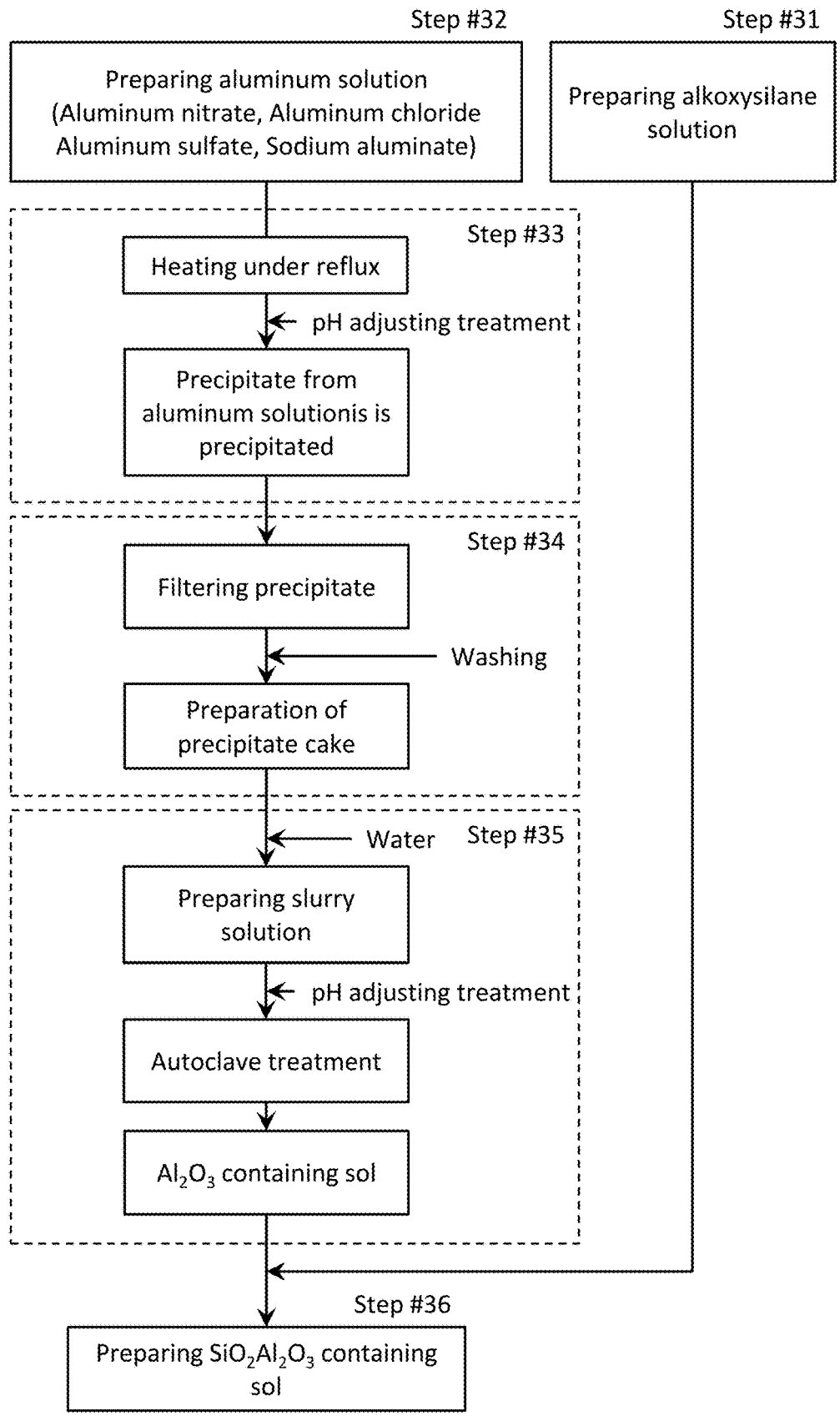
FIG. 22 is a process transition diagram showing an outline of a method for synthesizing $SiO_2Al_2O_3$ containing sol solution according to the third embodiment (the third synthesis method).

As shown in the process transition diagram of FIG. 22, the third synthesis method is roughly divided into the following Steps #31 to #36. In the third synthesis method, in Step #36, the alkoxysilane solution prepared in Step #31 is directly added to $Al_2O_3$ containing sol solution without silica added ($SiO_2$ concentration: 0 mass %) synthesized through Steps #32 to #35, and thereby $SiO_2Al_2O_3$ containing sol solution is synthesized.

In the third synthesis method, unlike the first and second synthesis methods, which are the first AC method in which $SiO_2Al_2O_3$ containing sol solution is synthesized after the autoclave treatment, $Al_2O_3$ containing sol solution without silica added is synthesized after the autoclave treatment in Step #35.

Hereinafter, as in the third synthesis method, a synthesis method of preparing $Al_2O_3$ containing sol solution without silica added by the autoclave treatment and then synthesizing $SiO_2Al_2O_3$ containing sol solution is referred to as the second AC (autoclave) method.

In Step #31, an alkoxysilane solution containing an alkoxysilane, water, an alcohol, and an inorganic acid is prepared, and in Step #32, an aluminum solution containing an aluminum compound selected from among aluminum nitrate, sodium aluminate, aluminum chloride, and aluminum sulfate and water is prepared. Since the alkoxysilane solution obtained in Step #31 is used in Step #36, Step #31 may be performed by no later than Step #36.

In Step #33, the precipitate of aluminum hydroxide without the silicon compound adsorbed is precipitated from the aluminum solution without preparing a mixed solution of the alkoxysilane solution and the aluminum solution. Therefore, Step #33 is significantly different from Steps #13 and #23 of precipitating the precipitate with the silicon compound adsorbed on the aluminum hydroxide of the first and second synthesis methods.

Subsequently, in Step #34, the precipitate obtained in Step #33 is filtered from the aluminum solution, and the filtered precipitate is washed with water to prepare a precipitate cake.

Subsequently, in Step #35, water is added to the precipitate cake obtained in Step #34 to prepare a slurry solution, and the slurry solution is subjected to a pH adjusting treatment, followed by the autoclave treatment to prepare $Al_2O_3$ containing sol solution without silica added. By the autoclave treatment, aluminum hydroxide in the slurry solution is partially dehydrated to produce boehmite, and $Al_2O_3$ containing sol solution in which the boehmite particles are present in highly dispersed form as sol particles is prepared.

Subsequently, in Step #36, the alkoxysilane solution prepared in Step #31 is mixed with $Al_2O_3$ containing sol solution prepared in Step #35, and the mixture is stirred to prepare $SiO_2Al_2O_3$ containing sol solution. Consequently, $SiO_2Al_2O_3$ containing sol solution, in which sol particles with silica particles adsorbed on boehmite particles are present in highly dispersed form, is synthesized.

Step #31 is the same as Steps #11 and #21 of the first and second synthesis methods, and Step #32 is the same as Steps #12 and #22 of the first and second synthesis methods. Step #34 is the same as Steps #14 and #24 of the first and second synthesis methods except that silica is not present in the precipitate cake. Therefore, descriptions that overlap with the first and second synthesis methods will be omitted.

Step #35 is the same as Steps #15 and #25 of the first and second synthesis methods in that water is added to the precipitate cake obtained in Step #34 to prepare a slurry solution, and the slurry solution is subjected to the pH adjusting treatment, followed by the autoclave treatment to prepare $Al_2O_3$ containing sol solution except that silica is not present in the prepared sol solution. In addition, it is also the same as Steps #15 and #25 of the first and second synthesis methods in that boehmite particles are present in a highly dispersed form as sol particles in the prepared $Al_2O_3$ containing sol solution except that silica is not bonded to the boehmite particles.

In an implementation of Step #33, the aluminum solution is heated under reflux, and then subjected to a pH adjusting treatment with nitric acid being added dropwise, and then mixed. Hydrolysis of the aluminum solutions proceeds by the heating under reflux and pH adjustment, and precipitates of aluminum hydroxide are precipitated.

In one implementation of Step #35, the amount of water added to the precipitate cake is adjusted to control sol solution concentration (mass %), which indicates a content of $Al_2O_3$ relative to the total mass of $Al_2O_3$ containing sol solution after synthesis, to be equal to or less than the specific concentration so that the solution state after the autoclave treatment is a sol state, and the pH adjusting treatment is performed on the slurry solution to control pH value of the slurry solution to be within a specific pH range so that the solution state after the autoclave treatment is a sol state.

In the present embodiment, in order to set the total mass of $Al_2O_3$ containing sol solution without silica added to be a constant value with respect to the internal capacity of the autoclave used for the autoclave treatment, the sol solution concentration is controlled by adjusting the charge-in quantity of the aluminum compound in Step #32 and the amount of water added to the precipitate cake in Step #35.

The specific concentration in Step #35 is a specific concentration at $SiO_2$ concentration of 0 mass % (no silica added) in Step #15 of the first synthesis method, or a specific concentration at $SiO_2$ concentration of 0 mass % in Step #25 of the second synthesis method, depending on the aluminum compound used. The specific pH range in Step #35 is a specific pH range at $SiO_2$ concentration of 0 mass % in Step #15 of the first synthesis method or a specific pH range at $SiO_2$ concentration of 0 mass % in Step #25 of the second synthesis method, depending on the aluminum compound used. Therefore, in the third synthesis method, in Step #35, unlike the first and second synthesis methods, the setting of the sol solution concentration and the pH adjusting treatment on the slurry solution can be easily performed without being constrained by $SiO_2$ concentration. In other words, in the second AC method, the autoclave treatment can be performed under the condition at $SiO_2$ concentration of 0 mass % in which the specific concentration is the highest and the specific pH range is the widest (see FIGS. 3, 4, 16, and 17), regardless of the aluminum compound to be used, so that the preparation of $SiO_2Al_2O_3$ containing sol solution in which the solution state becomes the sol is easier than in the first AC method, and further, the preparation of $SiO_2Al_2O_3$ containing sol solution with high sol solution concentration is enabled.

The first AC method was divided into the first synthesis method and the second synthesis method by the aluminum compound, and Step #13 of the first synthesis method and Step #23 of the second synthesis method were slightly different in some treatments (heating under reflux and pH adjustment). On the other hand, in the second AC method, since there is no step of preparing a mixed solution of the alkoxysilane solution and the aluminum solution in Step #33 corresponding to Steps #13 and #23, Step #33 has the same processing content regardless of whether the aluminum compound is aluminum nitrate, aluminum chloride, aluminum sulfate, or sodium aluminate.

Examples of the Third Synthesis Method

Hereinafter, examples of Steps #31 to #35 for synthesizing $SiO_2Al_2O_3$ containing sol solution having $SiO_2$ concentration of 1 mass % will be described. However, descriptions that overlap with the examples of the first and second synthesis methods will be omitted as appropriate.

Hereinafter, Example 5 using aluminum nitrate as the aluminum compound will be described.

In Step #31, a clear and uniform 5.88% TEOS solution (alkoxysilane solution) was obtained using the same procedure as Step #11 of Example 1. In Step #32, an aluminum nitrate aqueous solution (aluminum solution) was obtained using the same procedure as Step #12 of Example 1. However, in Step #32, it is preferable that the amount of water added to the aluminum solution is increased by the same amount as TEOS solution added in Step #13 of Example 1 from the amount of water in Step #12 of Example 1. Thus, the total amount of the aluminum solution at the time of precipitation in Step #33 is the same as the total amount of the mixed solution at the time of precipitation in Step #13 of Example 1.

In Step #33, the heating under reflux and the pH adjustment are performed on the aluminum nitrate aqueous solution obtained in Step #32 in the same manner as in Step #13 of Example 1 without adding 5.88% TEOS solution, and precipitates of aluminum hydroxide were precipitated in the aluminum nitrate aqueous solution.

In Step #34, a precipitate cake was obtained using the same procedure as Step #14 of Example 1. Subsequently, in Step #35, 0% $SiO_2Al_2O_3$ containing sol solution without silica added ($Al_2O_3$ containing sol solution) was obtained using the same procedure as Step #15 of Example 1.

The total amount of $Al_2O_3$ containing sol solution obtained in Step #35 is 80 g, and the amount of $Al_2O_3$ powder obtained by drying this sol solution is 1.98 g. The sol solution concentration of a total amount 80 g of the sol solution containing 1.98 g of $Al_2O_3$ powder is 2.475 mass %.

Subsequently, in Step #36, 1.18 g of 5.88% TEOS solution prepared in Step #31 was mixed with $Al_2O_3$ containing sol solution obtained in Step #35, and then the mixture was stirred at room temperature for 5 minutes to synthesize $SiO_2Al_2O_3$ containing sol solution having $SiO_2$ concentration of 1 mass % and sol solution concentration of 2.46 mass % (1% $SiO_2Al_2O_3$ 2.46% sol). The $SiO_2$ concentration can be adjusted by the additive amount of TEOS solution. When TEOS solution was added to $Al_2O_3$ containing sol solution, the solution remained in the sol state, and no precipitation or gelation was observed.

As described above, Example 5 in which aluminum nitrate is used as the aluminum compound has been described with reference to Example 1 of the first synthesis method. In Example 6 in which sodium aluminate is used as the aluminum compound, in Step #33, the heating under reflux and the pH adjustment are performed on the sodium aluminate aqueous solution obtained in Step #32 using the same procedure as Step #23 in Example 4 without adding 5.88% TEOS solution, and precipitates of aluminum hydroxide are precipitated in the sodium aluminate aqueous solution, and 1% $SiO_2Al_2O_3$ containing sol solution can be synthesized using the same procedure based on Example 4 of the second synthesis method.

Also in the case of Example 6, as in Example 5, in Step #32, it is preferable to increase the amount of water added to the aluminum solution by the same amount as TEOS solution added in Step #23 of Example 2 from the amount of water in Step #22 of Example 2 so that the total amount of the aluminum solution at the time of the precipitation in Step #33 is the same as the total amount of the mixed solution at the time of the precipitation in Step #23 of Example 2.

Furthermore, in the case of Example 6, in the pH adjusting treatment on the sodium aluminate aqueous solution in Step #33, unlike Example 5, in order to perform the pH adjustment from the base side to the acidic side using nitric acid, the target value of the pH adjustment is set to a pH7.5, which is lower than the target value pH8.0 in Step #23 of Example 4 of the second synthesis method (the first AC method), depending on the additive amount of the alkoxysilane solution. This is because, in the second synthesis method (the first AC method), a decrease in pH value is caused by the addition of the alkoxysilane solution in Step #23, but in the second synthesis method (the first AC method), since the alkoxysilane solution is not added in Step #33, the decrease in pH value does not occur.

[13] Conditions of Autoclave Treatment in the Third Synthesis Method

As the conditions of the autoclave treatment of the third synthesis method, depending on the aluminum compound to be used, the conditions of the autoclave treatment at $SiO_2$ concentration of 0 mass % in the first synthesis method or the second synthesis method can be used.

[14] Evaluation of Heat Resistance of the Third Synthesis Method (1)

The heat resistance of $SiO_2Al_2O_3$ powder obtained by drying and calcining $SiO_2Al_2O_3$ containing sol solution synthesized by the third synthesis method instead of the first synthesis method (hereinafter, collectively referred to as "present powder sample S3") was evaluated. In the following heat resistance evaluations, aluminum nitrate was used as the aluminum compound, and $SiO_2$ concentration was set to 1 mass %.

As the present powder sample S3, 1% $SiO_2Al_2O_3$ containing sol solution obtained through Step #31 to Step #36 of the third synthesis method described in Example 5 was dried at 150° C., subsequently pulverized into a powder, and the powder was calcined in the air at 1000° C. for 5 hours (initial heat treatment), so that $SiO_2Al_2O_3$ powder (present sample S3A) was prepared. In addition, a present sample S3B obtained by adding the first heat treatment at 1200° C. for 5 hours to the present sample S3A, and a present sample S3C obtained by adding the second heat treatment at 1200° C. for 30 hours to the present sample S3A were prepared.

Table 7 below shows the measurement results of the respective specific surface areas ($m^2$/g) of the present sample S3A, the present sample S3B, and the present sample S3C prepared at $SiO_2$ concentration of 1 mass %. For comparison purposes, the measurement results of the specific surface areas of the present sample S1A, the present sample S1B, and the present sample S1C prepared by the first synthesis method at $SiO_2$ concentration of 1 mass % are also shown in Table 7.

TABLE 7

| | Specific surface area ($m^2$/g) | | |
|---|---|---|---|
| Sample | (1000° C. 5 h) S3A/S1A | (1200° C. 5 h) S3B/S1B | (1200° C. 30 h) S3C/S1C |
| S3A-S3C | 138 | 26 | 17 |
| S1A-S1C | 122 | 24 | 15 |

As shown in Table 7, $SiO_2Al_2O_3$ powder (the present samples S3A to S3C) prepared from $SiO_2Al_2O_3$ containing sol solution synthesized by the third synthesis method (the second AC method) shows nearly equal specific surface area as $SiO_2Al_2O_3$ powder (the present samples S1A to S1C) prepared from $SiO_2Al_2O_3$ containing sol solution synthesized by the first synthesis method (the first AC method) under the respective heat treatment conditions, and it was found that adequate heat resistance can be obtained even when using the third synthesis method.

From the above, it was confirmed that by adding TEOS to $Al_2O_3$ containing sol solution without silica added, phenomena such as precipitation and gelation do not occur, and $SiO_2Al_2O_3$ containing sol solution can be easily synthesized.

Figure 23:
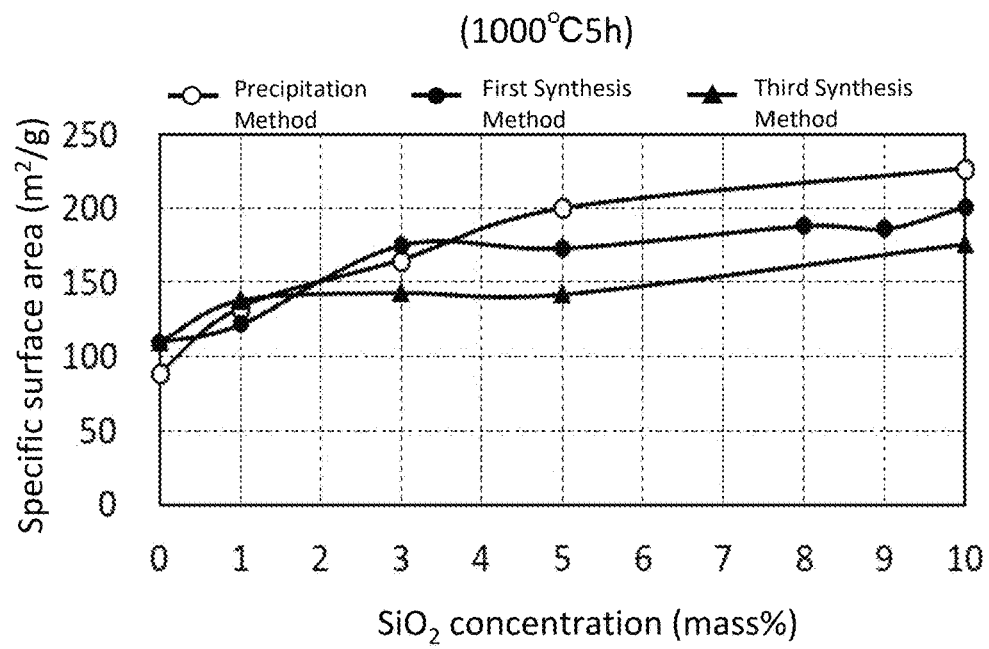
FIG. 23 is a graph showing the measurement results of the respective specific surface areas after the initial heat treatment of the present powder samples S1, the present powder samples S3, and the comparative examples C1 prepared by drying and calcining $SiO_2Al_2O_3$ containing sol solutions synthesized by the first synthesis method, the third synthesis method (Example 5), and a precipitation method, respectively.
Figure 24:
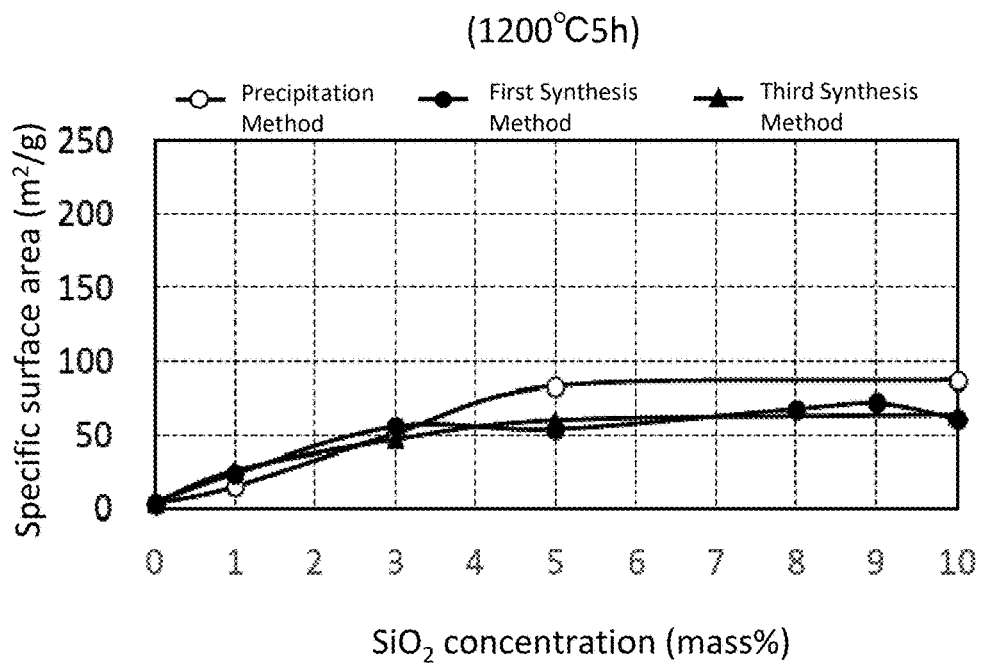
FIG. 24 is a graph showing the measurement results of the respective specific surface areas after the first heat treatment of the present powder samples S1, the present powder samples S3, and the comparative examples C1 prepared by drying and calcining $SiO_2Al_2O_3$ containing sol solutions synthesized by the first synthesis method, the third synthesis method (Example 5), and a precipitation method, respectively.
Figure 25:
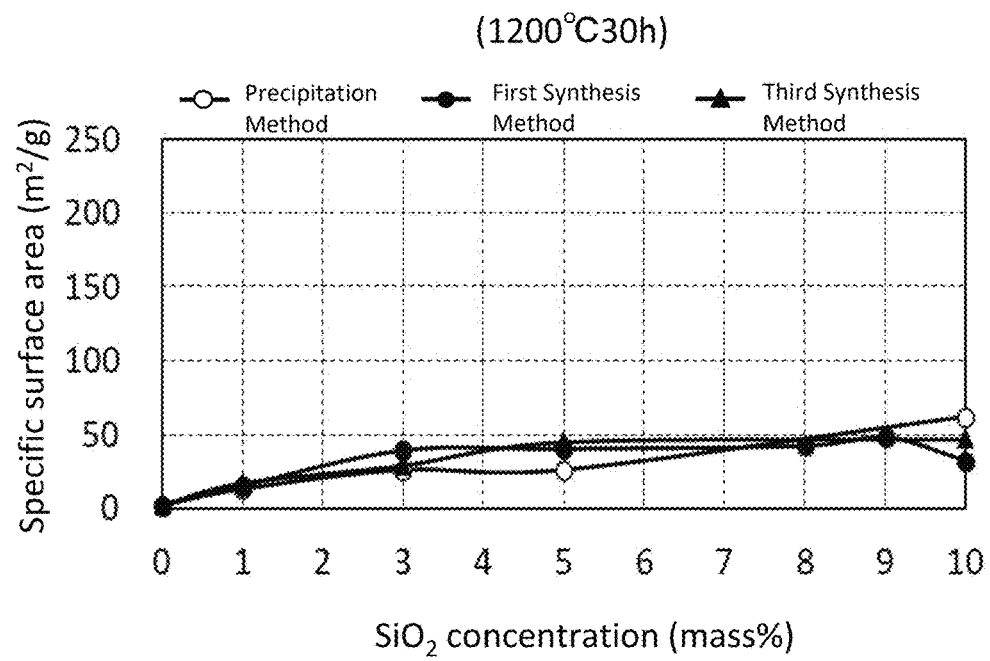
FIG. 25 is a graph showing the measurement results of the respective specific surface areas after the second heat treatment of the present powder samples S1, the present powder samples S3, and the comparative examples C1 prepared by drying and calcining $SiO_2Al_2O_3$ containing sol solutions synthesized by the first synthesis method, the third synthesis method (Example 5), and a precipitation method, respectively.

Next, as the present powder sample S3, using aluminum nitrate for the aluminum compound, in addition to the present samples S3A to S3C having $SiO_2$ concentration of 1 mass %, the present samples S3A to S3C prepared by changing the $SiO_2$ concentration in five ways: 0 mass %, 3 mass %, 5 mass %, and 10 mass % (initial heat treatment, first heat treatment, second heat treatment) were added, and the measurement results of the respective specific surface areas ($m^2$/g) of the present samples S3A, the present samples S3B, and the present samples S3C having the respective $SiO_2$ concentrations were shown in FIGS. 23 to 25 for each heat treatment. For comparison purposes, the measurement results of the respective specific surface areas of the present samples S1A, the present samples S1B, and the present samples S1C having $SiO_2$ concentrations of 0 mass %, 1 mass %, 3 mass %, 5 mass %, 8 mass %, 9 mass %, and 10 mass % produced by the first synthesis method using aluminum nitrate as the aluminum compound, and the measurement results of the respective specific surface areas of the comparative samples C1A, the comparative samples C1B, and the comparative samples C1C having $SiO_2$ concentrations of 0 mass %, 1 mass %, 3 mass %, 5 mass %, and 10 mass % produced by the precipitation method using aluminum nitrate as the aluminum compound are also shown in FIGS. 23 to 25 for each heat treatment.

Figure 26:
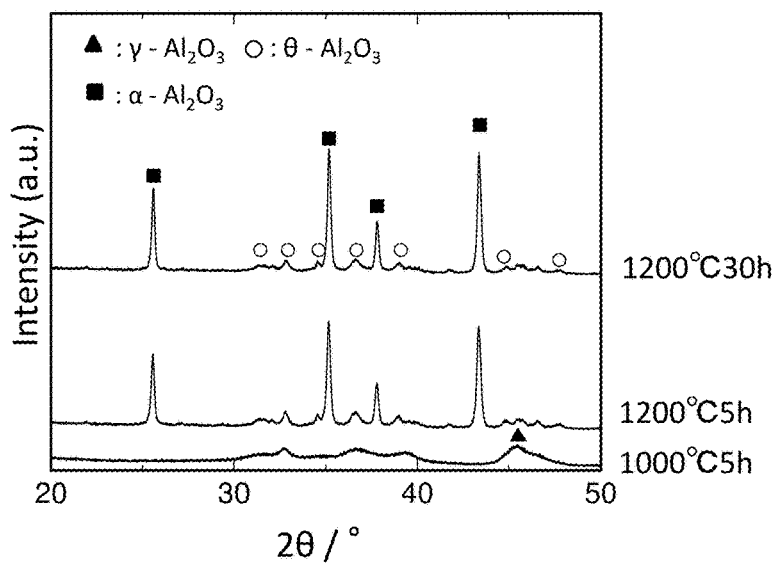
FIG. 26 is an XRD pattern diagram showing the crystal structures after the initial heat treatment, the first heat treatment, and the second heat treatment of the present powder samples S3 having $SiO_2$ concentration of 1 mass % prepared by drying and calcining $SiO_2Al_2O_3$ containing sol solution synthesized by the third synthesis method (Example 5).

Furthermore, FIG. 26 shows XRD patterns showing the crystal structure after the respective heat treatments in the present sample S3A, the present sample S3B, and the present sample S3C, each having $SiO_2$ concentration of 1 mass %. Incidentally, XRD patterns showing the crystalline structure after the respective heat treatments in the present sample S1A, the present sample S1B, and the present sample SIC, which are prepared by the first synthesis method and have $SiO_2$ concentration of 1 mass %, and the comparative sample C1A, the comparative sample C1B, and the comparative sample C1C, which are prepared by the precipitation method and have $SiO_2$ concentration of 1 mass %, are shown in FIGS. 9 and 10.

As shown in FIGS. 23 to 25, it was found that in $SiO_2Al_2O_3$ powders (the present samples S3A to S3C) prepared from $SiO_2Al_2O_3$ containing sol solution synthesized by the third synthesis method (the second AC method), even when $SiO_2$ concentration increased to 10 mass %, the specific surface area hardly increased under the respective heat treatment conditions, similar to $SiO_2Al_2O_3$ powders (the present samples S1A to S1C) prepared from $SiO_2Al_2O_3$ containing sol solution synthesized by the first synthesis method (the first AC method). It is considered that this is because the total pore volume of $Al_2O_3$ was reduced by the surface tension of water in the process of forming the gel by drying the sol solution as described above in the explanation of Table 3.

As shown in FIG. 26, $SiO_2Al_2O_3$ powder (the present sample S3C) produced by the third synthesis method (the second AC method) has a θ-$Al_2O_3$ even after the second heat treatment (1200° C., 30 hours), and it turns out that the phase transition completely to the α phase did not occur. From this, it was confirmed that even when the third synthesis method (the second AC method) was used, the same heat resistance as the first synthesis method (the first AC method) was obtained.

[15] Evaluation of Heat Resistance of the Third Synthesis Method (2)

The heat resistance of $SiO_2Al_2O_3$ powder obtained by drying and calcining $SiO_2Al_2O_3$ containing sol solution synthesized by the third synthesis method using sodium aluminate as the aluminum compound instead of the second synthesis method (hereinafter, collectively referred to as "present powder sample S4") was evaluated. In the following heat resistance evaluations, $SiO_2$ concentration was set to 5 mass % and 10 mass %.

As the present powder sample S4, $SiO_2Al_2O_3$ containing sol solutions having $SiO_2$ concentration of 5 mass % and 10 mass % obtained through Step #31 to Step #36 of Example 6 of the third synthesis method were dried at 150° C. and subsequently pulverized into powders, and the powders were calcined in the air at 1000° C. for 5 hours (initial heat treatment), so that $SiO_2Al_2O_3$ powders (present samples S4A) were prepared. In addition, present samples S4B obtained by adding the first heat treatment at 1200° C. for 5 hours to the present samples S4A, and present samples S4C obtained by adding the second heat treatment at 1200° C. for 30 hours to the present samples S4A were prepared.

Tables 8 below shows the measurement results of the respective specific surface areas (m²/g) of the present samples S4A to S4C prepared at $SiO_2$ concentration of 5 mass % and 10 mass %. For comparison purposes, the measurement results of the respective specific surface areas of the present samples S2A to S2C having $SiO_2$ concentration of 5 mass % prepared by the second synthesis method (the first AC method) and the measurement results of the respective specific surface areas of the comparative samples C2A to C2C having $SiO_2$ concentration of 5 mass % and 10 mass % prepared by the precipitation method are also shown in Table 8.

TABLE 8

| $SiO_2$ concentration | Sample | Specific surface area (m²/g) | | |
|---|---|---|---|---|
| | | (1000° C. 5 h) S4A/S2A/C2A | (1200° C. 5 h) S4B/S2B/C2B | (1200° C. 30 h) S4C/S2C/C2C |
| 5 mass % | S4A-S4C | 177 | 54 | 55 |
| | S2A-S2C | 145 | 49 | 26 |
| | C2A-C2C | 180 | 75 | 52 |
| 10 mass % | S4A-S4C | 206 | 80 | 56 |
| | S2A-S2C | NA | NA | NA |
| | C2A-C2C | 232 | 62 | 44 |

First, as shown in Table 8, when $SiO_2$ concentration is 5 mass %, the present samples S4A to S4C synthesized by the third synthesis method show nearly equal specific surface areas as the present samples S2A to S2C synthesized by the second synthesis method and the comparative samples C2A to C2C synthesized by the precipitation method, and when $SiO_2$ concentration is 10 mass %, the present samples S4A to S4C synthesized by the third synthesis method show nearly equal specific surface areas as the comparative samples C2A to C2C synthesized by the precipitation method. From this, it was found that when the third synthesis method is used, sufficient heat resistance can be obtained even when sodium aluminate is used as the aluminum compound.

Furthermore, from the measurement results shown in Table 8, when using sodium aluminate as the aluminum compound, the upper limit of $SiO_2$ concentration was 5 mass % in the second synthesis method of the present samples S2A to S2C, as shown in FIG. 16, whereas it was found that $SiO_2$ concentration can be increased to 10 mass % by using the third synthesis method as in the present samples S4A to S4C.

Figure 27:
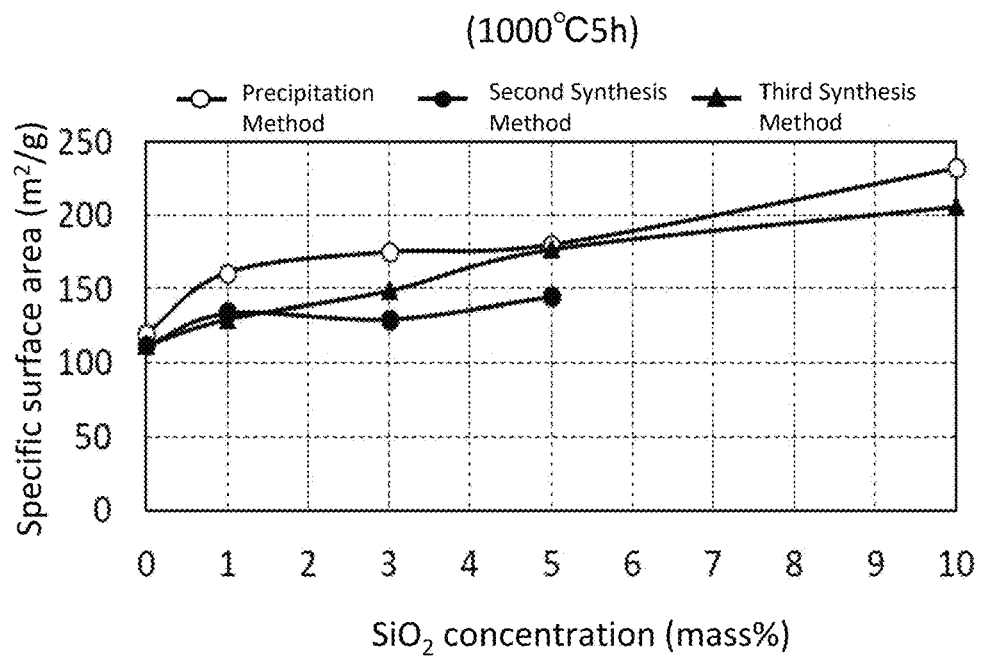
FIG. 27 is a graph showing the measurement results of the respective specific surface areas after the initial heat treatment of the present powder samples S2, the present powder samples S4, and the comparative examples C2 prepared by drying and calcining $SiO_2Al_2O_3$ containing sol solutions synthesized by the second synthesis method, the third synthesis method (Example 6), and a precipitation method, respectively.
Figure 28:
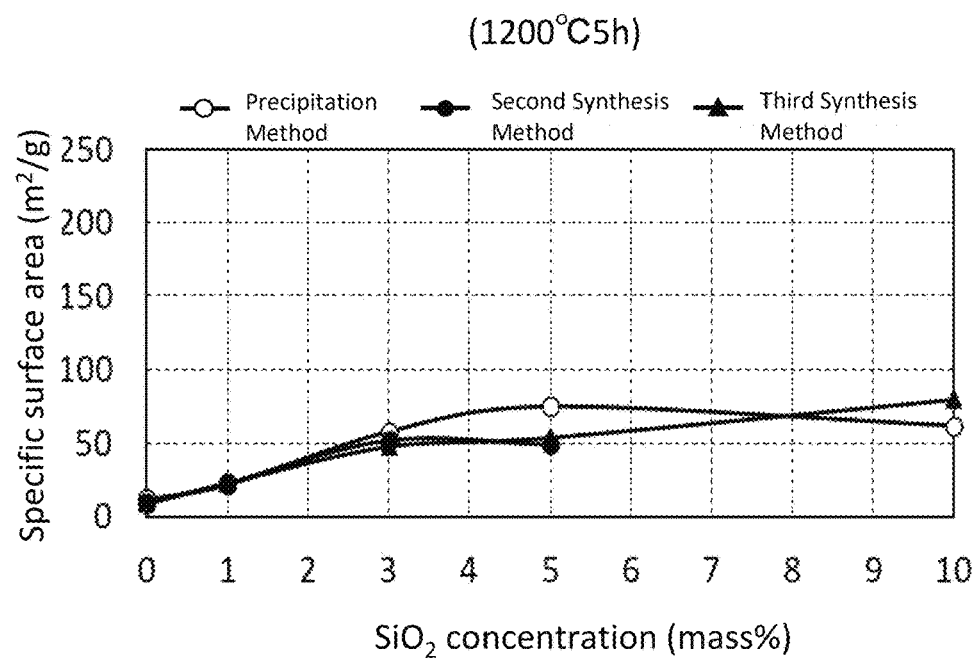
FIG. 28 is a graph showing the measurement results of the respective specific surface areas after the first heat treatment of the present powder samples S2, the present powder samples S4, and the comparative examples C2 prepared by drying and calcining $SiO_2Al_2O_3$ containing sol solutions synthesized by the second synthesis method, the third synthesis method (Example 6), and a precipitation method, respectively.
Figure 29:
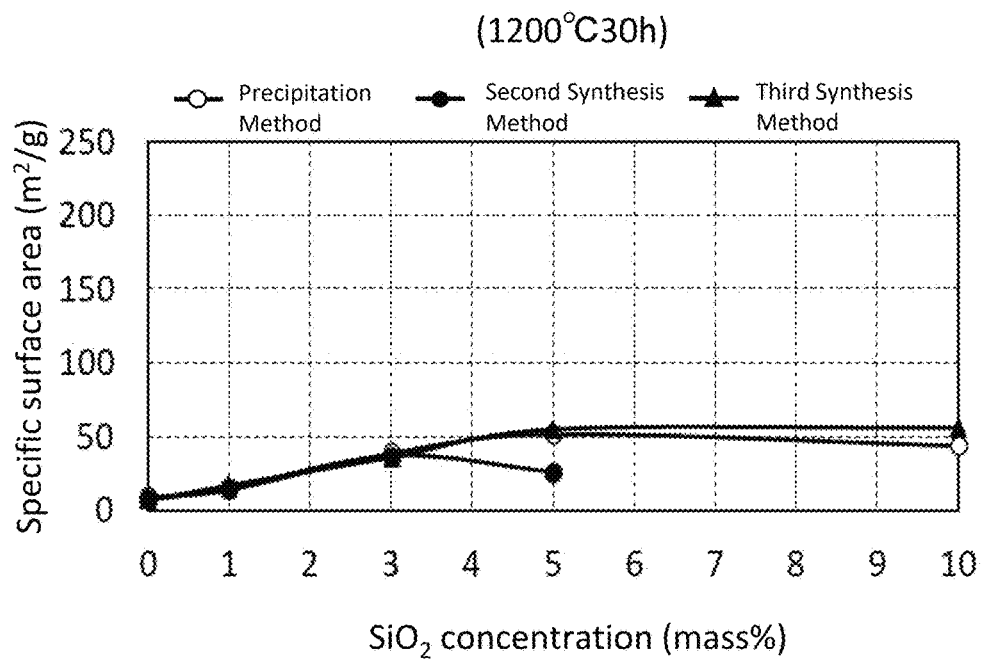
FIG. 29 is a graph showing the measurement results of the respective specific surface areas after the second heat treatment of the present powder samples S2, the present powder samples S4, and the comparative examples C2 prepared by drying and calcining $SiO_2Al_2O_3$ containing sol solutions synthesized by the second synthesis method, the third synthesis method (Example 6), and a precipitation method, respectively.

Next, as the present powder sample S4, using sodium aluminate for the aluminum compound, in addition to the present samples S4A to S4C having $SiO_2$ concentration of 1 mass %, the present samples S4A to S4C prepared by changing the $SiO_2$ concentration in five ways: 0 mass %, 3 mass %, 5 mass %, and 10 mass % (initial heat treatment, first heat treatment, second heat treatment) were added, and the measurement results of the respective specific surface areas (m²/g) of the present samples S4A, the present samples S4B, and the present samples S4C having the respective $SiO_2$ concentrations were shown in FIGS. 27 to 29 for each heat treatment. For comparison purposes, the measurement results of the respective specific surface areas of the present samples S2A, the present samples S2B, and the present samples S2C having $SiO_2$ concentrations of 0 mass %, 1 mass %, 3 mass %, and 5 mass % produced by the second synthesis method using sodium aluminate as the aluminum compound, and the measurement results of the respective specific surface areas of the comparative samples C2A, the comparative samples C2B, and the comparative samples C2C having $SiO_2$ concentrations of 0 mass %, 1 mass %, 3 mass %, 5 mass %, and 10 mass % produced by the precipitation method using sodium aluminate as the aluminum compound are also shown in FIGS. 27 to 29 for each heat treatment.

Figure 30:
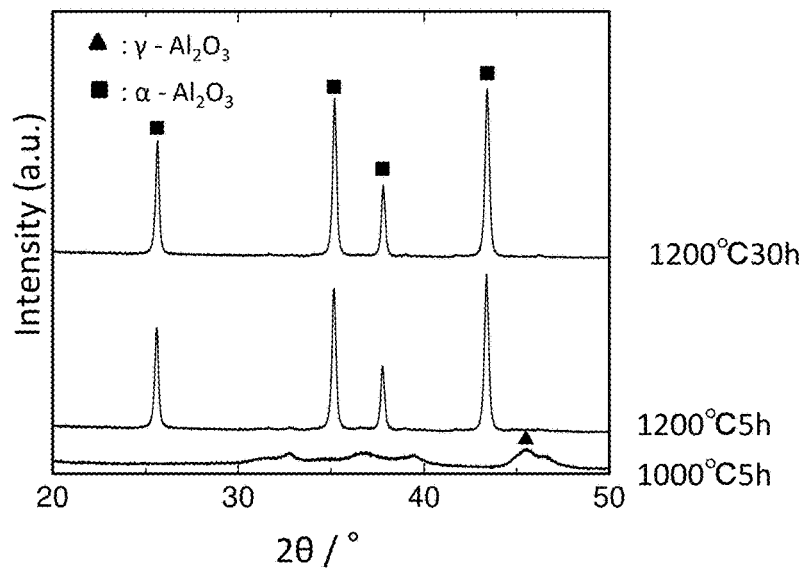
FIG. 30 is an XRD pattern diagram showing the crystal structures after the initial heat treatment, the first heat treatment, and the second heat treatment of the present powder samples S4 having $SiO_2$ concentration of 1 mass % prepared by drying and calcining $SiO_2Al_2O_3$ containing sol solution synthesized by the third synthesis method (Example 6).

Furthermore, FIG. 30 shows XRD patterns showing the crystal structure after the respective heat treatments in the present sample S4A, the present sample S4B, and the present sample S4C, each having $SiO_2$ concentration of 1 mass %. Incidentally, XRD patterns showing the crystal structure after the respective heat treatments in the present sample S2A, the present sample S2B, and the present sample S2C, which are prepared by the second synthesis method and have $SiO_2$ concentration of 1 mass %, and the comparative sample C2A, the comparative sample C2B, and the comparative sample C2C, which are prepared by the precipitation method and have $SiO_2$ concentration of 1 mass %, are shown in FIGS. 18 and 19.

As shown in FIGS. 27 to 29, even when sodium aluminate is used as the aluminum compound, $SiO_2Al_2O_3$ powder prepared from $SiO_2Al_2O_3$ containing sol solution synthesized by the third synthesis method (the second AC method) exhibits substantially the same heat resistance as that obtained when aluminum nitrate is used as the aluminum compound.

Furthermore, as shown in FIG. 30, in the XRD patterns of $SiO_2Al_2O_3$ powders (S4A to S4C) produced by the third synthesis method (the second AC method), the same peaks as the XRD patterns of the comparative samples (C2A to C2C) produced by the precipitation method can be confirmed. From this, it was confirmed that the same heat resistance as that of the precipitation method and the first synthesis method (the first AC method) was obtained even when the third synthesis method (the second AC method) was used.

Fourth Embodiment

Hereinafter, the fourth embodiment of the present synthesis method (the fourth synthesis method) will be described.

[16] Basic Structure and Examples of the Fourth Synthesis Method

Figure 31:
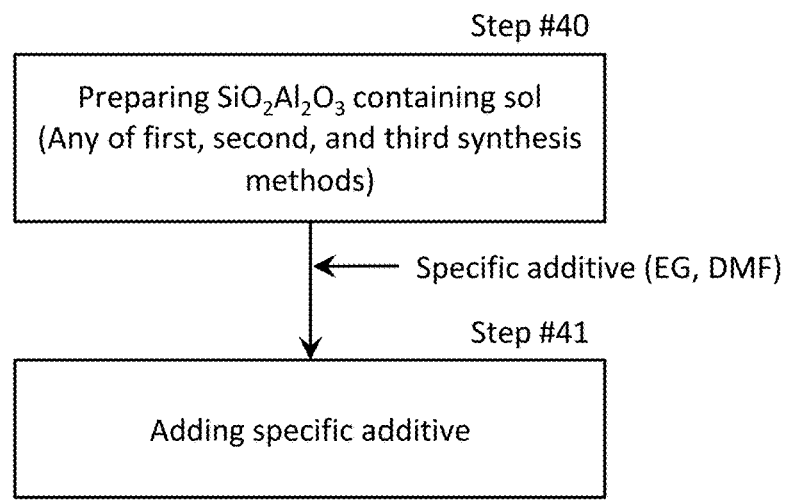
FIG. 31 is a process transition diagram showing an outline of a method for synthesizing $SiO_2Al_2O_3$ containing sol solution according to the fourth embodiment (the fourth synthesis method).

As shown in the process transition diagram of FIG. 31, the fourth synthesis method includes Step #41 of adding an organic solvent having a boiling point higher than that of water and a surface tension lower than that of water (hereinafter, appropriately referred to as "specific additive") to $SiO_2Al_2O_3$ containing sol solution synthesized by any one of the first, second, and third synthesis methods (Step #40) as a post-treatment to any one of these synthesis methods.

As described above in "[4] Evaluation of heat resistance of the first synthesis method (1)", Step #41 of the fourth synthesis method is provided as the countermeasure against the reduction in the total pore volume of $Al_2O_3$, which is caused by the surface tension of the water to be evaporated in the process of forming the transparent gel by drying $SiO_2Al_2O_3$ containing sol solution synthesized by any one of the first to third synthesis methods of Step #40.

In one implementation of Step #41, ethylene glycol (EG) or N,N-dimethylformamide (DMF) is preferably used as the specific additive. The surface tension of EG is 48.4 dyne/cm and the surface tension of DMF is 36.8 dyne/cm, both of which are lower than the surface tension (72.8 dyne/cm) of water.

Furthermore, as a preferred implementation of the fourth synthesis method, in Step #41, when the specific additive is added to $SiO_2Al_2O_3$ containing sol solution synthesized in any one of the first, second, and third synthesis method (Step #40), 3 mass % of the specific additive (EG or DMF) to the total amount of the sol solution after the addition of the specific additive is added and stirred, and $SiO_2Al_2O_3$ containing sol solution to which the specific additive is added is prepared.

As an example (Example 7) of the above preferred implementation of the fourth synthesis method, in Step #40, $SiO_2Al_2O_3$ containing sol solutions having $SiO_2$ concentration of 3 mass % and 10 mass % were synthesized by the first synthesis method using aluminum nitrate as the aluminum compound, and in Step #41, EG and DMF were respectively added to the synthesized sol solutions, and the mixtures were stirred to prepare four types of $SiO_2Al_2O_3$ containing sol solutions to which the specific additives were added. The sol solution concentration of Example 7, for example, was set to the same 2.5 mass % as in Example 1 of the first synthesis method. Furthermore, as another example (Example 8) of the above preferred implementation of the fourth synthesis method, in Step #41, DMF was added as the specific additive to $SiO_2Al_2O_3$ containing sol solutions having $SiO_2$ concentration of 5 mass % and 10 mass % synthesized by the third synthesis method using sodium aluminate as the aluminum compound instead of the second synthesis method, and the mixtures were stirred to prepare two types of $SiO_2Al_2O_3$ containing sol solutions with the specific additive added. The sol solution concentration of Example 8, for example, was set to the same 2.5 mass % as in above-described Example 7.

Furthermore, as another example (Example 9) of the above-described preferred implementation of the fourth synthesis method, in Step #40, 4.25 g of 5.88% TEOS solution was added to 0% $SiO_2Al_2O_3$ containing sol solution having sol solution concentration of 9 mass % prepared by the third synthesis method using aluminum nitrate as the aluminum compound instead of the first synthesis method to prepare $SiO_2Al_2O_3$ containing sol solution having $SiO_2$ concentration of 1 mass %, and then DMF was added as the specific additive to the sol solution with silica added in order to obtain adequate heat resistance, and the mixture was stirred at room temperature to prepare $SiO_2Al_2O_3$ containing sol solution with the specific additive added. By using the third synthesis method in Step #40, it was confirmed that $SiO_2Al_2O_3$ containing sol solution having high sol solution concentration can be prepared without phenomena such as precipitation and gelation.

[17] Evaluation of Heat Resistance of the Fourth Synthesis Method (1)

Four types of $SiO_2Al_2O_3$ containing sol solutions of above-mentioned Example 7 were dried at 150° C. to form dry gels, and then calcined by the first heat treatment at 1200° C. for 5 hours to prepare four types of $SiO_2Al_2O_3$ powders (hereinafter, collectively referred to as "present samples S5B"). The specific surface areas and total pore volumes of these four types of present samples S5B were measured to evaluate the heat resistance.

Table 9 below shows the measured specific surface areas ($m^2/g$) and total pore volumes ($cm^3/g$) of the four present samples S5B. Also, the specific surface areas ($m^2/g$) and total pore volumes ($cm^3/g$) of the present samples S1B and the comparative samples C1B prepared with $SiO_2$ concentration of 3 mass % and 10 mass % shown in Table 3 of the above-mentioned "[4] Evaluation of heat resistance of the first synthesis method (1)" are shown in Table 9 for comparison purposes. Incidentally, the present samples S1B are $SiO_2Al_2O_3$ powders obtained by synthesizing $SiO_2Al_2O_3$ containing sol solutions having $SiO_2$ concentration of 3 mass % and 10 mass % by the first synthesis method using aluminum nitrate as the aluminum compound, and drying the synthesized sol solutions at 150° C. without adding the specific additive and pulverizing into powdery dry gels and calcining the dry gels by the first heat treatment at 1200° C. for 5 hours. The comparative samples C1B are $SiO_2Al_2O_3$ powders obtained by drying precipitate cakes having $SiO_2$ concentration of 3 mass % and 10 mass % obtained by the precipitation method using aluminum nitrate as the aluminum compound at 150° C. and pulverizing into powdery dry gels and calcining the dry gels by the first heat treatment at 1200° C. for 5 hours.

TABLE 9

| $SiO_2$ concentration | Sample | Specific additive | Specific surface area ($m^2/g$) | Total pore volume ($cm^3/g$) |
|---|---|---|---|---|
| 3 mass % | S5B | EG | 66 | 0.1961 |
| | S5B | DMF | 61 | 0.2009 |
| | S1B | none | 56 | 0.1391 |
| | C1B | none | 51 | 0.1281 |
| 10 mass % | S5B | EG | 83 | 0.2386 |
| | S5B | DMF | 99 | 0.2970 |
| | S1B | none | 61 | 0.1275 |
| | C1B | none | 87 | 0.1813 |

As shown in Table 9, in both cases of $SiO_2$ concentration of 3 mass % and 10 mass %, by adding EG and DMF of the specific additive in Step #41, the specific surface areas and total pore volumes of the present samples S5B are increased from those of the present samples S1B synthesized without adding the specific additive. In addition, the increment increases as SiO$_2$ concentration increases.

Figure 32:
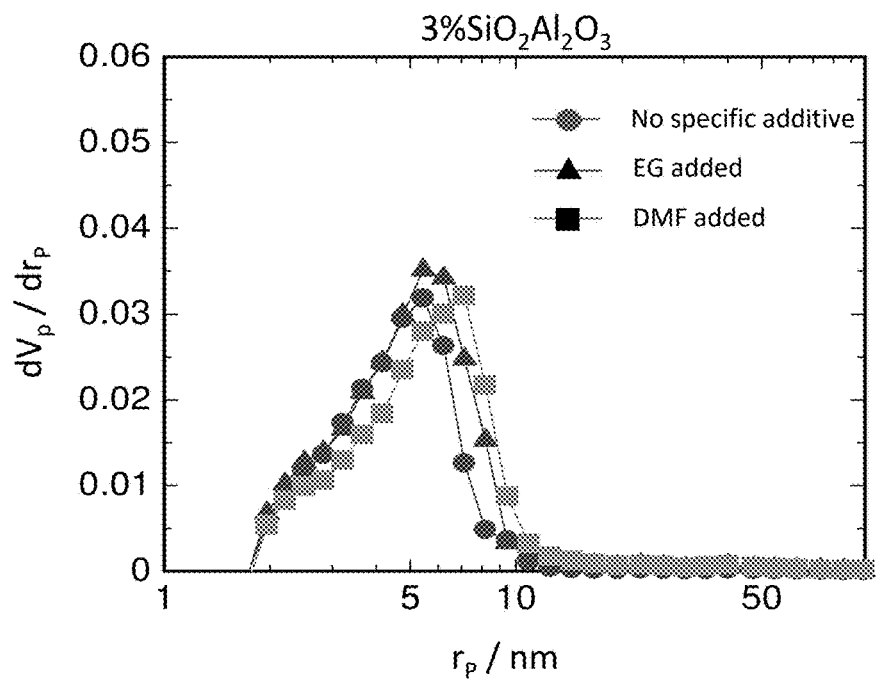
FIG. 32 is a BJH plot showing the pore distribution after the first heat treatment of the present powder samples S5 having $SiO_2$ concentration of 3 mass % in which specific additives EG and DMF are separately added, and the present powder sample S1 in which none of the specific additives is added.
Figure 33:
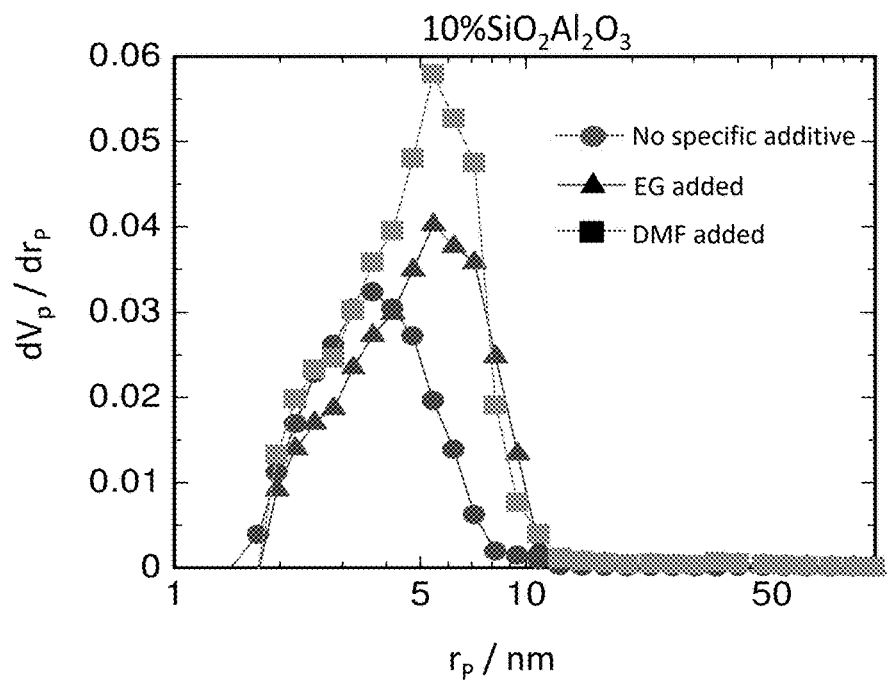
FIG. 33 is a BJH plot showing the pore distribution after the first heat treatment of the present powder samples S5 having $SiO_2$ concentration of 10 mass % in which specific additives EG and DMF are separately added, and the present powder sample S1 in which none of the specific additives is added.

FIG. 32 shows the pore distributions (BJH plots) of the two types of present samples S5B with the specific additives EG and DMF added and the present samples S1B, each having SiO$_2$ concentration of 3 mass %, and FIG. 33 shows the pore distributions (BJH plots) of the two types of present samples S5B with the specific additives EG and DMF added and the present samples S1B, each having SiO$_2$ concentration of 10 mass %. In FIGS. 32 and 33, circles (●) indicate the pore distribution of the present samples S1B (no specific additive), triangles (▲) indicate the pore distribution of the present samples S5B (EG added), squares (■) indicate the pore distribution of the present samples S5B (DMF added), the vertical axis indicates the differential pore volume dV$_p$/dr$_p$ (m$^3$/g/nm, and the horizontal axis indicates the pore diameter r$_p$ (nm).

As shown in FIGS. 32 and 33, in both cases of SiO$_2$ concentration of 3 mass % and 10 mass %, by adding EG and DMF of the specific additive in Step #41, the total pore volumes and the mode pore diameters of the present samples S5B are increased from those of the present samples S1B synthesized without adding the specific additive. When SiO$_2$ concentration was 10 mass %, the mode pore diameter of the present sample S1B without the specific additive added was 4.17 nm, whereas the mode pore diameters of the present samples S5B with EG and DMF added were expanded to 5.45 nm. From the above, it was found that adding an organic solvent having higher boiling point and lower surface tension than water is effective in suppressing the reduction of the pore volume of SiO$_2$Al$_2$O$_3$ and improving the specific surface area.

Figure 34:
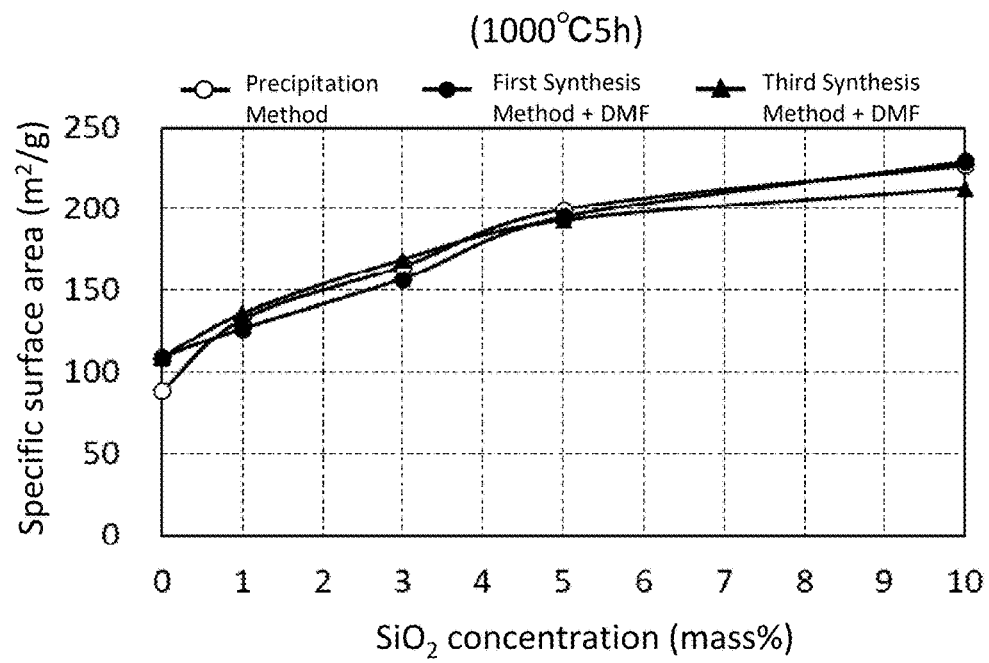
FIG. 34 is a graph showing the measurement results of the respective specific surface areas after the initial heat treatment of the present powder samples S5, the present powder samples S11, and the comparative examples C1 prepared by drying and calcining $SiO_2Al_2O_3$ containing sol solutions synthesized by the fourth synthesis method (Example 7), the fourth synthesis method (Example 9), and a precipitation method, respectively.
Figure 35:
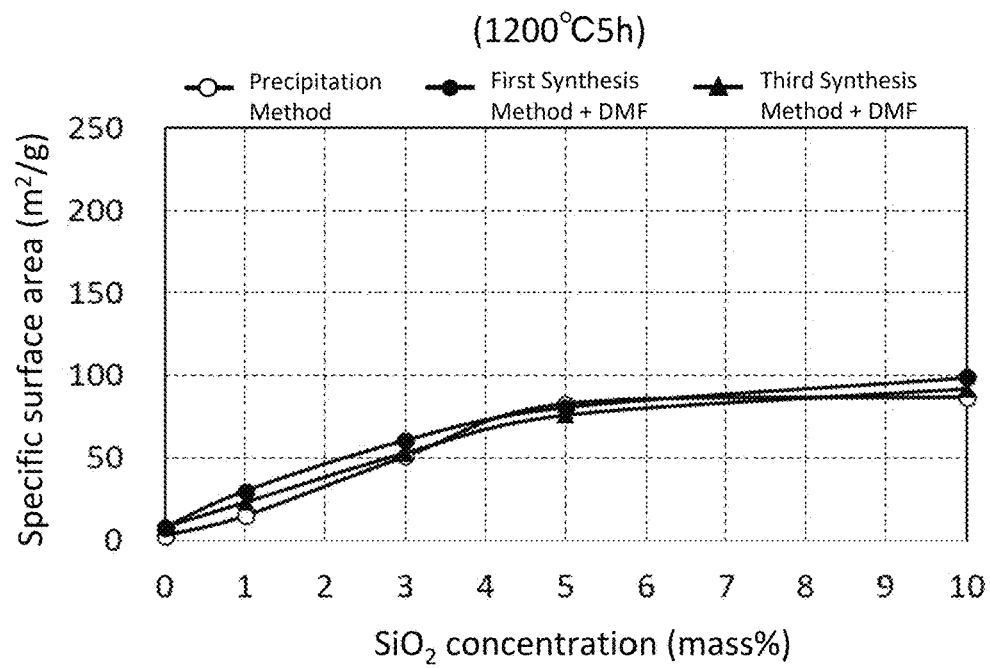
FIG. 35 is a graph showing the measurement results of the respective specific surface areas after the first heat treatment of the present powder samples S5, the present powder samples S11, and the comparative examples C1 prepared by drying and calcining $SiO_2Al_2O_3$ containing sol solutions synthesized by the fourth synthesis method (Example 7), the fourth synthesis method (Example 9), and a precipitation method, respectively.
Figure 36:
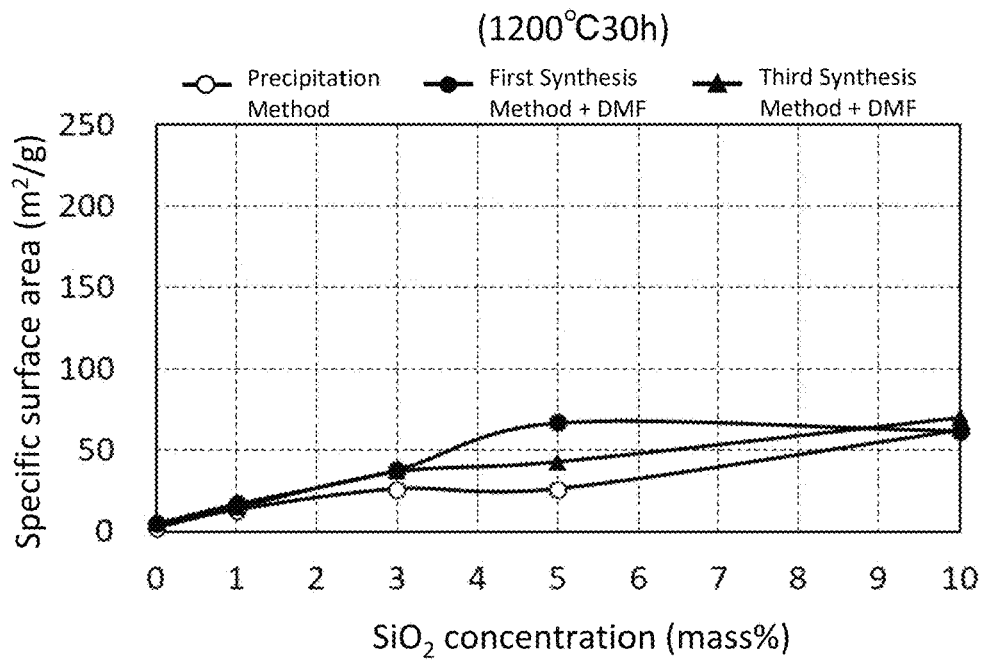
FIG. 36 is a graph showing the measurement results of the respective specific surface areas after the second heat treatment of the present powder samples S5, the present powder samples S11, and the comparative examples C1 prepared by drying and calcining $SiO_2Al_2O_3$ containing sol solutions synthesized by the fourth synthesis method (Example 7), the fourth synthesis method (Example 9), and a precipitation method, respectively.

Next, as Example 7 of the fourth synthesis method for synthesizing SiO$_2$Al$_2$O$_3$ containing sol solution by the first synthesis method using aluminum nitrate as the aluminum compound in Step #40, in addition to the four types of the present samples S5B(SiO$_2$ concentration: 3 mass %, 10 mass %), the present samples S5A to S5C with the specific additive of DMF (initial heat treatment, first heat treatment, second heat treatment) were prepared by changing the SiO$_2$ concentration to 0 mass %, 1 mass %, and 5 mass %. FIG. 34 to FIG. 36 show the measurement results of the specific surface areas (m$^2$/g) of the present samples S5A, the present samples S5B, and the present samples S5C at the respective SiO$_2$ concentrations for each heat treatment. Furthermore, as Example 9 of the fourth synthesis method for synthesizing SiO$_2$Al$_2$O$_3$ containing sol solution by the third synthesis method using aluminum nitrate as the aluminum compound in Step #40, SiO$_2$Al$_2$O$_3$ containing sol solutions were prepared by changing the SiO$_2$ concentration to 0 mass %, 3 mass %, 5 mass %, and 10 mass % in addition to SiO$_2$ concentration of 1 mass %, and DMF was added to the prepared sol solutions as the specific additive, and by stirring the mixture at room temperature, SiO$_2$Al$_2$O$_3$ containing sol solutions with the specific additive added were prepared and then subjected to calcination at 1000° C. for 5 hours (initial heat treatment) to produce SiO$_2$Al$_2$O$_3$ powders (present samples S5aA). In addition, present samples S5aB obtained by adding the first heat treatment at 1200° C. for 5 hours to the present samples S5aA, and present samples S5aC obtained by adding the second heat treatment at 1200° C. for 30 hours to the present samples S5aA were prepared. In FIGS. 34 to 36, the measurement results of the specific surface areas (m$^2$/g) of the present samples S5aA, the present samples S5a B, and the present samples S5a C at the respective SiO$_2$ concentrations are also described for each heat treatment. Furthermore, for comparison purposes, the measurement results of the respective specific surface areas of the comparative samples CIA, the comparative samples C1B, and the comparative samples CIC having SiO$_2$ concentrations of 0 mass %, 1 mass %, 3 mass %, 5 mass %, and 10 mass % produced by the precipitation method using aluminum nitrate as the aluminum compound are also shown in FIGS. 34 to 36 for each heat treatment . . .

As shown in FIGS. 34 to 36, even when either the first synthesis method or the third synthesis method is used in Step #40 of the fourth synthesis method, a specific surface area equivalent to that of the precipitation method can be obtained by adding the specific additive in Step #41 to SiO$_2$Al$_2$O$_3$ containing sol solution synthesized in Step #40.

[18] Evaluation of Heat Resistance of the Fourth Synthesis Method (2)

Two types of SiO$_2$Al$_2$O$_3$ containing sol solutions of above-mentioned Example 8 were dried and calcined in the same manner as above-mentioned "[17] Evaluation of heat resistance of the fourth synthesis method (1)" to prepare two types of SiO$_2$Al$_2$O$_3$ powders (hereinafter, collectively referred to as "the present powder sample S6"), and the heat resistances of these two types of the present powder samples S6 were evaluated.

As the present powder sample S6, two types of SiO$_2$Al$_2$O$_3$ containing sol solutions having SiO$_2$ concentration of 5 mass % and 10 mass % obtained through Step #40 (Steps #31 to Step #36 of Example 6 of the third synthesis method) and Step #41 of the fourth synthesis method were dried at 150° C. and subsequently pulverized into powders, and the powders were calcined in the air at 1000° C. for 5 hours (initial heat treatment), so that SiO$_2$Al$_2$O$_3$ powders (present samples S6A) were prepared. In addition, present samples S6B obtained by adding the first heat treatment at 1200° C. for 5 hours to the present samples S6A, and present samples S6C obtained by adding the second heat treatment at 1200° C. for 30 hours to the present samples S6A were prepared.

Table 10 below shows the measurement results of the specific surface areas (m$^2$/g) of the present samples S6A, the present samples S6B, and the present samples S6C prepared at SiO$_2$ concentration of 5 mass % and 10 mass %. For comparison purposes, the measurement results of the respective specific surface areas (m$^2$/g) of the present samples S4A to S4C having SiO$_2$ concentration of 5 mass % and 10 mass %, the measurement results of the respective specific surface areas of the present samples S2A to S2C having SiO$_2$ concentration of 5 mass % prepared by the second synthesis method, and the measurement results of the respective specific surface areas of the comparative samples C2A to C2C having SiO$_2$ concentration of 5 mass % and 10 mass % prepared by the precipitation method, which are already shown in Table 8, are also shown in Table 10.

TABLE 10

| SiO$_2$ concentration | Sample | Specific additive | Specific surface area (m$^2$/g) | | |
|---|---|---|---|---|---|
| | | | (1000° C. 5 h) S6A/S4A/ S2A/C2A | (1200° C. 5 h) S6B/S4B/ S2B/C2B | (1200° C. 30 h) S6C/S4C/ S2C/C2C |
| 5 mass % | S6A-S6C | DMF | 189 | 66 | 63 |
| | S4A-S4C | none | 177 | 54 | 55 |
| | S2A-S2C | none | 145 | 49 | 26 |
| | C2A-C2C | none | 180 | 75 | 52 |
| 10 mass % | S6A-S6C | DMF | 217 | 76 | 66 |
| | S4A-S4C | none | 206 | 80 | 56 |
| | S2A-S2C | none | NA | NA | NA |
| | C2A-C2C | none | 232 | 62 | 44 |

As shown in Table 10, except for the present sample S6B having SiO$_2$ concentration of 5 mass %, in both cases of SiO$_2$ concentration of 5 mass % and 10 mass %, by adding DMF of the specific additive in Step #41, the specific surface areas of the present samples S6A to S6C synthesized by the third synthesis method (the second AC method) are increased from those of the present samples S4A to S4C synthesized by the same third synthesis method (the second AC method) without adding the specific additive. The specific surface area of the present sample S6B having SiO$_2$ concentration of 5 mass % is slightly lower than that of the present sample S4B synthesized by the same third composite process without adding the specific additive, but is almost the same specific surface area. From the above, it was found that, even for SiO$_2$Al$_2$O$_3$ containing sol solution synthesized by the third synthesis method, adding an organic solvent having higher boiling point and lower surface tension than water is also effective in suppressing the reduction of the pore volume of SiO$_2$Al$_2$O$_3$ and improving the specific surface area.

Figure 37:
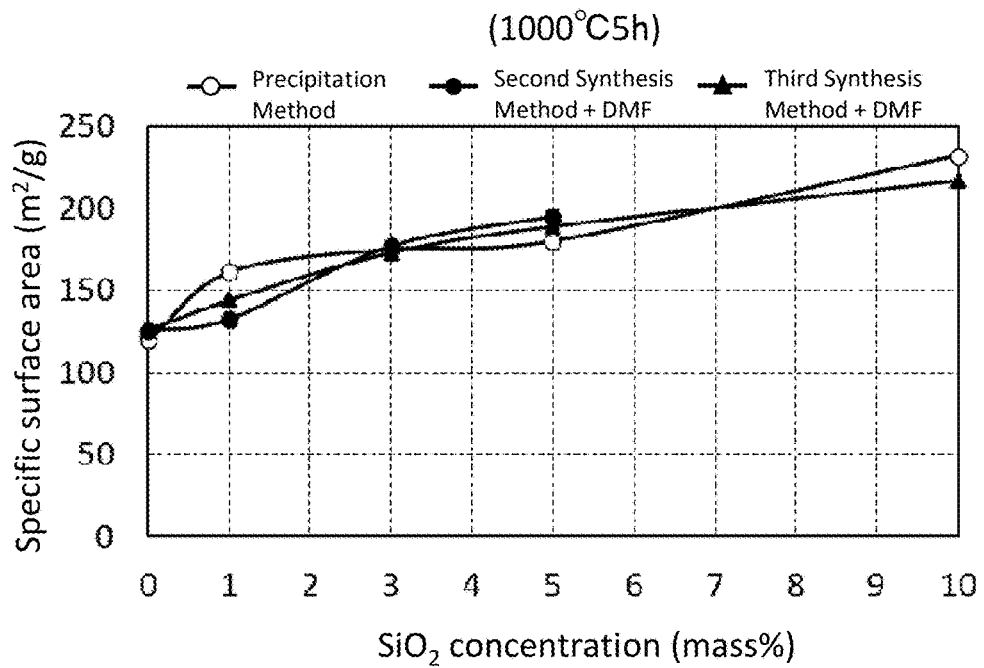
FIG. 37 is a graph showing the measurement results of the respective specific surface areas after the initial heat treatment of the present powder samples S6, the present powder samples S12, and the comparative examples C2 prepared by drying and calcining $SiO_2Al_2O_3$ containing sol solutions synthesized by the fourth synthesis method (Example 8), the fourth synthesis method (Example 10), and a precipitation method, respectively.
Figure 38:
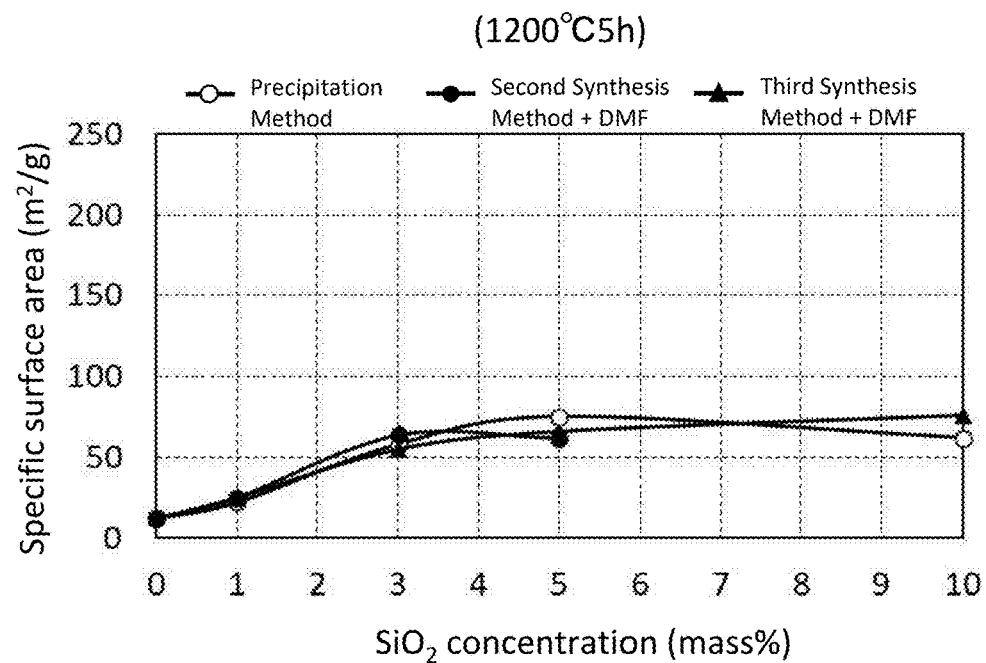
FIG. 38 is a graph showing the measurement results of the respective specific surface areas after the first heat treatment of the present powder samples S6, the present powder samples S12, and the comparative examples C2 prepared by drying and calcining $SiO_2Al_2O_3$ containing sol solutions synthesized by the fourth synthesis method (Example 8), the fourth synthesis method (Example 10), and a precipitation method, respectively.
Figure 39:
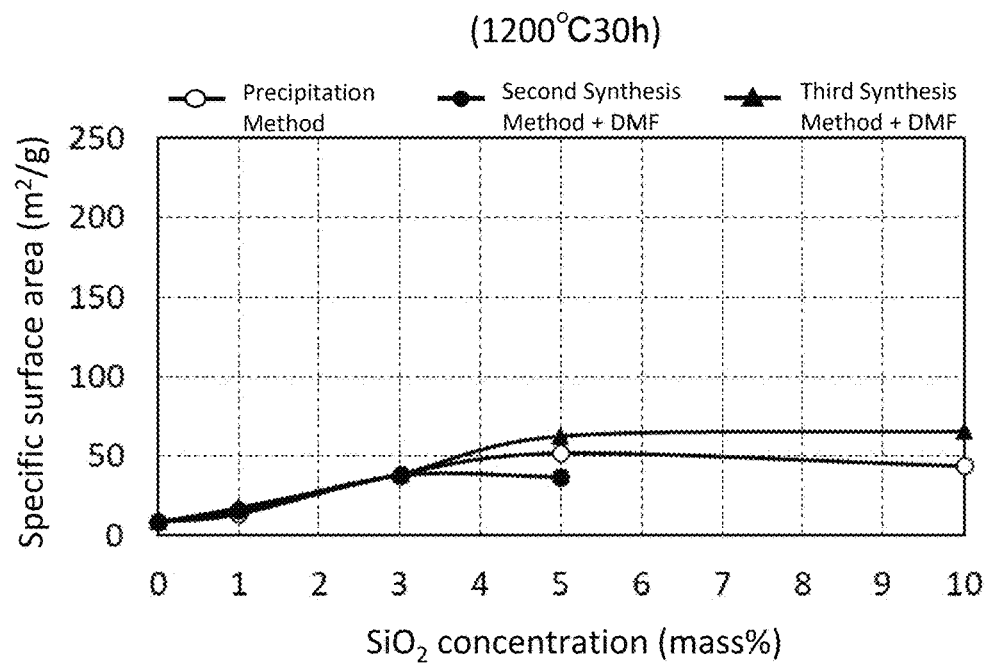
FIG. 39 is a graph showing the measurement results of the respective specific surface areas after the second heat treatment of the present powder samples S6, the present powder samples S12, and the comparative examples C2 prepared by drying and calcining $SiO_2Al_2O_3$ containing sol solutions synthesized by the fourth synthesis method (Example 8), the fourth synthesis method (Example 10), and a precipitation method, respectively.

Next, as Example 8 of the fourth synthesis method for synthesizing SiO$_2$Al$_2$O$_3$ containing sol solution by the third synthesis method using sodium aluminate as the aluminum compound instead of the second synthesis method in Step #40, in addition to the two types of the present samples S6A to S6C (SiO$_2$ concentration: 5 mass %, 10 mass %), the present samples S6A to S6C with the specific additive of DMF (initial heat treatment, first heat treatment, second heat treatment) were prepared by changing SiO$_2$ concentration to 0 mass %, 1 mass %, and 3 mass %. In FIGS. 37 to 39, the measurement results of the specific surface areas (m$^2$/g) of the present samples S6A, the present samples S6B, and the present samples S6C having the respective SiO$_2$ concentrations were shown for each heat treatment. Furthermore, as Example 10 of the fourth synthesis method for synthesizing SiO$_2$Al$_2$O$_3$ containing sol solution by the second synthesis method using sodium aluminate as the aluminum compound in Step #40, SiO$_2$Al$_2$O$_3$ containing sol solutions were synthesized by changing the SiO$_2$ concentration on five ways: 0 mass %, 1 mass %, 3 mass %, 5 mass %, and 10 mass %, and DMF was added to the prepared sol solutions as the specific additive, and by stirring the mixture at room temperature, SiO$_2$Al$_2$O$_3$ containing sol solutions with the specific additive added were prepared and then subjected to calcination at 1000° C. for 5 hours (initial heat treatment) to produce SiO$_2$Al$_2$O$_3$ powders (present samples S6aA). In addition, present samples S6a B obtained by adding the first heat treatment at 1200° C. for 5 hours to the present samples S6a A and the present samples S6a C obtained by adding the second heat treatment at 1200° C. for 30 hours to the present samples S6a A were prepared. In FIGS. 37 to 39, the measurement results of the specific surface areas (m$^2$/g) of the present samples S6a A, the present samples S6a B, and the present samples S6a C at the respective SiO$_2$ concentrations are also described for each heat treatment. Furthermore, for comparison purposes, in FIGS. 37 to 39, the measured results of the specific surface areas of the comparative samples C2A, the comparative samples C2B, and the comparative samples C2C having SiO$_2$ concentrations of 0 mass %, 1 mass %, 3 mass %, 5 mass %, and 10 mass % produced by the precipitation method using sodium aluminate as the aluminum compound are also shown for each heat treatment.

As shown in FIGS. 37 to 39, even when either the second synthesis method or the third synthesis method is used with sodium aluminate used as the aluminum compound in Step #40 of the fourth synthesis method, a specific surface area equivalent to that of the precipitation method can be obtained by adding the specific additive in Step #41 to SiO$_2$Al$_2$O$_3$ containing sol solution synthesized in Step #40.

Fifth Embodiment

Hereinafter, the fifth embodiment of the present synthesis method (the fifth synthesis method) will be described.

The present inventors have previously reported the effect of adding barium to SiO$_2$Al$_2$O$_3$ synthesized by the precipitation method to improve heat resistance (see the above-mentioned Patent Document 6). In the fifth embodiment, it was examined whether the improvement of heat resistance by adding barium similar to the precipitation method can be achieved in SiO$_2$Al$_2$O$_3$ containing sol solutions synthesized by the above-described first to third synthesis methods.

[19] Basic Structure and Examples of the Fifth Synthesis Method

Figure 40:
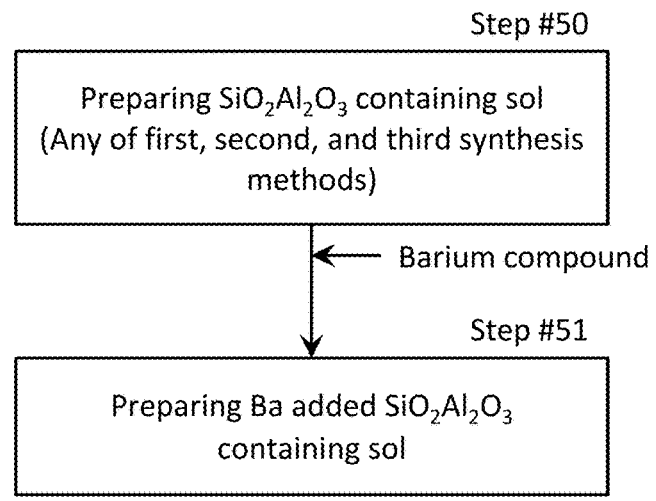
FIG. 40 is a process transition diagram showing an outline of a method for synthesizing Ba-added $SiO_2Al_2O_3$ containing sol solution according to the fifth embodiment (the fifth synthesis method).

As shown in the process transition diagram of FIG. 40, the fifth synthesis method includes Step #51 of adding a powder of a barium compound to SiO$_2$Al$_2$O$_3$ containing sol solution synthesized by any one of the above-mentioned first, second, and third synthesis methods (Step #50) and stirring the mixture as a post-treatment to any one of these synthesis methods.

In one implementation of Step #51, barium nitrate, barium hydroxide, barium chloride, and barium acetate are preferably used as the barium compound. For barium hydroxide, barium hydroxide octahydrate is used, and for barium chloride, barium chloride dihydrate is used.

In the following explanation, Ba-added SiO$_2$Al$_2$O$_3$ obtained by drying and calcinating Ba-added SiO$_2$Al$_2$O$_3$ containing sol solution synthesized in Step #51 is appropriately expressed as Z % BaO—X % $SiO_2Al_2O_3$ where $SiO_2$ concentration (a mass concentration of $SiO_2$ relative to $SiO_2Al_2O_3$) is X mass %, and BaO concentration (a mass concentration of BaO relative to $SiO_2Al_2O_3$) is Z mass %.

Ba-added $SiO_2Al_2O_3$ containing sol solution synthesized in Step #51 are dried, so that boehmite gel with the barium compounds (e.g., barium nitrate) and silica added is produced. Since the barium compound is added to the sol solution and stirred, it will be dispersed in the gel after drying. Therefore, according to the fifth synthesis method, it is considered that the barium compound is present in the dry gel in a highly dispersed form, rather than adding the barium compound (barium nitrate) to the precipitate disclosed in the above-described Patent Document 6. Furthermore, $SiO_2Al_2O_3$ and BaO were produced by calcining the boehmite gel at 1000° C. These points are apparent from XRD patterns shown in FIG. 41 described later.

As an example (Example 11) of the fifth synthesis method, a process for preparing 6.5% BaO-1% $SiO_2Al_2O_3$ containing sol solution, which are a precursor for synthesizing 6.5% BaO-1% $SiO_2Al_2O_3$ having $SiO_2$ concentration of 1 mass % and BaO concentration of 6.5 mass %, which exhibited high heat resistance in the above-mentioned Document 6, will be described. In Example 11, in Step #50, a total amount 80 g of 1% $SiO_2Al_2O_3$2.5% sol is obtained through Steps #11 to #15 of Example 1 of the first synthesis method using aluminum nitrate as the aluminum compound, and in Step #51, 0.2386 g of barium nitrate is added to the sol obtained in Step #50 and the mixture is stirred at room temperature to prepare 6.5% BaO-1% $SiO_2Al_2O_3$2.5% sol.

In Example 11, when barium hydroxide, barium chloride, or barium acetate is added instead of barium nitrate as the barium compound, 0.2880 g of barium hydroxide octahydrate, 0.2230 g of barium chloride dihydrate, or 0.2332 g of barium acetate is added to a total amount 80 g of 1% $SiO_2Al_2O_3$2.5% sol, and the mixture is stirred at room temperature to prepare 6.5% BaO-1% $SiO_2Al_2O_3$2.5% sol in the same manner.

As another example (Example 12) of the fifth synthesis method, a process for preparing 6.5% BaO-1% $SiO_2Al_2O_3$ containing sol solution in the same manner as in Example 11 will be described. In Example 12, in Step #50, a total amount 80 g of 1% $SiO_2Al_2O_3$2.5% sol is obtained via Steps #21 to #25 of Example 4 of the second synthesis method using sodium aluminate as the aluminum compound, and in Step #51, 0.2386 g of barium nitrate is added to the sol obtained in Step #50 and the mixture is stirred at room temperature to prepare 6.5% BaO-1% $SiO_2Al_2O_3$2.5% sol. In Example 12, as in Example 11, barium hydroxide, barium chloride, or barium acetate can be used as the barium compound instead of barium nitrate.

[20] Evaluation of Heat Resistance of the Fifth Synthesis Method (1)

The heat resistance of $SiO_2Al_2O_3$ powder obtained by drying and calcining 6.5% BaO-1% $SiO_2Al_2O_3$2.5% sol synthesized in Example 11 of the fifth synthesis method using aluminum nitrate as the aluminum compound and using barium nitrate as the barium compound (hereinafter, collectively referred to as the present powder sample S7) was evaluated.

As the present powder sample S7, 6.5% BaO-1% $SiO_2Al_2O_3$2.5% sol obtained through Step #50 of Example 11 of the fifth synthesis method (Steps #11 to #15 of Example 1 of the first synthesis method) and Step #51 was dried at 150° C. and subsequently pulverized into a powder, and the powder was calcined in the air at 1000° C. for 5 hours (initial heat treatment), so that 6.5% BaO-1% $SiO_2Al_2O_3$ powder (present sample S7A) was prepared. In addition, a present sample S7B obtained by adding the first heat treatment at 1200° C. for 5 hours to the present sample S7A, and a present sample S7C obtained by adding the second heat treatment at 1200° C. for 30 hours to the present sample S7A were prepared. The present powder sample S7 after drying at 150° C. and prior to the initial heat treatment is referred to as the present dry sample S7D (see FIG. 41 described later).

Furthermore, as a comparative example C7 for the present powder sample S7, 6.5% BaO-1% $SiO_2Al_2O_3$2.5% sol prepared by the precipitation method using aluminum nitrate as the aluminum compound instead of the fifth synthesis method was dried at 150° C., and subsequently pulverized into a powder, and the powder was calcined at 1000° C. for 5 hours (initial heat treatment) in the air so that 6.5% BaO-1% $SiO_2Al_2O_3$ powder (comparative sample C7A) was prepared. In addition, a comparative sample C7B obtained by adding the first heat treatment at 1200° C. for 5 hours to the comparative sample C7A and a comparative sample C7C obtained by adding the second heat treatment at 1200° C. for 30 hours to the comparative sample C7A were prepared.

Table 11 below shows the measurement results of the specific surface areas (m$^2$/g) of the present sample S7A, the present sample S7B and the present sample S7C, and the measurement results of the specific surface areas of the comparative sample C7A, the comparative sample C7B, and the comparative sample C7C. Furthermore, for comparison purposes, the measurement results of the respective specific surface areas (m$^2$/g) (see FIG. 7) of the present sample S1A, the present sample S1B and the present sample SIC obtained by drying and calcining Ba-unadded $SiO_2Al_2O_3$ containing sol solution having $SiO_2$ concentration of 1 mass %, synthesized in Example 1 of the first synthesis method explained in the above described "[4] Evaluation of heat resistance of the first synthesis method (1)", and the measurement results of the respective specific surface areas (m$^2$/g) (see FIG. 8) of the comparative sample C1A, the comparative sample C1B and the comparative sample CIC, each having $SiO_2$ concentration of 1 mass %, synthesized without Ba added by the precipitation method are also described in Table 11.

TABLE 11

| | | | Specific surface area (m$^2$/g) | | |
| --- | --- | --- | --- | --- | --- |
| BaO concentration | Sample | Synthesis method | (1000° C. 5 h) S7A/C7A/ S1A/C1A | (1200° C. 5 h) S7B/C7B/ S1B/C1B | (1200° C. 30 h) S7C/C7C/ S1C/C1C |
| 6.5 mass % | S7A-S7C | Fifth synthesis method | 123 | 68 | 50 |

TABLE 11-continued

| BaO concentration | Sample | Synthesis method | Specific surface area (m²/g) | | |
|---|---|---|---|---|---|
| | | | (1000° C. 5 h) S7A/C7A/ S1A/C1A | (1200° C. 5 h) S7B/C7B/ S1B/C1B | (1200° C. 30 h) S7C/C7C/ S1C/C1C |
| | C7A-C7C | Precipitation method | 112 | 63 | 34 |
| 0 mass % | S1A-S1C | First synthesis method | 122 | 24 | 15 |
| | C1A-C1C | Precipitation method | 133 | 15 | 13 |

As shown in Table 11, in the samples (the present sample S7A, the present sample S1A, the comparative sample C7A, and the comparative sample C1A) after calcining at 1000° C. for 5 hours (initial heat treatment), regardless of whether barium is added or not in any of the synthesis methods, a large difference in the specific surface area is not observed. However, in the samples (the present samples S7B and S7C, the present samples S1B and S1C, the comparative samples C7B and C7C, the comparative samples C1B and C1C) subjected to the first and second heat treatments at 1200° C. for 5 hours and 30 hours, the specific surface area was increased by adding barium in any of the synthesis methods. In addition, in the barium-added samples subjected to the first and second heat treatments, the samples S7B and S7C of the fifth synthesis method showed a higher specific surface area than the comparative samples C7B and C7C in the respective heat treatments.

Figure 41:
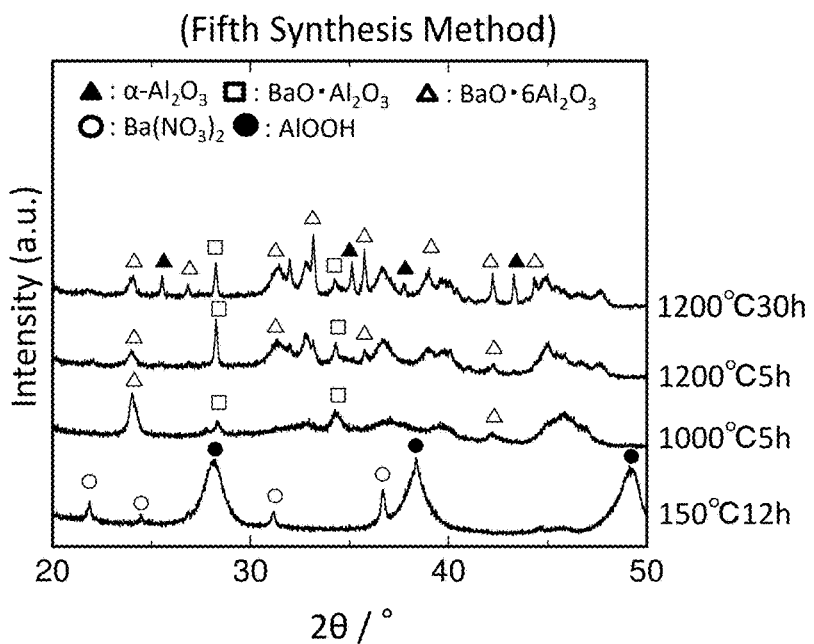
FIG. 41 is an XRD pattern diagram showing the crystal structures after the initial heat treatment, the first heat treatment, and the second heat treatment of the present powder samples S7 having $SiO_2$ concentration of 1 mass % and BaO concentration of 6.5 mass % prepared by drying and calcining Ba-added $SiO_2Al_2O_3$ containing sol solution synthesized by the fifth synthesis method.
Figure 42:
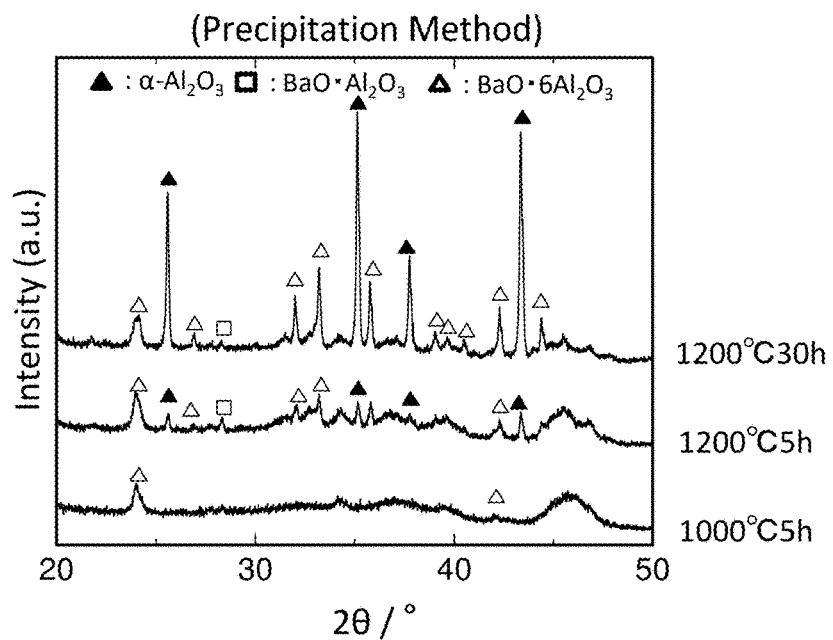
FIG. 42 is an XRD pattern diagram showing the crystal structure after the initial heat treatment, the first heat treatment, and the second heat treatment of the comparative examples C7 having $SiO_2$ concentration of 1 mass % and BaO concentration of 6.5 mass % prepared by a precipitation method.

FIG. 41 shows XRD patterns showing the crystal structures after the respective heat treatments and before the heat treatment in the present sample S7A, the present sample S7B, the present sample S7C, and the present dry sample S7D. FIG. 42 shows XRD patterns showing the crystal structures after the respective heat treatments in the comparative sample C7A, the comparative sample C7B, and the comparative sample C7C.

First, in the XRD pattern of the present dry sample S7D shown in FIG. 41, a peak of barium nitrate appeared together with boehmite, and as described above, it was confirmed that boehmite gel with barium nitrate and silica added was produced in the drying stage.

As shown in FIGS. 41 and 42, in the present sample S7C and the comparative sample C7C, to which Ba was added and the second heat treatment was performed at 1200° C. for 30 hours, the peak of the diffraction pattern of $\alpha$-$Al_2O_3$ of the present sample S7C synthesized by the fifth synthesis method was significantly lower than that of the comparative sample C7C synthesized by the precipitation method, and it was confirmed that the phase transition to the $\alpha$ phase was suppressed. Furthermore, in the present sample S7B and the comparative sample C7B, to which Ba was added and the first heat treatment was performed at 1200° C. for 5 hours, the formation of the $\alpha$ phase was not observed in the present sample S7B and the formation of barium aluminate (barium monoaluminate: $BaO \cdot Al_2O_3$, barium hexaaluminate: $BaO \cdot 6Al_2O_3$) was confirmed in the present sample S7B. Barium aluminate is known to inhibit the mass transfer of Al at high temperatures, thereby suppressing the phase transition to the $\alpha$ phase. In the fifth synthesis method, since the barium nitrate powder is added to the sol solution, the dispersibility of barium is higher than that of the precipitation method, and as a result, barium aluminate is generated faster than the formation of the $\alpha$ phase, and it is considered that this effectively acts to improve the heat resistance.

From the above, it was confirmed that the fifth synthesis method, in which barium is added to $SiO_2Al_2O_3$ containing sol solution, provides higher heat resistance than the precipitation method.

Next, Table 12 below shows the measurement results of the respective specific surface areas (m²/g) of the present powder samples S7 (the present samples S7A, the present samples S7B, the present samples S7C) prepared using barium nitrate, barium hydroxide, barium chloride, and barium acetate, respectively, as the barium compound in Example 11. As shown in Table 12, using any of these four barium compounds exhibited a high specific surface area after the second heat treatment at 1200° C. for 30 hours, and further exhibited a higher specific surface area than the comparative sample C7C prepared by the precipitation method shown in Table 11. As a result, it was confirmed that barium nitrate, barium hydroxide, barium chloride, and barium acetate can be suitably used as the barium compound to be added to $SiO_2Al_2O_3$ containing sol solution.

TABLE 12

| Barium compound | Specific surface area (m²/g) | | |
|---|---|---|---|
| | (1000° C. 5 h) S7A | (1200° C. 5 h) S7B | (1200° C. 30 h) S7C |
| Barium nitrate | 123 | 68 | 50 |
| Barium hydroxide | 125 | 58 | 53 |
| Barium chloride | 166 | 66 | 40 |
| Barium acetate | 151 | 66 | 63 |

[21] Evaluation of Heat Resistance of the Fifth Synthesis Method (2)

The heat resistance of $SiO_2Al_2O_3$ powder obtained by drying and calcinating 6.5% BaO-1% $SiO_2Al_2O_3$2.5% sol synthesized in Example 12 of the fifth synthesis method using sodium aluminate as the aluminum compound (hereinafter, collectively referred to as the present powder sample S8) was evaluated.

As the present powder sample S8, 6.5% BaO-1% $SiO_2Al_2O_3$2.5% sol obtained through Step #50 of Example 12 of the fifth synthesis method (Steps #21 to #25 of Example 4 of the second synthesis method) and Step #51 was dried at 150° C. and subsequently pulverized into a powder, and the powder was calcined in the air at 1000° C. for 5 hours (initial heat treatment), so that 6.5% BaO-1% $SiO_2Al_2O_3$ powder (present sample S8A) was prepared. In addition, a present sample S8B obtained by adding the first heat treatment at 1200° C. for 5 hours to the present sample S8A and a present sample S8C obtained by adding the second heat treatment at 1200° C. for 30 hours to the present sample S8A were prepared.

Furthermore, as a comparative example C8 for the present powder sample S8, 6.5% BaO-1% $SiO_2Al_2O_3$2.5% sol prepared by the precipitation method using sodium aluminate as the aluminum compound instead of the fifth synthesis method was dried at 150° C., and subsequently pulverized into a powder, and the powder was calcined at 1000° C. for 5 hours (initial heat treatment) in the air so that 6.5% BaO-1% $SiO_2Al_2O_3$ powder (comparative sample C8A) was prepared. In addition, a comparative sample C8B obtained by adding the first heat treatment at 1200° C. for 5 hours to the comparative sample C8A and a comparative sample C8C obtained by adding the second heat treatment at 1200° C. for 30 hours to the comparative sample C8A were prepared.

Table 13 below shows the measurement results of the respective specific surface areas ($m^2/g$) of the present sample S8A, the present sample S8B, and the present sample S8C, which were prepared, and those of the comparative sample C8A, the comparative sample C8B, and the comparative sample C8C. Furthermore, for comparison purposes, the measurement results of the respective specific surface areas ($m^2/g$) (see FIG. 18) of the present sample S2A, the present sample S2B, and the present sample S2C obtained by drying and calcining Ba-unadded $SiO_2Al_2O_3$ containing sol solution having $SiO_2$ concentration of 1 mass % synthesized in Example 4 of the second synthesis method explained in the above described "[10] Evaluation of heat resistance of the second synthesis method", and the measurement results of the respective specific surface areas ($m^2/g$) (see FIG. 19) of the comparative sample C2A, the comparative sample C2B, and the comparative sample C2C, each having $SiO_2$ concentration of 1 mass %, synthesized without Ba added by the precipitation method are also described in Table 13.

fifth synthesis method showed a higher specific surface area than the comparative sample C8C in the respective heat treatments.

Figure 43:
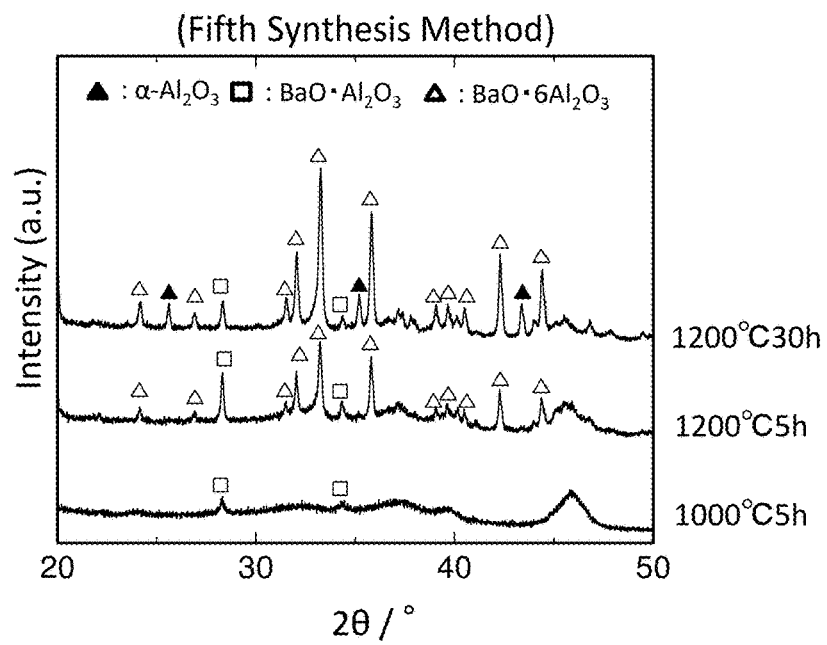
FIG. 43 is an XRD pattern diagram showing the crystal structures after the initial heat treatment, the first heat treatment, and the second heat treatment of the present powder samples S8 having $SiO_2$ concentration of 1 mass % and BaO concentration of 6.5 mass % prepared by drying and calcining Ba-added $SiO_2Al_2O_3$ containing sol solution synthesized by the fifth synthesis method.
Figure 44:
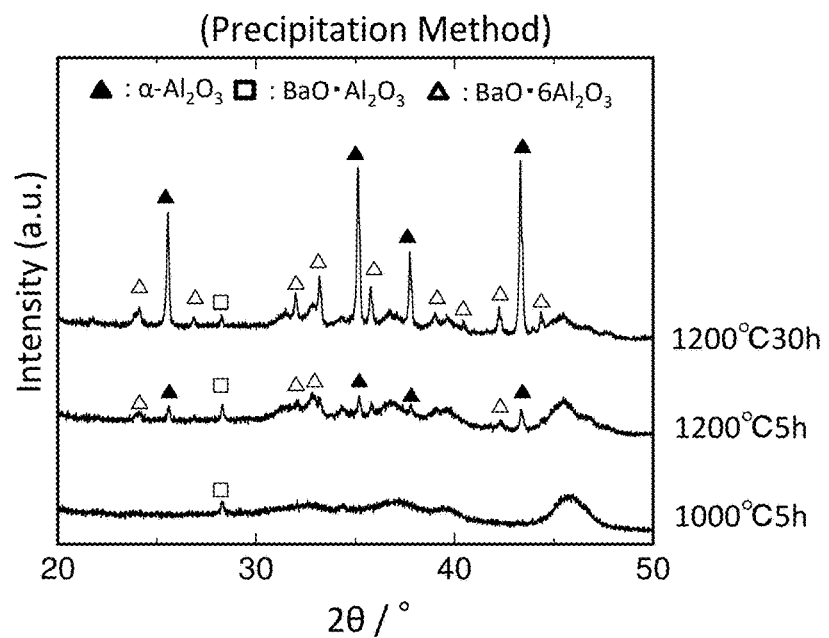
FIG. 44 is an XRD pattern diagram showing the crystal structures after the initial heat treatment, the first heat treatment, and the second heat treatment of the comparative examples C8 having $SiO_2$ concentration of 1 mass % and BaO concentration of 6.5 mass % prepared by a precipitation method.

FIG. 43 shows XRD patterns showing the crystal structures after the respective heat treatments in the present sample S8A, the present sample S8B, and the present sample S8C. FIG. 44 shows XRD patterns showing the crystal structures after the respective heat treatments in the comparative sample C8A, the comparative sample C8B, and the comparative sample C8C.

As shown in FIGS. 43 and 44, in the present sample S8C and the comparative sample C8C, to which Ba was added and the second heat treatment was performed at 1200° C. for 30 hours, the peak of the diffraction pattern of $\alpha$-$Al_2O_3$ of the present sample S8C synthesized by the fifth synthesis method was significantly lower than that of the comparative sample C8C synthesized by the precipitation method, and it was confirmed that the phase transition to the $\alpha$ phase was suppressed. This is the same as in the present sample S7C and the comparative sample C7C in which aluminum nitrate was used as the aluminum compound (see FIGS. 41 and 42).

From the above, it was confirmed that the fifth synthesis method, in which barium is added to $SiO_2Al_2O_3$ containing sol solution, provides higher heat resistance than the precipitation method, even when sodium aluminate is used as the aluminum compound.

[22] Evaluation of Heat Resistance of the Fifth Synthesis Method (3)

In the above-described evaluations of heat resistances of the fifth synthesis method (1) and (2), the heat resistances were evaluated for $SiO_2Al_2O_3$ powders (the present powder samples S7 and S8) obtained by drying and calcining 6.5% BaO-1% $SiO_2Al_2O_3$2.5% sols synthesized by the fifth synthesis method using the first and second synthesis methods

TABLE 13

| BaO concentration | Sample | Synthesis method | Specific surface area ($m^2/g$) | | |
|---|---|---|---|---|---|
| | | | (1000° C. 5 h) S8A/C8A/ S2A/C2A | (1200° C. 5 h) S8B/C8B/ S2B/C2B | (1200° C. 30) S8C/C8C/ S2C/C2C |
| 6.5 mass % | S8A-S8C | Fifth synthesis method | 122 | 61 | 51 |
| | C8A-C8C | Precipitation method | 133 | 72 | 34 |
| 0 mass % | S2A-S2C | Second synthesis method | 134 | 23 | 15 |
| | C2A-C2C | Precipitation method | 161 | 22 | 14 |

As shown in Table 13, in the samples (the present sample S8A, the present sample S2A, the comparative sample C8A, and the comparative sample C2A) after calcining at 1000° C. for 5 hours (initial heat treatment), the specific surface area is slightly reduced by adding barium in any of the synthesis methods. However, in the samples (the present samples S7B and S7C, the present samples S1B and S1C, the comparative samples C7B and C7C, the comparative samples C1B and C1C) subjected to the first and second heat treatments at 1200° C. for 5 hours and 30 hours, the specific surface area was increased by adding barium in any of the synthesis methods. In addition, in the barium-added samples subjected to the second heat treatment, the present sample S8C of the (the first AC method) in Step #50, respectively, and it was confirmed that the heat resistances were improved by adding barium to $SiO_2Al_2O_3$ containing sol solution.

In the present embodiment, the heat resistance of $SiO_2Al_2O_3$ powder obtained by drying and calcining Ba-added $SiO_2Al_2O_3$ containing sol solution synthesized by the fifth synthesis method using the third synthesis method (the second AC method) in Step #50 is not evaluated. However, in the above-described evaluations of heat resistances of the third synthesis method (1) and (2), it has been confirmed that the present powder samples S3 and S4 obtained through the third synthesis method (the second AC method) have sufficient heat resistance equivalent to the present powder samples S1 and S2 obtained through the first and second synthesis methods (the first AC method). Also, in the above-described evaluations of heat resistances of the fourth synthesis method (1) and (2), for both present powder samples S5 and S6 obtained through the fourth synthesis method using the first and third synthesis methods (the first and second AC methods) in Step #40, respectively, the effect of improving specific surface area (improving heat resistance) by adding the specific additive (DMF) has been confirmed. In view of these facts, it is considered that the effect of improving heat resistance by adding barium can also be obtained in $SiO_2Al_2O_3$ obtained by drying and calcining Ba-added $SiO_2Al_2O_3$ containing sol solution synthesized by the fifth synthesis method using the third synthesis method (the second AC method) in Step #50 similar to the fifth synthesis method using the first and second synthesis methods (the first AC method) in Step #50.

Sixth Embodiment

Hereinafter, the sixth embodiment of the present synthesis method (sixth synthesis method) will be described.

[23] Basic Structure and Examples of the Sixth Synthesis Method

Figure 45:
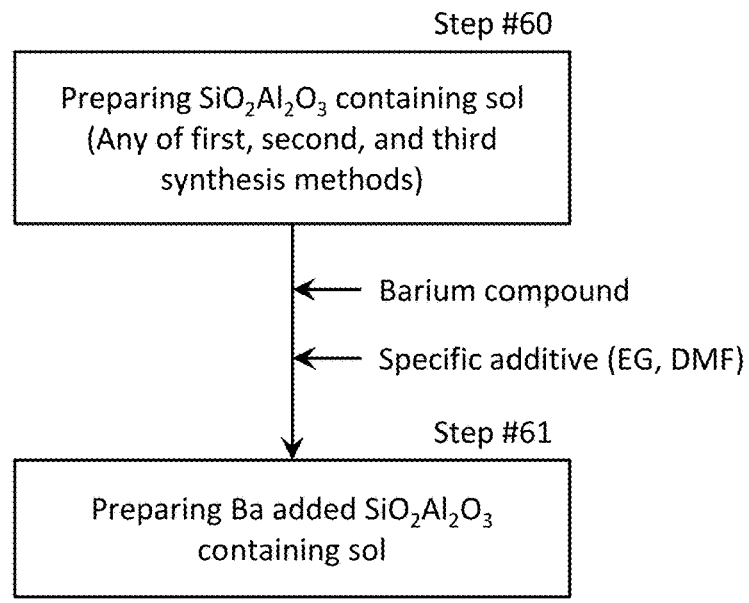
FIG. 45 is a process transition diagram showing an outline of a method for synthesizing Ba-added $SiO_2Al_2O_3$ containing sol solution according to the sixth embodiment (the sixth synthesis method).

The sixth synthesis method corresponds to a synthesis method in which the fourth synthesis method and the fifth synthesis method described above are integrated, and as shown in the process transition diagram of FIG. 45, the sixth synthesis method includes Step #61 of adding the specific additive and the barium compound to $SiO_2Al_2O_3$ containing sol solution synthesized by any of the first, second, and third synthesis methods (Step #60) and stirring the mixture, as a post-treatment with respect to any of the first, second, and third synthesis methods (Step #60).

Step #61 of the sixth synthesis method is provided firstly as the countermeasure against the reduction in the total pore volume of $Al_2O_3$, which is caused by the surface tension of the water to be evaporated in the process of forming the transparent gel by drying $SiO_2Al_2O_3$ containing sol solution synthesized by any one of the first to third synthesis methods of Step #60 as in Step #41 of the fourth synthesis method, and secondly in order to obtain the effect of improving heat resistance by adding barium as in Step #51 of the fifth synthesis method. In other words, the sixth synthesis method aims to simultaneously obtain two effects of improving heat resistance by adding the specific additive (EG or DMF) and the barium compound.

Therefore, in one implementation of Step #61, ethylene glycol (EG) or N,N-dimethylformamide (DMF) is preferably used as the specific additive as in Step #41 of the fourth synthesis method, and further, barium nitrate, barium hydroxide, barium chloride, and barium acetate are preferably used as the barium compound as in Step #51 of the fifth synthesis method.

In Step #61, the specific additive and the barium compound were added to $SiO_2Al_2O_3$ containing sol solution synthesized in Step #60 and the mixture was stirred to synthesize $SiO_2Al_2O_3$ containing sol solution to which the specific additive and barium were added. In Step #61, the same $SiO_2Al_2O_3$ containing sol solution to which the specific additive and barium were added can be synthesized by previously adding the barium compound to $SiO_2Al_2O_3$ containing sol solution synthesized in Step #60 and stirring the mixture to synthesize Ba-added $SiO_2Al_2O_3$ containing sol solution in the same manner as in the fifth synthesis method, and then adding the specific additive to the Ba-added $SiO_2Al_2O_3$ containing sol solution in the same manner as in the fourth synthesis method and stirring the mixture. That is, as described in the fourth embodiment, since the specific additive is added as the countermeasure against the reduction in the total pore volume of $Al_2O_3$, which is caused by the surface tension of the water to be evaporated in the process of forming the transparent gel by drying $SiO_2Al_2O_3$ containing sol solution synthesized in Step #60, the timing of the addition may be after Ba-added $SiO_2Al_2O_3$ containing sol solution is synthesized.

As an example of the sixth synthesis method (Example 13), in the same manner as in Example 11 of the fifth synthesis method, in Step #60, a total amount 80 g of 1% $SiO_2Al_2O_3$2.5% sol is obtained through Steps #11 to #15 of Example 1 of the first synthesis method using aluminum nitrate as the aluminum compound, and in Step #61, 0.2386 g of barium nitrate is added to the sol obtained in Step #60 and 3 mass % of the specific additive (EG or DMF) is further added to the total amount of the sol solution after adding the specific additive, and the mixture is stirred at room temperature to prepare 6.5% BaO-1% $SiO_2Al_2O_3$2.5% sol to which the specific additive is added.

As another example of the sixth synthesis method (Example 14), in the same manner as in Example 12 of the fifth synthesis method, in Step #60, a total amount 80 g of 1% $SiO_2Al_2O_3$2.5% sol is obtained through Steps #21 to #25 of Example 4 of the second synthesis method using sodium aluminate as the aluminum compound, and in Step #61, 0.2386 g of barium nitrate is added to the sol obtained in Step #60 and 3 mass % of the specific additive (EG or DMF) is further added to the total amount of the sol solution after adding the specific additive, and the mixture is stirred at room temperature to prepare 6.5% BaO-1% $SiO_2Al_2O_3$2.5% sol to which the specific additive is added.

[24] Evaluation of Heat Resistance of the Sixth Synthesis Method

The heat resistance of $SiO_2Al_2O_3$ powder obtained by drying and calcining 6.5% BaO-1% $SiO_2Al_2O_3$2.5% sol, to which DMF was added, synthesized in Example 13 of the sixth synthesis method using aluminum nitrate as the aluminum compound (hereinafter collectively referred to as "the present powder sample S9"), and the heat resistance of $SiO_2Al_2O_3$ powder obtained by drying and calcining 6.5% BaO-1% $SiO_2Al_2O_3$2.5% sol, to which DMF was added, synthesized in Example 14 of the sixth synthesis method using sodium aluminate as the aluminum compound (hereinafter collectively referred to as "the present powder sample S10") were evaluated, respectively.

As the present powder sample S9, 6.5% BaO-1% $SiO_2Al_2O_3$2.5% sol, to which DMF was added, obtained through Step #60 of Example 13 of the sixth synthesis method (Step #11 to Step #15 of Example 1 of the first synthesis method) and Step #61 was dried at 150° C. and subsequently pulverized into a powder, and the powder was calcined at 1000° C. for 5 hours (initial heat treatment) in the air so that 6.5% BaO-1% $SiO_2Al_2O_3$ powder (present sample S9A) was prepared.

As the present powder sample S10, 6.5% BaO-1% $SiO_2Al_2O_3$2.5% sol, to which DMF was added, obtained through Step #60 of Example 14 of the sixth synthesis method (Step #21 to Step #25 of Example 4 of the second synthesis method) and Step #61 was dried at 150° C. and subsequently pulverized into a powder, and the powder was calcined at 1000° C. for 5 hours (initial heat treatment) in the air so that 6.5% BaO-1% $SiO_2Al_2O_3$ powder (present sample S10A) was prepared.

In addition, a present sample S9B and a present sample S10B obtained by adding the first heat treatment at 1200° C. for 5 hours to the present sample S9A and the present sample S10A, respectively, and a present sample S9C and a present sample S10C obtained by adding the second heat treatment at 1200° C. for 30 hours to the present sample S9A and the present sample S10A, respectively, were prepared. Incidentally, DMF added to 6.5% BaO-1% $SiO_2Al_2O_3$2.5% sol is burned in the initial heat treatment and is not present in the present samples S9A to S9C and the present samples S10A to S10C after calcination.

Table 14 below shows the measurement results of the respective specific surface areas ($m^2/g$) of the present samples S9A to S9C, which were prepared, and the total pore volume ($cm^3/g$) of the present sample S9B. Furthermore, for comparison purposes, the measurement results of the respective specific surface areas ($m^2/g$) of the present samples S1A to S1C obtained by drying and calcining Ba-unadded $SiO_2Al_2O_3$ containing sol solution having $SiO_2$ concentration of 1 mass %, synthesized in Example 1 of the first synthesis method explained in the above described "[4] Evaluation of heat resistance of the first synthesis method (1)", and the total pore volume ($cm^3/g$) of the present sample S1B (see FIG. 7 and Table 3), and the measurement results of the respective specific surface areas ($m^2/g$) of the present samples S7A to S7C obtained by drying and calcining 6.5% BaO-1% $SiO_2Al_2O_3$2.5% sols synthesized in Example 11 of the fifth synthesis method explained in the above described "[20] Evaluation of heat resistance of the fifth synthesis method (1)", and the total pore volume ($cm^3/g$) of the present sample S7B (see Table 11) are also shown in Table 14.

Table 15 below shows the measurement results of the respective specific surface areas ($m^2/g$) of the prepared present samples S10A to S10C and the total pore volume ($cm^3/g$) of the present sample S10B. Furthermore, for comparison purposes, the measurement results of the respective specific surface areas ($m^2/g$) of the present samples S2A to S2C obtained by drying and calcining Ba-unadded $SiO_2Al_2O_3$ containing sol solution having $SiO_2$ concentration of 1 mass %, synthesized in Example 4 of the second synthesis method explained in the above described "[10] Evaluation of heat resistance of the second synthesis method", and the total pore volume ($cm^3/g$) of the present sample S2B (see FIG. 20), and the measurement results of the respective specific surface areas ($m^2/g$) of the present samples S8A to S8C obtained by drying and calcining 6.5% BaO-1% $SiO_2Al_2O_3$2.5% sols synthesized in Example 12 of the fifth synthesis method explained in the above described "[21] Evaluation of heat resistance of the fifth synthesis method (2)", and the total pore volume ($cm^3/g$) of the present sample S8B (see Table 13) are also shown in Table 15.

TABLE 15

| BaO concentration (mass %) | DMF | Sample | Specific surface area ($m^2/g$) | | | Total pore volume ($cm^3/g$) |
| --- | --- | --- | --- | --- | --- | --- |
| | | | 1000° C. 5 h S10A/ S8A/S2A | 1200° C. 5 h S10B/ S8B/S2B | 1200° C. 30 h S10C/ S8C/S2C | 1200° C. 5 h S10B/ S8B/S2B |
| 6.5 | Added | S10A-S10C | 121 | 81 | 65 | 0.3467 |
| | None | S8A-S8C | 122 | 61 | 51 | 0.2359 |
| 0 | None | S2A-S2C | 134 | 23 | 15 | 0.1309 |

As shown in Table 14, it was confirmed that in any of the heat treatments, the present samples S9A to S9C to which both the specific additive and the barium compound were added exhibited a higher specific surface area than the present samples S7A to S7C to which barium compound was added alone, and that in the present sample S9B after the first heat treatment, the total pore volume was enlarged from the present sample S7B. Furthermore, as shown in Table 15, it was confirmed that the present sample S10B and the present sample S10C to which both the specific additive and the barium compound were added after the first and second heat treatments exhibited a higher specific surface area than the present samples S8B and S8C to which the barium compound was added alone, and that in the present sample S10B after the first heat treatment, the total pore volume was enlarged from the present sample S8B. From the above, it was confirmed that, regardless of the aluminum compound used for preparing the aluminum solution, the addition of

TABLE 14

| BaO concentration (mass %) | DMF | Sample | Specific surface area ($m^2/g$) | | | Total pore volume ($cm^3/g$) |
| --- | --- | --- | --- | --- | --- | --- |
| | | | 1000° C. 5 h S9A/S7A/ S1A | 1200° C. 5 h S9B/S7B/ S1B | 1200° C. 30 h S9C/S7C/ S1C | 1200° C. 5 h S9B/S7B/ S1B |
| 6.5 | Added | S9A-S9C | 129 | 69 | 58 | 0.2544 |
| | None | S7A-S7C | 123 | 68 | 50 | 0.2403 |
| 0 | None | S1A-S1C | 122 | 24 | 15 | 0.1607 | both the specific additive and the barium compound improves the heat resistance compared to the case where the barium compound is added alone.

Figure 46:
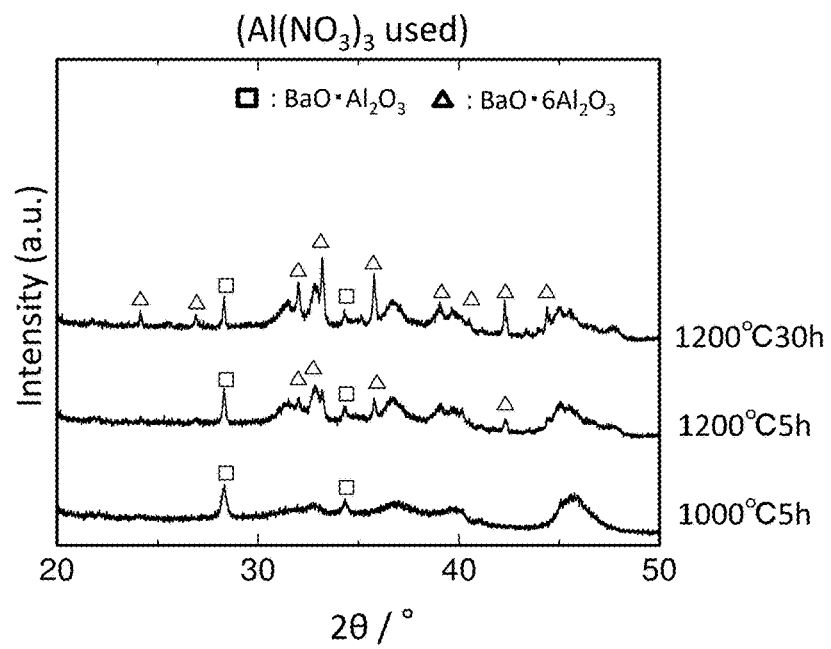
FIG. 46 is an XRD pattern diagram showing the crystal structures after the initial heat treatment, the first heat treatment, and the second heat treatment of the present powder samples S9 having $SiO_2$ concentration of 1 mass % and BaO concentration of 6.5 mass % prepared by drying and calcining Ba-added $SiO_2Al_2O_3$ containing sol solution synthesized by the sixth synthesis method (Example 13).
Figure 47:
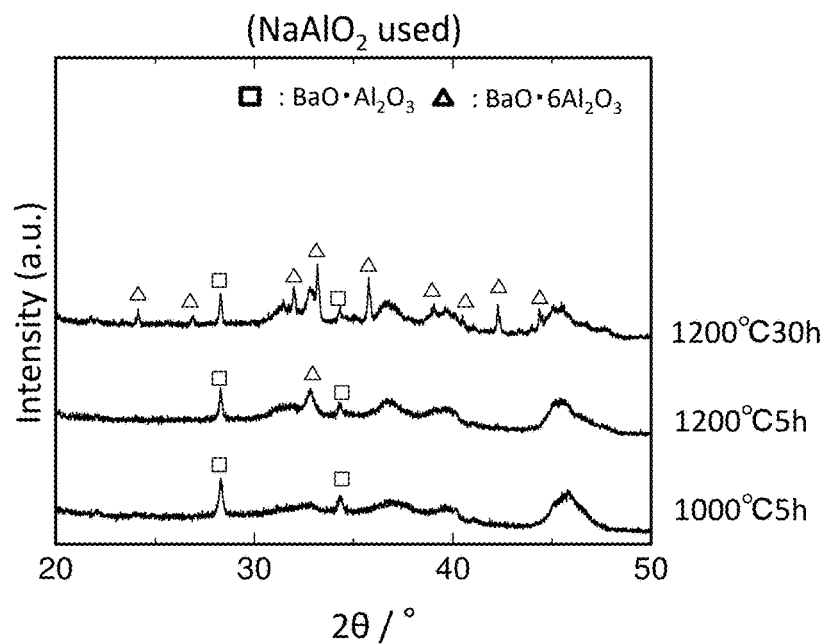
FIG. 47 is an XRD pattern diagram showing the crystal structures after the initial heat treatment, the first heat treatment, and the second heat treatment of the present powder samples S10 having $SiO_2$ concentration of 1 mass % and BaO concentration of 6.5 mass % prepared by drying and calcining Ba-added $SiO_2Al_2O_3$ containing sol solution synthesized by the sixth synthesis method (Example 14).

FIG. 46 shows XRD patterns showing the crystal structures after the respective heat treatments in the present samples S9A to S9C. FIG. 47 shows XRD patterns showing the crystal structures after the respective heat treatments in the present samples S10A to S10C. When comparing the respective XRD patterns of the present samples S9A to S9C and the present samples S10A to S10C shown in FIGS. 46 and 47 with those of the present samples S7A to S7C and the present samples S8A to S8C, to which barium compound was added alone, shown in FIGS. 41 and 43, in the present sample S7C and the present sample S8C after the second heat treatment at 1200° C. for 30 hours, the phase transition to some α-$Al_2O_3$ phase was confirmed, but in the present sample S9C and the present sample S10C after the second heat treatment to which both the specific additive and the barium compound were added, the generation of the α phase was not confirmed. In addition to the improved heat resistance due to the formation of Ba aluminate, the addition of the specific additive suppresses the decrease in the pore volume of $SiO_2Al_2O_3$, making it possible to achieve a high specific surface area and suppress the phase transition to the α-$Al_2O_3$ phase.

Seventh Embodiment

Hereinafter, an embodiment of a method for forming a porous alumina film using $SiO_2Al_2O_3$ containing sol solution or Ba-added $SiO_2Al_2O_3$ containing sol solution synthesized by the first to sixth synthesis methods described above (hereinafter, appropriately referred to as "the present forming method") will be described.

[25] Basic Structure of the Present Forming Method

Figure 48:
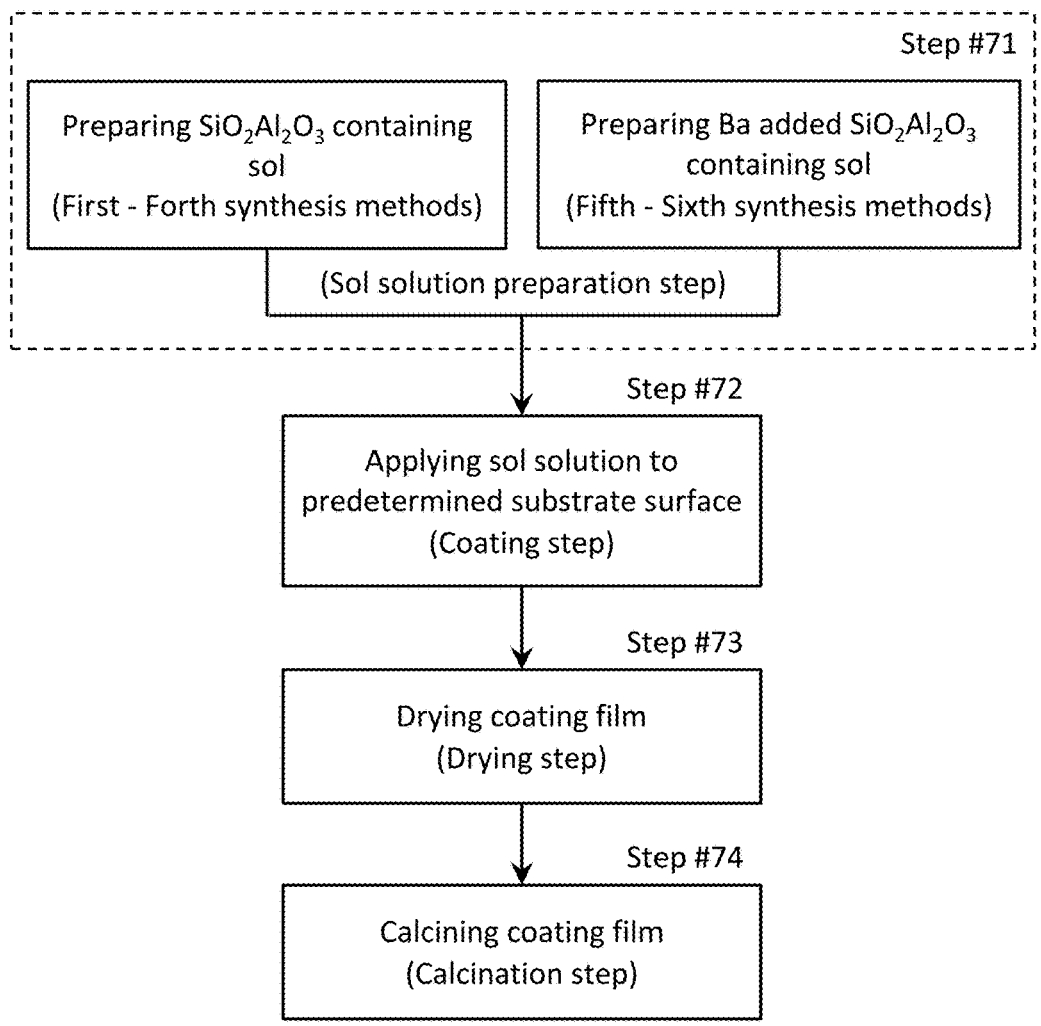
FIG. 48 is a process transition diagram showing an outline of a method for forming a porous alumina film according to the seventh embodiment (the present forming method).

As shown in the process transition diagram of FIG. 48, the present forming method is roughly divided into the following Steps #71 to #74. First, in Step #71, $SiO_2Al_2O_3$ containing sol solution (when any of the first to fourth synthesis methods is used) or Ba-added $SiO_2Al_2O_3$ containing sol solution (when the fifth or sixth synthesis method is used) is prepared using any of the first to sixth synthesis methods described above (sol solution preparation step). Subsequently, in Step #72, the sol solution prepared in Step #71 is applied to a predetermined substrate surface to form a coating film (coating step). Subsequently, in Step #73, the coating film formed in Step #72 is dried (drying step), and in Step #74, the coating film dried in Step #73 is calcined (calcination step). Consequently, a porous alumina film of $SiO_2Al_2O_3$ film or Ba-added $SiO_2Al_2O_3$ film is formed on the substrate surface.

The substrate used in Step #72 can be any material and shape that can hold the coating film formed on the surface in Step #72 on the surface through Steps #72 to #74, i.e., any material and shape that can be used as a support for the coating film. Therefore, the substrate itself does not need to be porous. because $SiO_2Al_2O_3$ film or Ba-added $SiO_2Al_2O_3$ film formed on the substrate surface has a high specific surface area. Examples of substrates used in examples described later are shown below.

1) Granular aluminum oxide (active): manufactured by Kanto Chemical Co., Inc. (α-transformed by calcination at 1200° C. for 5 hours; hereinafter referred to as "cicaAl")
2) Diesel particulate filter made of silicon carbide (hereinafter referred to as "SiC-DPF")
3) Silica filter: QR-100 manufactured by ADVANTEC
4) Glass cloth: #2116 manufactured by Nitto Bo
5) Silica cloth: manufactured by Nichias (calcined at 1000° C. for 5 hours)
6) Glass plate

[26] First Example of the Present Forming Method (Example 15)

In the same manner as in Example 1 of the first synthesis method described above, two types of sol solutions of 1% $SiO_2Al_2O_3$3.75% sol and 3% $SiO_2Al_2O_3$3.75% sol having $SiO_2$ concentrations 1 mass % and 3 mass % were prepared. The five types of substrates listed in 1) to 5) above were immersed in each of the sol solutions for 10 minutes and then pulled out. After the substrates were impregnated with the sol solution, they were dried at 150° C. for 30 minutes to prepare a total of ten types of dry samples. Each sol solution was used in an amount such that the substrate was completely immersed in the sol solution. In Example 15, in the coating step of Step #72, the coating film is formed by immersing the substrate in the sol solution. Furthermore, increasing the amount supported on each substrate surface can be achieved by repeating the above-mentioned coating and drying steps. The substrates and the coating films that had undergone one or more coating and drying steps were calcined at 1000° C. for 5 hours to form porous alumina films of 1% $SiO_2Al_2O_3$ and 3% $SiO_2Al_2O_3$ on each substrate surface, respectively. However, when the substrate is the glass cloth, the substrate melts by calcination at 1000° C. for 5 hours, so that it was calcined at 500° C. for 5 hours. The calcination at 1000° C. for 5 hours or at 500° C. for 5 hours corresponds to the initial heat treatment for the powder samples described in the heat resistance evaluations of the first to sixth synthesis method, and thereby is also referred to as "initial heat treatment" in the present forming method.

Table 16 below shows the relationship between the number of coatings and the supported amount of 1% $SiO_2Al_2O_3$ on the substrate surface after calcining at 1000° C. for 5 hours in two examples when the substrates of Example 15 are cicaAl described in 1) above and the silica cloth described in 5) above. The supported amount x (mass %) in Table 16 is given by the following calculation formula (1). In the calculation formula (1), Wb represents the mass (g) of the substrate, and Wt represents the total mass (g) of the substrate and the coating film.

$$x = (Wt - Wb)/Wt \qquad (1)$$

TABLE 16

| Number of coatings | Supported amount x (mass %) | |
|---|---|---|
| | cicaAl | Silica cloth |
| 1 | 1.5 | 2.3 |
| 3 | 3.5 | 4.3 |
| 5 | 4.0 | 6.0 |

It can be seen from Table 16 that the supported amount of 1% $SiO_2Al_2O_3$ on the substrate surface is increased by increasing the number of coatings. However, where substrate is cicaAl made of α-$Al_2O_3$, there was only a slight increase in the supported amount after three times of coatings.

[27] Second Example of the Present Forming Method (Example 16)

In the same manner as in Example 11 of the fifth synthesis method described above, 6.5% BaO-1% $SiO_2Al_2O_3$2.5% sol was prepared. In the same manner as in Example 15 described above, the three types of substrates (cicaAl, glass cloth, silica cloth) listed in 1), 4) and 5) above were immersed respectively in the sol solution for 10 minutes and then pulled out. After the substrates were impregnated with the sol solution, they were dried at 150° C. for 30 minutes. The substrates and the coating films that had undergone one or more coating and drying steps were calcined at 1000° C. for 5 hours to form porous alumina films of 6.5% BaO-1% $SiO_2Al_2O_3$ and 3% $SiO_2Al_2O_3$ on the substrate surfaces. The respective steps of coating, drying, and calcining described above are the same as those in Example 15, and therefore duplicate descriptions thereof will be omitted.

Figure 49:
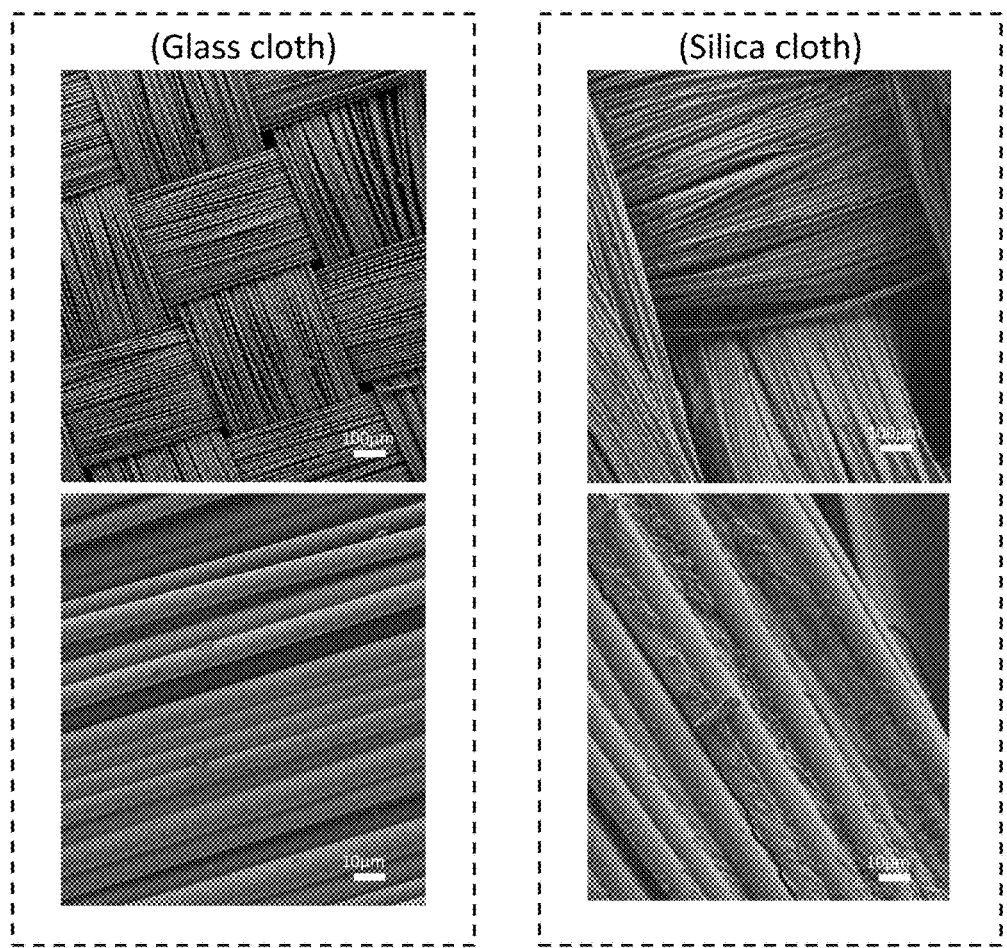
FIG. 49 is FE-SEM photographs of porous alumina films of 6.5% BaO-1% $SiO_2Al_2O_3$ formed on surfaces of a glass cloth and a silica cloth.

FIG. 49 shows SEM photographs taken by field emission scanning electron microscope (FE-SEM) of porous alumina films of 6.5% BaO-1% $SiO_2Al_2O_3$ formed on the respective surfaces of the glass cloth and the silica cloth of Example 16. In the present embodiment, JSM-7001F manufactured by JEOL Ltd. was used as FE-SEM. As shown in FIG. 49, it was observed that the porous alumina film was uniformly coated on each of the surfaces of the glass cloth and the silica cloth.

[28] Third Example of the Present Forming Method (Example 17)

In the same manner as in Example 1 of the first synthesis method described above, 1% $SiO_2Al_2O_3$2.5% sol and 1% $SiO_2Al_2O_3$3.75% sol having a different concentration of the sol solution were prepared, and the substrate (glass plate) of 6) above which had been washed with aqua regia was immersed in each sol solution for 10 minutes, pulled out, and dried at 150° C. for 30 minutes. The substrates and the coating films that had been dried were calcined at 500° C. for 5 hours to form porous alumina films of 1% $SiO_2Al_2O_3$ on the substrate surface.

Figure 50:
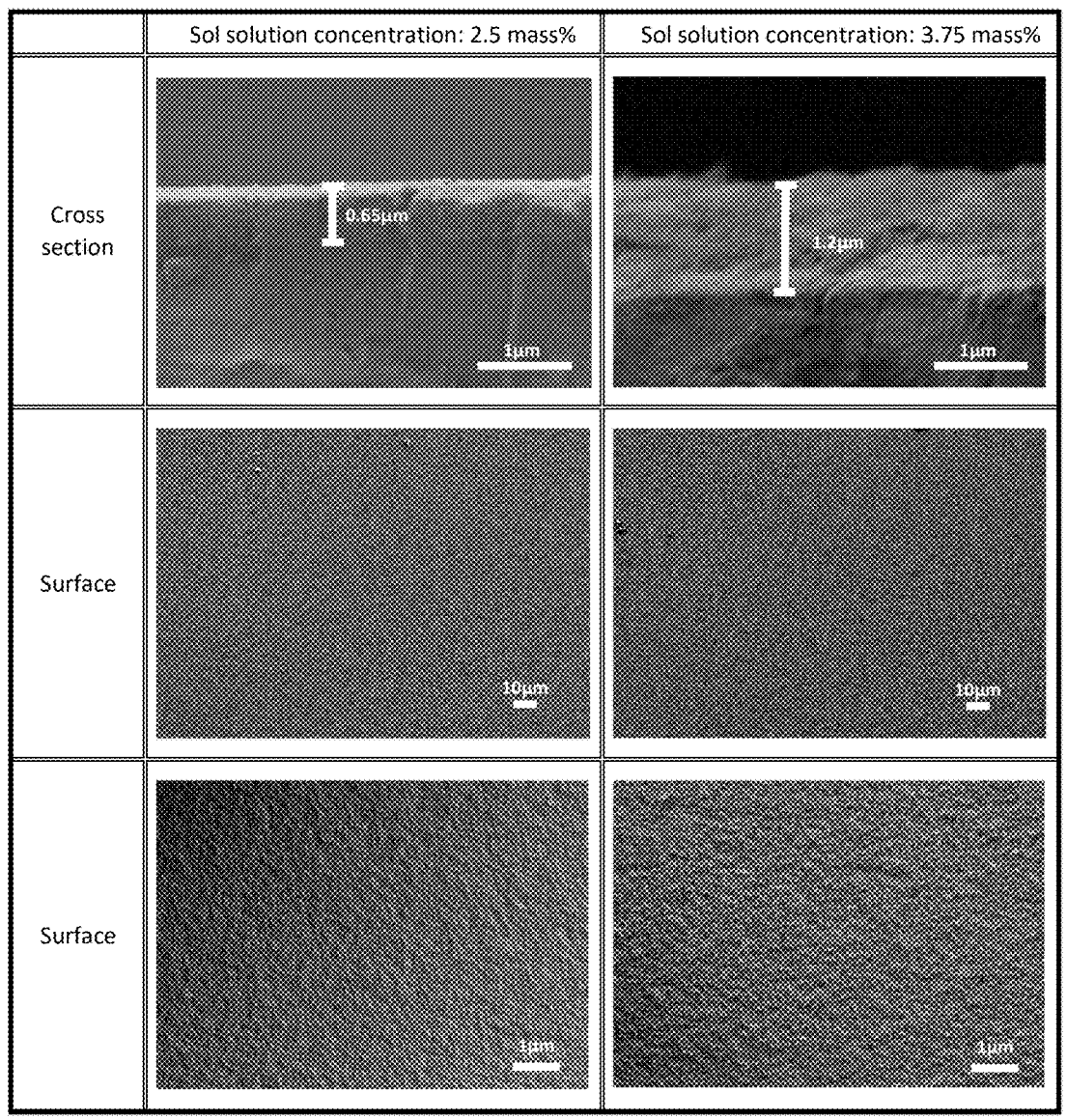
FIG. 50 is FE-SEM photographs of the cross section and surface of porous alumina films of 1% $SiO_2Al_2O_3$ formed on a glass plate surface using two types of 1% $SiO_2Al_2O_3$ containing sol solutions having sol solution concentrations of 2.5 mass % and 3.75 mass %.

FIG. 50 shows SEM photographs taken by the above-described FE-SEM of the cross section and surface of porous alumina films of 1% $SiO_2Al_2O_3$ formed using two types of 1% $SiO_2Al_2O_3$ containing sol solutions having different sol solution concentrations of Example 17. From the cross-sectional photograph of FIG. 50, it turns out that the porous alumina film was formed in close contact with the glass plate in both cases of the two types of coated sol solutions having different sol solution concentrations. The thicknesses of the porous alumina films ware 0.65 µm at sol solution concentration of 2.5 mass % and 1.2 µm at sol solution concentration of 3.75 mass %. As a result, it turns out that the film thickness of the porous alumina film can be adjusted by the sol solution concentration. Furthermore, from the surface photograph of FIG. 50, it was confirmed that the porous alumina films uniformly covered the surface of the glass plate in both sol solution concentrations. From the above, it turns out that by using $SiO_2Al_2O_3$ containing sol solution or Ba-added $SiO_2Al_2O_3$ containing sol solution synthesized by the first to sixth synthesis methods, a porous alumina film can be easily formed on the substrate surface with uniformity and excellent adhesion even if the surface is flat.

Next, the verified results of the solution state of the sol solution prepared in Step #71 of the present forming method and the adhesion of the coating film to the substrate surface will be described. In Step #71, in the manner of Example 1 of the first synthesis method, three types of sol solutions in which the solution states were the gel, the sol, and the precipitate were prepared by changing pH value of the slurry solution in three ways in the pH adjusting treatment on the slurry solution of Step #15. Solutions of the gel and the precipitate were also sufficiently stirred to form a homogeneous solution. Then, the glass plates washed with aqua regia were immersed in the three solutions for 10 minutes, pulled up, and dried at 150° C. for 30 minutes. The dried substrates and the coating films were calcined at 500° C. for 5 hours to form $SiO_2Al_2O_3$ porous alumina films on the substrates.

When the solution state was the sol, the porous alumina film formed was transparent, and the underlying pattern could be visually confirmed as with the glass plate, and the formation of a porous alumina film having homogeneity and excellent adhesion was confirmed. However, in the porous alumina film formed when the solution state is the gel, it was confirmed that the thin film had been peeled off, and it was not possible to form a porous alumina film that was homogeneous and excellent in adhesion. In addition, when the solution state was the precipitate, the surface of the porous alumina film became cloudy, and the porous alumina film could not be uniformly formed on the substrate surface. Therefore, it can be said that an optimum solution state for forming a porous alumina film having homogeneity and excellent adhesion is the sol state.

[29] Evaluation of Heat Resistance of the Present Forming Method (1)

In Example 15 of the present forming method, the heat resistance of the porous alumina films of 1% $SiO_2Al_2O_3$ and 3% $SiO_2Al_2O_3$ formed on the five types of substrate surfaces of the above 1) to 5) were evaluated in the following manner. Since it is difficult to separate the porous alumina films formed from the substrates and measure the specific surface area thereof alone, the specific surface area Sa (m²/g) of the porous alumina film was calculated from the relational expression shown in the following calculation formula (2).

$$St = Sa \times x/100 + Sb \times (1 - x/100) \qquad (2)$$

In the calculation formula (2), Sb represents the specific surface area (m²/g) of the respective substrates used, and St represents the specific surface area (m²/g) of the entire sample of the substrate and the porous alumina film, and x represents the supported amount given by the calculation formula (1). The specific surface areas Sb and St are values to be measured by the nitrogen adsorption BET method in the same manner as the method for measuring the specific surface area explained in the above-described "Evaluation of heat resistance of the first synthesis method (1)".

Table 17 below shows the supported amounts x (mass %) and the three types of the specific surface areas St, Sa and Sb (m²/g) after the initial heat treatment of 1% $SiO_2Al_2O_3$ formed on the five types of substrate surfaces of above-described 1) to 5) and the specific surface area Sc1 (m²/g) of 1% $SiO_2Al_2O_3$ powder obtained by drying and calcining (initial heat treatment) 1% $SiO_2Al_2O_3$3.75% sols prepared for each substrate in Example 15 as the comparative example without being coated to the substrates. Furthermore, Table 18 below shows the supported amounts x (mass %) and the three types of the specific surface areas St, Sa and Sb (m²/g) after the initial heat treatment of 3% $SiO_2Al_2O_3$ formed on the five types of substrate surfaces of above-described 1) to 5) and the specific surface area Sc2 (m²/g) of 3% $SiO_2Al_2O_3$ powder obtained by drying and calcining (initial heat treatment) 3% $SiO_2Al_2O_3$3.75% sols prepared for each substrate in Example 15 as the comparative example without being coated to the substrates. In Table 17 and Table 18, the specific surface areas Sb when the substrates are glass cloth and silica cloth were not measurable by the nitrogen adsorption BET method, and therefore were set to 0 (m²/g).

TABLE 17

| Substrate | Initial heat treatment | Supported amount x (mass %) | Specific surface area (m²/g) | | | |
|---|---|---|---|---|---|---|
| | | | Sb | St | Sa | Sc1 |
| cicaAl | 1000° C. 5 h | 3.1 | 5.3 | 8.6 | 111 | 122 |
| SiC-DPF | 1000° C. 5 h | 6.3 | 3.5 | 13.6 | 165 | 131 |
| Silica filter | 1000° C. 5 h | 64.2 | 2.4 | 97.2 | 150 | 131 |
| Glass cloth | 500° C. 5 h | 3.3 | 0 | 7.0 | 210 | 217 |
| Silica cloth | 1000° C. 5 h | 5.7 | 0 | 9.3 | 162 | 131 |

TABLE 18

| Substrate | Initial heat treatment | Supported amount x (mass %) | Specific surface area (m²/g) | | | |
|---|---|---|---|---|---|---|
| | | | Sb | St | Sa | Sc2 |
| cicaAl | 1000° C. 5 h | 4.1 | 5.3 | 9.4 | 105 | 146 |
| SiC-DPF | 1000° C. 5 h | 9.9 | 3.5 | 16.8 | 138 | 175 |
| Silica filter | 1000° C. 5 h | 53.4 | 2.4 | 95.0 | 176 | 175 |
| Glass cloth | 500° C. 5 h | 5.0 | 0 | 11.9 | 239 | 257 |
| Silica cloth | 1000° C. 5 h | 7.6 | 0 | 12.3 | 162 | 154 |

As shown in Table 17 and Table 18, a comparison of the specific surface areas Sa of the porous alumina films calculated by the calculation formula (2) and the specific surface areas Sc1, Sc2 of $SiO_2Al_2O_3$ powders of the comparative examples shows that they have approximately the same specific surface area. From this, it is considered that the evaluation results of the heat resistance of the first to sixth synthesis methods described above are also appropriate in evaluation of the heat resistance of the porous alumina films formed on the various substrate surfaces. Therefore, it was confirmed that $SiO_2Al_2O_3$ film or Ba-added $SiO_2Al_2O_3$ film having a high specific surface area can be formed by applying $SiO_2Al_2O_3$ containing sol solution or Ba-added $SiO_2Al_2O_3$ containing sol solution synthesized by the first to sixth synthesis methods to various substrate surfaces.

[30] Evaluation of Heat Resistance of the Present Forming Method (2)

In Example 16 of the present forming method, the heat resistances of porous alumina films of 6.5% BaO-1% $SiO_2Al_2O_3$ formed on the surfaces of the two types of substrates (cicaAl, silica cloth) of above-described 1) and 5) (hereinafter, collectively referred to as "present film sample Sf") were evaluated in the following manner.

As the present film sample Sf, porous alumina films (the present samples SfA) of 6.5% BaO-1% $SiO_2Al_2O_3$ were prepared for the two types of substrates through the calcination of the initial heat treatment (1000° C. for 5 hours) in Example 16 of the present forming method. In addition, the present samples SfB obtained by adding the first heat treatment at 1200° C. for 5 hours to the present samples SfA and the present samples SfC obtained by adding the second heat treatment at 1200° C. for 30 hours to the present samples SfA were prepared, respectively.

Table 19 below shows the specific surface areas St and the specific surface areas Sa of the present samples SfA to SfC formed for the surfaces of the above two types of substrates (cicaAl and silica cloth) for each substrate.

TABLE 19

| | | Specific surface area (m²/g) | | |
|---|---|---|---|---|
| Substrate | | (1000° C. 5 h) SfA | (1200° C. 5 h) SfB | (1200° C. 30 h) SfC |
| cicaAl | Specific surface area St | 10.3 | 7.5 | 6.3 |
| | Specific surface area Sa | 110 | 52 | 26 |
| Silica cloth | Specific surface area St | 7.6 | 4.6 | 2.6 |
| | Specific surface area Sa | 123 | 74 | 42 |

As shown in Table 19, the specific surface areas Sa of the present samples SfA to SfC are close to the specific surface areas of the present samples S7A to S7C shown in Table 11 above (the present powder sample S7 obtained by drying and calcining 6.5% BaO-1% $SiO_2Al_2O_3$2.5% sol synthesized by the fifth synthesis method). As a result, it was confirmed that Ba-added $SiO_2Al_2O_3$ film having a high specific surface area was formed by applying Ba-added $SiO_2Al_2O_3$ containing sol solution synthesized by the fifth or sixth synthesis methods to various substrate surfaces.

Figure 51:
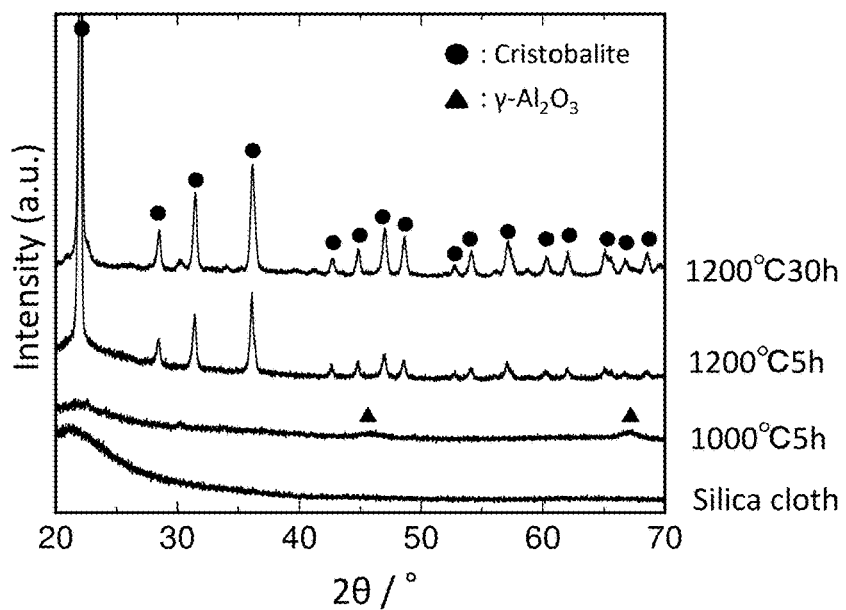
FIG. 51 is an XRD pattern diagram showing the crystal structures after the initial heat treatment, the first heat treatment, and the second heat treatment of 6.5% BaO-1% $SiO_2Al_2O_3$ formed on the surface of the silica cloth and of the silica cloth alone.

FIG. 51 shows XRD patterns showing the crystal structures after the respective heat treatments in the present samples SfA to SfC in which the substrate is silica cloth. The supported amount x is 6.2 mass %. Note that FIG. 51 also shows an XRD pattern of the substrate on which Ba-added $SiO_2Al_2O_3$ film is not formed, as a reference. As shown in FIG. 51, in the calcination at 1000° C. for 5 hours (initial heat treatment), peaks of $\gamma$-$Al_2O_3$ were detected, and in the calcinations at 1200° C. for 5 hours and 30 hours (first and second heat treatments), peaks of cristobalite were detected with crystallization of $SiO_2$ of the substrate. However, peaks of $\alpha$-$Al_2O_3$ peaks were not detected in the present sample SfC calcined at 1200° C. for 30 hours, and it was confirmed that the heat resistance of $Al_2O_3$ was maintained even at high temperatures due to the barium addition effect.

Eighth Embodiment

Hereinafter, the eighth embodiment of the present synthesis method (the seventh synthesis method) will be described.

[31] Basic Structure of the Seventh Synthesis Method

Figure 52:
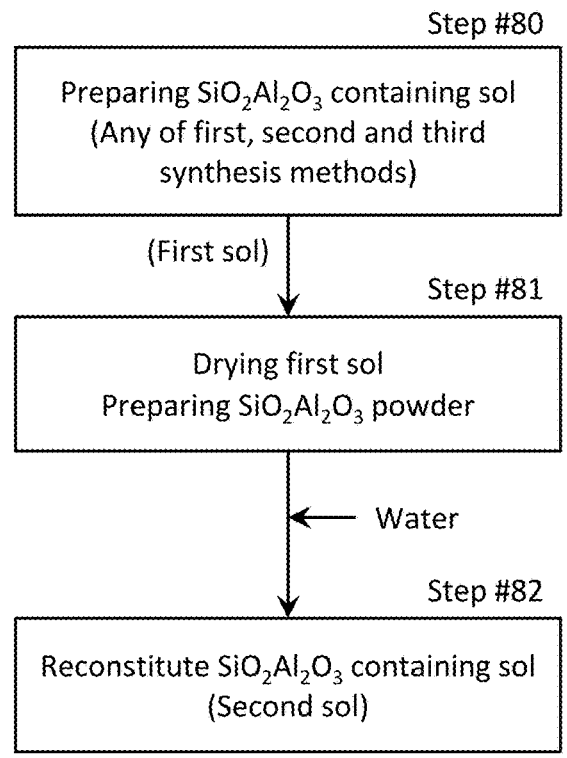
FIG. 52 is a process transition diagram showing an outline of a method for synthesizing $SiO_2Al_2O_3$ containing sol solution according to the eighth embodiment (the seventh synthesis method).

As shown in the process transition diagram of FIG. 52, the seventh synthesis method is roughly divided into a step (Step #80) of preparing $SiO_2Al_2O_3$ containing sol solution by any of the first, second, and third synthesis methods described above, a step (Step #81) of preparing $SiO_2Al_2O_3$ powder by drying $SiO_2Al_2O_3$ containing sol solution prepared in Step #80, and a step (Step #82) of adding water to $SiO_2Al_2O_3$ powder, and stirring the mixture to reconstitute $SiO_2Al_2O_3$ containing sol solution having a desired sol solution concentration. As one implementation, the drying process of Step #81 is preferably performed, for example, at 150° C. Hereinafter, the sol solution obtained in Step #80 is referred to as "the first sol", and the sol solution obtained in Step #82 is referred to as "the second sol" as appropriate.

The seventh synthesis method is advantageous in that the sol solution concentration of $SiO_2Al_2O_3$ containing sol solution after the reconstitution can be easily controlled by adjusting the amount of water to be added in Step #82 with respect to the mass of $SiO_2Al_2O_3$ powder obtained in Step #81.

Figure 53:
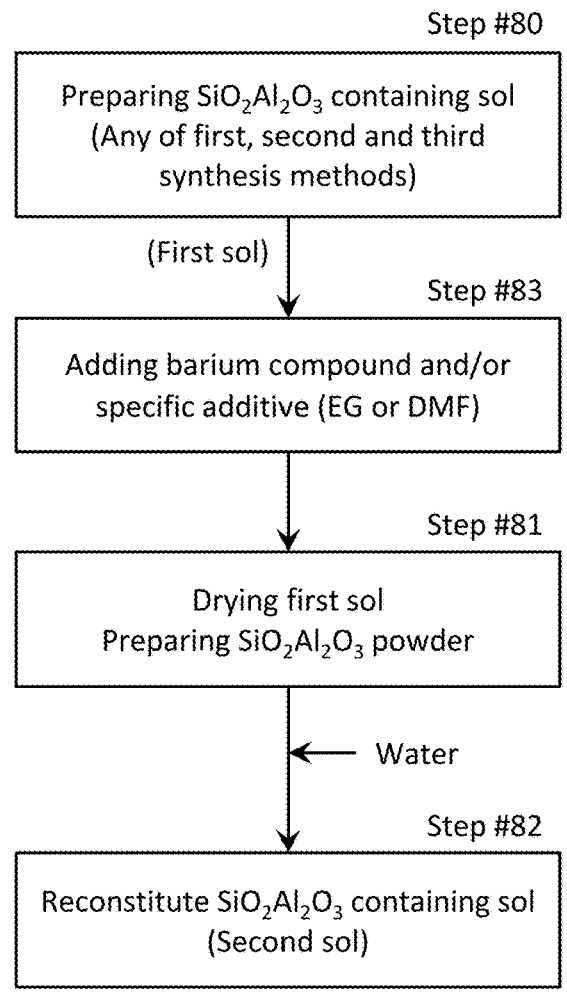
FIG. 53 is a process transition diagram showing an outline of an example of a method for synthesizing Ba-added $SiO_2Al_2O_3$ containing sol solution according to the eighth embodiment (Example 20 of the seventh synthesis method).
Figure 54:
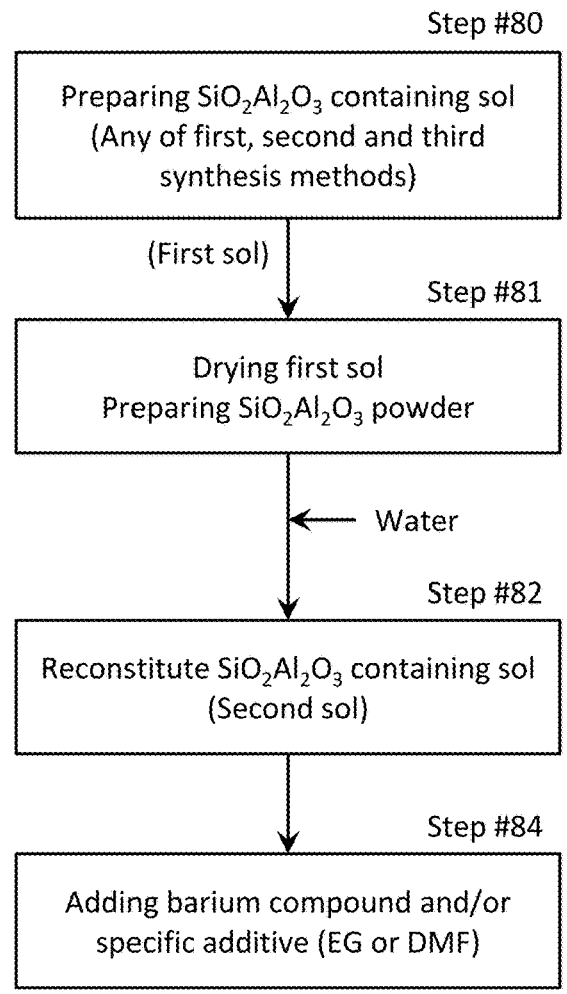
FIG. 54 is a process transition diagram showing an outline of an example of a method for synthesizing Ba-added $SiO_2Al_2O_3$ containing sol solution according to the eighth embodiment (Example 21 of the seventh synthesis method).

Step #80 is the same as Steps #40, #50, and #60 in the fourth, fifth, and sixth synthesis methods. Therefore, in the fourth, fifth, and sixth synthesis methods, the specific additive (EG or DMF) or the barium compound or both to be added to $SiO_2Al_2O_3$ containing sol solution prepared in Step #40, #50, or #60 can be added to $SiO_2Al_2O_3$ containing sol solution (the first sol), which was prepared in Step #80, in Step #83 prior to the drying treatment in Step #81 in the seventh synthesis method, as shown in FIG. 53. Furthermore, as shown in FIG. 54, the addition of the specific additive and/or the barium compound can be performed in Step #84 with respect to $SiO_2Al_2O_3$ containing sol solution (the second sol) reconstituted in Step #81.

[32] Examples of the Seventh Synthesis Method

[32.1] Examples 18 and 19

Hereinafter, an example (Example 18) of Steps #80 to #82 for synthesizing $SiO_2Al_2O_3$ containing sol solution having $SiO_2$ concentration of 1 mass % using aluminum nitrate as the aluminum compound will be described.

In Example 18, in Step #80, $SiO_2Al_2O_3$ containing sol solution having $SiO_2$ concentration of 1 mass % is synthesized using the first synthesis method as an example. In Step #80 of Example 18, TEOS solution and the aluminum nitrate solution having the same solution concentrations as those used in Steps #12 and #13 of Example 1 of the first synthesis method were subjected to the autoclave treatment in the same manner as in Example 1 by multiplying the respective amounts by 1.5 to obtain a total amount 80 g of $SiO_2Al_2O_3$ containing sol solution (the first sol) having $SiO_2$ concentration of 1 mass % and sol solution concentration of 3.75 mass %. The sol solution concentration is 1.5 times the 2.5 mass % of Example 1, and 1% $SiO_2Al_2O_3$ powder obtained by drying this sol solution at 150° C. in Step #81 is 3.0 g. Subsequently, in Step #82, 80 g of water was added with 3.0 g of 1% $SiO_2Al_2O_3$ powder obtained in Step #81, and the mixture was stirred at room temperature for 30 minutes to obtain a total amount 83 g of 1% $SiO_2Al_2O_3$ containing sol solution (the second sol). The sol solution concentration is 3.61%.

In Step #80 of Example 18, $SiO_2$ concentration can be adjusted by changing the mixing ratio of TEOS solution and the aluminum nitrate solution as explained in the above-described "[1] Basic structure of the first synthesis method".

Furthermore, in the example using sodium aluminate instead of aluminum nitrate as the aluminum compound (Example 19), in Step #80, $SiO_2Al_2O_3$ containing sol solution having a desired $SiO_2$ concentration is synthesized using the second or third synthesis methods described above. By performing Step #81 and Step #82 in the same manner as in Example 18, $SiO_2Al_2O_3$ containing sol solution (the second sol) having desired sol solution concentration and $SiO_2$ concentration can be obtained.

The solution state of 1% $SiO_2Al_2O_3$ containing sol solution (the second sol) obtained in Example 18 was the sol state similar to the solution state of 1% $SiO_2Al_2O_3$ containing sol solutions synthesized in Example 1 of the first synthesis method and Example 5 of the third synthesis method.

[32.2] Examples 20, 21 (Addition of Specific Additive and Barium Compound)

Next, two examples (Example 20 and Example 21) for synthesizing $SiO_2Al_2O_3$ containing sol solution having $SiO_2$ concentration of 1 mass %, to which the specific additive and the barium compound are added, will be described. As in Example 18, aluminum nitrate was used as the aluminum compound.

In Example 20, as shown in FIG. 53, in Step #80, 1% $SiO_2Al_2O_3$ containing sol solution having sol solution concentration of 3.75 mass % (the first sol) was prepared in the same manner as in Example 18, and in Step #83, 0.3579 g of barium nitrate as the barium compound and 3 mass % of DMF in the total amount of the sol solution after the addition as the specific additive were respectively added to the first sol and the mixture was stirred to obtain 6.5% BaO-1% $SiO_2Al_2O_3$.75% sol solution to which DMF was added. Subsequently, in Step #81, the sol solution prepared in Step #83 was dried at 150° C. in the same manner as in Example 18 to obtain 6.5% BaO-1% $SiO_2Al_2O_3$ powder to which DMF was added. Subsequently, in Step #82, in the same manner as in Example 18, 80 g of water was added with 6.5% BaO-1% $SiO_2Al_2O_3$ powder, to which DMF was added, obtained in Step #81, and the mixture was stirred at room temperature for 30 minutes to obtain 6.5% BaO-1% $SiO_2Al_2O_3$ containing sol solution (the second sol) to which DMF was added.

In Example 21, as shown in FIG. 54, in Steps #80 to #82, the same process as in Example 18 was performed to obtain a total amount 83 g of 1% $SiO_2Al_2O_3$ containing sol solution (the second sol). Subsequently, in Step #84, 0.3579 g of barium nitrate as the barium compound and 3 mass % of DMF in the total amount of the sol solution after the addition as the specific additive were respectively added to the second sol and the mixture was stirred to obtain 6.5% BaO-1% $SiO_2Al_2O_3$ containing sol solution to which DMF was added.

Example 20 and Example 21 are different in the timing of adding the specific additive and the barium compound when performing Steps #80 to #82 of Example 18. In Example 20, the specific additive and the barium compound are added to the first sol after Step #80, and in Example 21 the specific additive and a barium compound are added to the second sol after Step #82. In both Example 20 and Example 21, the powders of the added specific additive and the barium compound were completely dissolved in the second sol, allowing the preparation of a uniform 6.5% BaO-1% $SiO_2Al_2O_3$ containing sol solution with DMF added.

[32.3] Example 22 (Preparation of High Concentration Sol Solution)

In order to increase the supported amount on the support, increasing the concentration of the sol solution by the seventh synthesis method was investigated. Hereinafter, an example (Example 22) of Steps #80 to #82 for synthesizing $SiO_2Al_2O_3$ containing sol solution having $SiO_2$ concentration of 1 mass % and sol solution concentration of 10.31 mass % using aluminum nitrate as the aluminum compound will be described.

Figure 55:
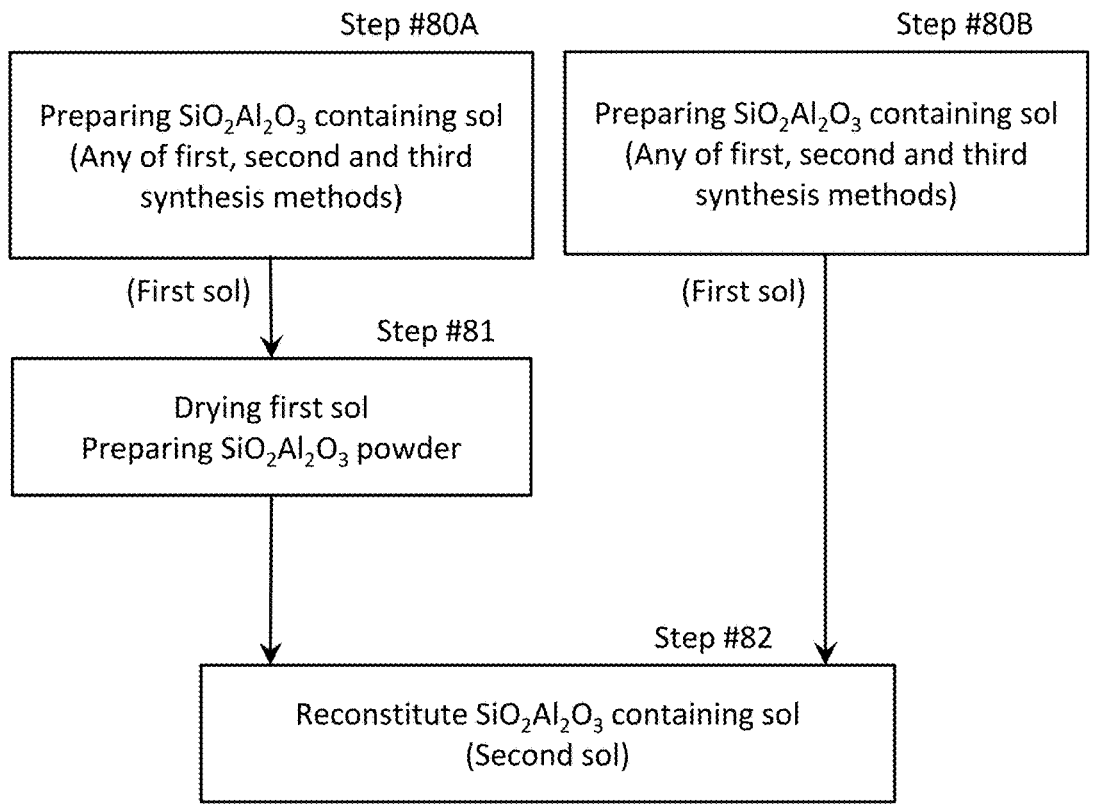
FIG. 55 is a process transition diagram showing an outline of an example of a method for synthesizing $SiO_2Al_2O_3$ containing sol solution having high sol solution concentration according to the eighth embodiment (Example 22 of the seventh synthesis method).

In Example 22, as shown in FIG. 55, there are two Steps #80 (Step #80A, Step #80B). In Example 22, the two Steps #80 correspond to Steps #11 to #15 of Example 1 of the first synthesis method. Also, since $SiO_2Al_2O_3$ containing sol solutions synthesized in the two Steps #80 have the same $SiO_2$ concentration as 1 mass %, the mixing ratios of TEOS solution and the aluminum nitrate solution are the same, but since sol solution concentrations of $SiO_2Al_2O_3$ containing sol solutions to be synthesized are different, the amounts of TEOS solution and the aluminum nitrate solution to be used are different between Step #80A and Step #80B.

In Step #80A, the same process as in Example 18 was carried out to obtain a total amount 80 g of 1% $SiO_2Al_2O_3 3.75\%$ sol (the first sol). Subsequently, in Step #81, the sol solution was dried at 150° C. to obtain 3.0 g of 1% $SiO_2Al_2O_3$ powder. On the other hand, in Step #80B, using TEOS solution and the aluminum nitrate solution having the same solution concentrations as those used in Steps #12 and #13 of Example 1 of the first synthesis method with the respective amounts multiplied by 3.2, the autoclave treatment was performed in the same manner as in Example 1 to obtain a total amount 80 g of $SiO_2Al_2O_3$ containing sol solution (the first sol) having $SiO_2$ concentration of 1 mass % and sol solution concentration of 8 mass %. Note that either Step #80A or Step #80B may be executed first or simultaneously. Next, in Step #82, 2.47 g of 1% $SiO_2Al_2O_3$ powder obtained in Step #81 was weighed and added to a total amount 80 g of 1% $SiO_2Al_2O_3 8\%$ sol (the first sol) obtained in Step #80B, and the mixture was stirred to obtain $SiO_2Al_2O_3$ containing sol solution (the second sol) having $SiO_2$ concentration of 1 mass % and sol solution concentration of 10.31 mass %. The additive amount (mixing ratio) of 1% $SiO_2Al_2O_3$ powder in Step #82 was set to 3 mass % with respect to the sol solution after the addition. 2.10 g of 1% $SiO_2Al_2O_3$ (alumina) is obtained from 2.47 g of 1% $SiO_2Al_2O_3$ powder (boehmite). Therefore, the sol solution concentration obtained in Step #82 is 10.31 mass % (=(80 g×8 mass %+2.1 g)/82.47 g).

As described above, in Step #82 of Example 18, 1% $SiO_2Al_2O_3$ powder obtained in Step #81 was added to 80 g of water, whereas in Step #82 of Example 22, 1% $SiO_2Al_2O_3$ powder obtained in Step #81 was added to 80 g of 1% $SiO_2Al_2O_3 8\%$ sol obtained in Step #80B, thereby increasing the concentration of $SiO_2Al_2O_3$ containing sol solution (the second sol) obtained in Step #82. When aluminum nitrate is used as the aluminum compound, as shown in FIG. 4 and the like, in the first synthesis method or the third synthesis method, it was difficult to realize sol solution concentration of 10 mass % or more, but it was confirmed that by applying the seventh synthesis method, the concentration of the sol solution can be increased to 10 mass % or more.

[33] Evaluation of Heat Resistance of the Seventh Synthesis Method (1)

The heat resistances of $SiO_2Al_2O_3$ powders obtained by drying and calcining $SiO_2Al_2O_3$ containing sol solutions (the second sol) having $SiO_2$ concentrations of 1 mass % and 3 mass % synthesized in Example 18 of the seventh synthesis method using aluminum nitrate as the aluminum compound (hereinafter, collectively referred to as the "present powder sample S11") were evaluated.

As the present powder samples S11, $SiO_2Al_2O_3$ containing sol solutions having $SiO_2$ concentrations of 1 mass % and 3 mass % obtained through Steps #80 to #82 of Example 18 were dried at 150° C. and subsequently pulverized into powders, and the powders were calcined in the air at 1000° C. for 5 hours (initial heat treatment), so that $SiO_2Al_2O_3$ powders (present samples S11A) were prepared. In addition, present samples S11B obtained by adding the first heat treatment at 1200° C. for 5 hours to the present samples S11A, and present samples S11C obtained by adding the second heat treatment at 1200° C. for 30 hours to the present samples S11A were prepared.

Table 20 below shows the measurement results of the respective specific surface areas (m²/g) of the present samples S11A to S11C prepared at $SiO_2$ concentrations of 1 mass % and 3 mass %. For comparison purposes, the measurement results of the respective specific surface areas of the present samples S1A to S1C prepared by the first synthesis method (Example 1) having $SiO_2$ concentrations of 1 mass % and 3 mass % and the measurement results of the respective specific surface areas of the present samples S3A to S3C prepared by the third synthesis method (Example 5) having $SiO_2$ concentrations of 1 mass % and 3 mass % are also shown in Table 20.

TABLE 20

| $SiO_2$ concentration | Sample | Specific surface area (m²/g) | | |
|---|---|---|---|---|
| | | 1000° C. 5 h S11A/S1A/ S3A | 1200° C. 5 h S11B/S1B/ S3B | 1200° C. 30 h S11C/S1C/ S3C |
| 1 mass % | S11A-S11C | 138 | 18 | 13 |
| | S1A-S1C | 122 | 24 | 15 |
| | S3A-S3C | 138 | 26 | 17 |
| 3 mass % | S11A-S11C | 172 | 54 | 30 |
| | S1A-S1C | 175 | 56 | 39 |
| | S3A-S3C | 143 | 47 | 29 |

Figure 56:
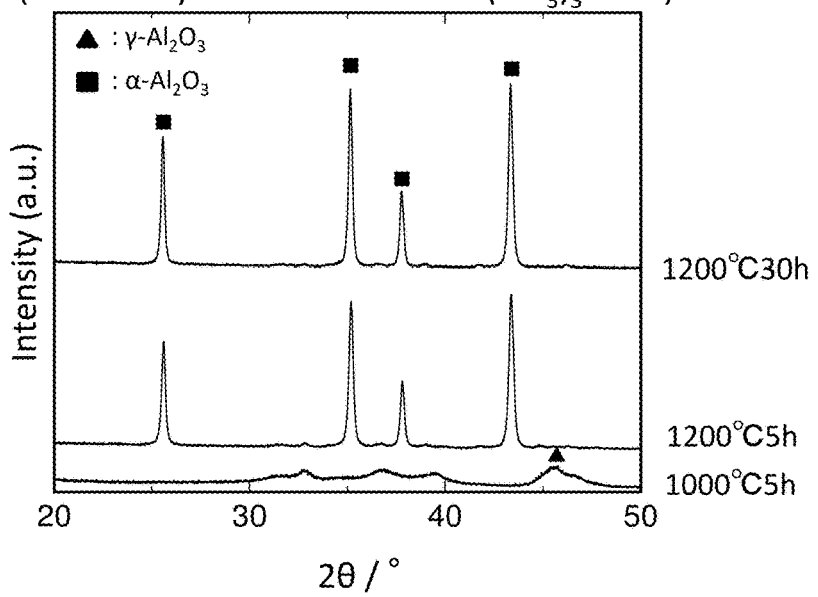
FIG. 56 is an XRD pattern diagram showing the crystal structures after the initial heat treatment, the first heat treatment, and the second heat treatment of the present powder sample S11 having $SiO_2$ concentration of 1 mass % prepared by drying and calcining $SiO_2Al_2O_3$ containing sol solution synthesized by Example 18 of the seventh synthesis method.

Furthermore, FIG. 56 shows XRD patterns showing the crystal structure after the respective heat treatments in the present sample S11A, the present sample S11B, and the present sample S11C, each having $SiO_2$ concentration of 1 mass %. XRD patterns showing the crystal structure after the respective heat treatments in the present sample S1A, the present sample S1B, and the present sample S1C, each having $SiO_2$ concentration of 1 mass %, prepared by the first synthesis method are shown in FIG. 9, and XRD patterns showing the crystal structure after the respective heat treatments in the present sample S3A, the present sample S3B, and the present sample S3C, each having $SiO_2$ concentration of 1 mass %, prepared by the third synthesis method are shown in FIG. 26.

From the measurement results shown in Table 20, it turns out that the samples prepared by the seventh synthesis method also exhibit the same specific surface areas as those prepared by the first synthesis method and the third synthesis method. Furthermore, a comparison of XRD patterns of the samples prepared by the seventh synthesis method shown in FIG. 56 and XRD patterns of the samples prepared by the first synthesis method and the third synthesis method shown in FIGS. 9 and 26 shows that similar peaks are expressed. By taking the measurement results shown in Table 20 into consideration, it can be confirmed that the respective samples prepared by the first, third, and seventh synthesis methods have the same physical properties.

[34] Evaluation of Heat Resistance of the Seventh Synthesis Method (2)

The heat resistances of $SiO_2Al_2O_3$ powders obtained by drying and calcining $SiO_2Al_2O_3$ containing sol solutions (the second sol) having $SiO_2$ concentrations of 1 mass % and 3 mass % synthesized in Example 19 of the seventh synthesis method using sodium aluminate as the aluminum compound (hereinafter, collectively referred to as the "present powder samples S12") were evaluated.

As the present powder samples S12, $SiO_2Al_2O_3$ containing sol solutions having $SiO_2$ concentrations of 1 mass % and 3 mass % obtained through Steps #80 to #82 of Example 19 were dried at 150° C. and subsequently pulverized into powders, and the powders were calcined in the air at 1000° C. for 5 hours (initial heat treatment), so that $SiO_2Al_2O_3$ powders (present samples S12A) were prepared. In addition, present samples S12B obtained by adding the first heat treatment at 1200° C. for 5 hours to the present samples S12A and the present samples S12C obtained by adding the second heat treatment at 1200° C. for 30 hours to the present samples S12A were prepared.

Table 21 below shows the measured results of the respective specific surface areas ($m^2/g$) of the present samples S12A to S12C prepared at $SiO_2$ concentrations of 1 mass % and 3 mass %. For comparison purposes, the measurement results of the respective specific surface areas of the present samples S2A to S2C prepared by the second synthesis method (Example 4) having $SiO_2$ concentrations of 1 mass % and 3 mass % and the measurement results of the respective specific surface areas of the present samples S4A to S4C prepared by the third synthesis method (Example 6) having $SiO_2$ concentrations of 1 mass % and 3 mass % are also shown in Table 21.

TABLE 21

| $SiO_2$ concentration | Sample | Specific surface area ($m^2/g$) | | |
|---|---|---|---|---|
| | | 1000° C. 5 h S12A/S2A/ S4A | 1200° C. 5 h S12B/S2B/ S4B | 1200° C. 30 h S12C/S2C/ S4C |
| 1 mass % | S12A-S12C | 149 | 28 | 16 |
| | S2A-S2C | 134 | 23 | 15 |
| | S4A-S4C | 130 | 23 | 17 |
| 3 mass % | S12A-S12C | 161 | 71 | 52 |
| | S2A-S2C | 130 | 52 | 37 |
| | S4A-S4C | 149 | 48 | 36 |

Figure 57:
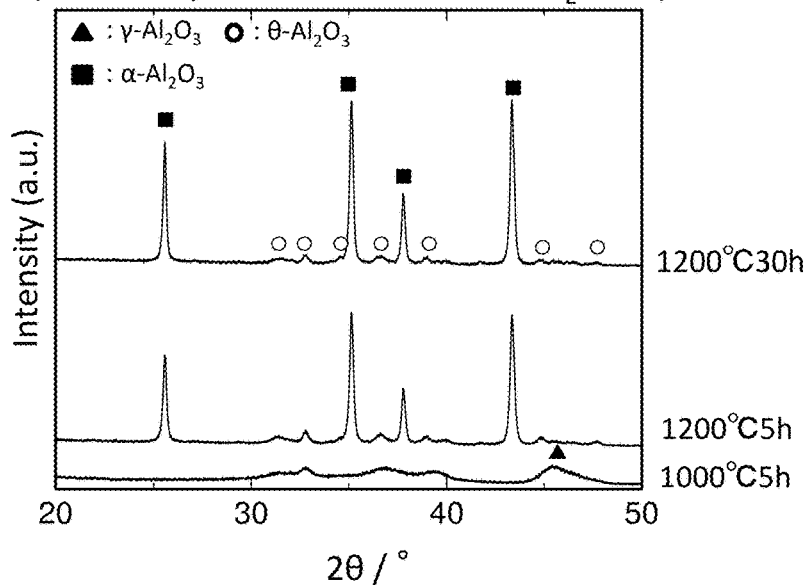
FIG. 57 is an XRD pattern diagram showing the crystal structures after the initial heat treatment, the first heat treatment, and the second heat treatment of the present powder sample S12 having $SiO_2$ concentration of 1 mass % prepared by drying and calcining $SiO_2Al_2O_3$ containing sol solution synthesized by Example 19 of the seventh synthesis method.

FIG. 57 shows XRD patterns showing the crystal structure after the respective heat treatments in the present sample S12A, the present sample S12B, and the present sample S12C, each having $SiO_2$ concentration of 1 mass %. XRD patterns showing the crystal structure after the respective heat treatments in the present sample S2A, the present sample S2B, and the present sample S2C, each having $SiO_2$ concentration of 1 mass %, prepared by the second synthesis method are shown in FIG. 18, and XRD patterns showing the crystal structure after the respective heat treatments in the present sample S4A, the present sample S4B, and the present sample S4C, each having $SiO_2$ concentration of 1 mass %, prepared by the third synthesis method are shown in FIG. 30.

From the measurement results shown in Table 21, it turns out that the samples prepared by the seventh synthesis method also exhibit the same specific surface areas as those prepared by the second synthesis method and the third synthesis method. Furthermore, a comparison of XRD patterns of the samples prepared by the seventh synthesis method shown in FIG. 57 and XRD patterns of the samples prepared by the second synthesis method and the third synthesis method shown in FIGS. 18 and 30 shows that similar peaks are expressed. By taking the measurement results shown in Table 21 into consideration, it can be confirmed that the respective samples prepared by the second, third, and seventh synthesis methods have the same physical properties.

[35] Evaluation of Heat Resistance of the Seventh Synthesis Method (3)

The heat resistances of two types of 6.5% BaO-1% $SiO_2Al_2O_3$ powders with the specific additive (DMF) added, which were obtained by drying and calcining 6.5% BaO-1% $SiO_2Al_2O_3$ containing sol solutions, to which the specific additive (DMF) was added, synthesized respectively in Example 20 and Example 21 of the seventh synthesis method using aluminum nitrate as the aluminum compound (hereinafter, collectively referred to as the "present powder sample S13" and the "present powder sample S14") were evaluated.

As the present powder sample S13, 6.5% BaO-1% $SiO_2Al_2O_3$ containing sol solution (the second sol), to which DMF was added, obtained through Steps #80, #83, #81, #82 of Example 20 was dried at 150° C. and subsequently pulverized into a powder, and the powder was calcined at 1000° C. for 5 hours (initial heat treatment) in the air so that BaO—$SiO_2Al_2O_3$ powder to which DMF was added (present sample S13A) was prepared. In addition, a present sample S13B obtained by adding the first heat treatment at 1200° C. for 5 hours to the present sample S13A, and present sample S13C obtained by adding the second heat treatment at 1200° C. for 30 hours to the present sample S13A were prepared.

As the present powder sample S14, 6.5% BaO-1% $SiO_2Al_2O_3$ containing sol solution (the second sol), to which DMF was added, obtained through Steps #80 to #82, #84 of Example 21 was dried at 150° C. and subsequently pulverized into a powder, and the powder was calcined at 1000° C. for 5 hours (initial heat treatment) in the air so that BaO—$SiO_2Al_2O_3$ powder to which DMF was added (present sample S14A) was prepared. In addition, a present sample S14B obtained by adding the first heat treatment at 1200° C. for 5 hours to the present sample S14A, and a present sample S14C obtained by adding the second heat treatment at 1200° C. for 30 hours to the present sample S14A were prepared.

Table 22 below shows the measurement results of the respective specific surface areas ($m^2/g$) of the present samples S13A to S13C and the present samples S14A to S14C, each having $SiO_2$ concentration of 1 mass % and the total pore volumes ($cm^3/g$) of the present sample S13B and the present sample S14B, each having $SiO_2$ concentration of 1 mass %. For comparison purposes, the measurement results of the respective specific surface areas of the present samples S11A to S11C having $SiO_2$ concentration of 1 mass %, to which the specific additive (DMF) and the barium compound were not added, prepared in Example 18 of the seventh synthesis method (see Table 20) and the total pore volume of the present sample S11B, and the measurement results of the respective specific surface areas of the present samples S9A to S9C having $SiO_2$ concentration of 1 mass %, to which the specific additive (DMF) and the barium compound were added, prepared by the sixth synthesis method (Example 13) and the total pore volume of the present sample S9B (see Table 14) are also shown in Table 22.

Furthermore, as shown in Table 22, the present powder sample S13 and the present powder sample S14 prepared in Example 20 and Example 21 of the seventh synthesis method exhibit the specific surface area and total pore volume comparable with the present powder sample S9 prepared in the sixth synthesis method (Example 13), and thereby it was confirmed that the addition of DMF and the barium compound is effective.

TABLE 22

| BaO concentration (mass %) | DMF | Sample | Specific surface area (m²/g) | | | Total pore volume (cm³/g) |
| --- | --- | --- | --- | --- | --- | --- |
| | | | 1000° C. 5 h S13A/S14A/ S9A/S11A | 1200° C. 5 h S13B/S14B/ S9B/S11B | 1200° C. 30 h S13C/S14C/ S9C/S11C | 1200° C. 5 h S13B/S14B/ S9B/S11B |
| 6.5 | Added | S13A-S13C | 138 | 69 | 50 | 0.2520 |
| | Added | S14A-S14C | 143 | 67 | 49 | 0.2688 |
| | Added | S9A-S9C | 129 | 69 | 58 | 0.2544 |
| 0 | None | S11A-S11C | 138 | 18 | 13 | 0.1266 |

Figure 58:
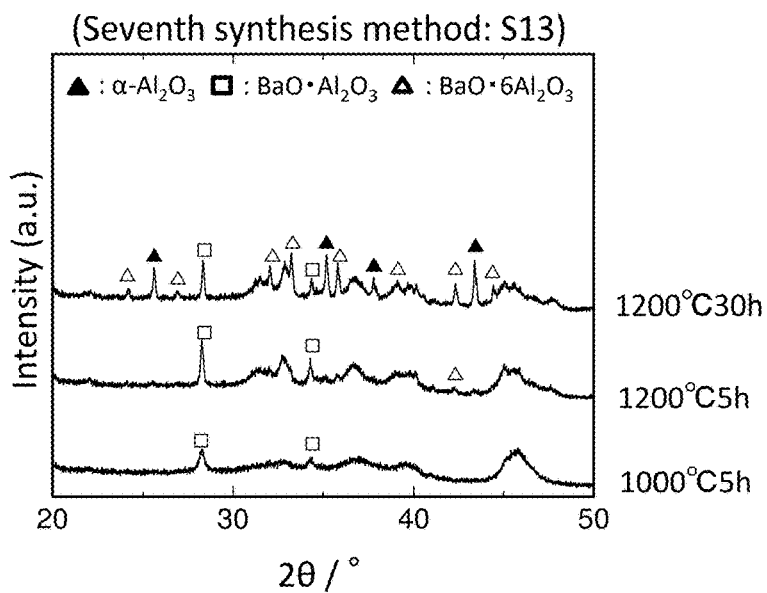
FIG. 58 is an XRD pattern diagram showing the crystal structures after the initial heat treatment, the first heat treatment, and the second heat treatment of the present powder sample S13 having $SiO_2$ concentration of 1 mass % prepared by drying and calcining Ba-added $SiO_2Al_2O_3$ containing sol solution synthesized by Example 20 of the seventh synthesis method.

Furthermore, FIG. 58 shows XRD patterns showing the crystal structure after the respective heat treatments in the present sample S13A, the present sample S13B, and the present sample S13C, each having $SiO_2$ concentration 1 mass %, and FIG. 59 shows XRD patterns showing the crystal structure after the respective heat treatments in the present sample S14A, the present sample S14B, and the present sample S14C, each having $SiO_2$ concentration 1 mass %. XRD patterns showing the crystal structure after the respective heat treatments in the present sample S11A, the present sample S11B, and the present sample S11C, each having $SiO_2$ concentration of 1 mass % prepared in Example 18 of the seventh synthesis method are shown in FIG. 56, and XRD patterns showing the crystal structure after the respective heat treatments in the present sample S9A, the present sample S9B, and the present sample S9C, each having $SiO_2$ concentration of 1 mass % prepared in the sixth synthesis method (Example 13) are shown in FIG. 46.

As shown in Table 22, the present powder sample S11 prepared in Example 18 of the seventh synthesis method, to which DMF and the barium compound are not added, had a reduced specific surface area after the first and second heat treatments at 1200° C. This is consistent with the fact that in the XRD patterns of FIG. 56, the alumina of the present powder sample S11 to which DMF and barium compound were not added was completely α-transformed after the first and second heat treatments at 1200° C. On the other hand, in the present powder sample S13 and the present powder sample S14 prepared in Example 20 and Example 21 of the seventh synthesis method, the decrease in the specific surface area after the first and second heat treatments at 1200° C. is greatly suppressed, and when compared with the present powder sample S11 to which DMF and the barium compound were not added, it can be seen that the specific surface area and total pore volume after the first and second heat treatments are increased by the addition of DMF and the barium compound. Also, this is consistent with the fact that in the XRD patterns of the present powder samples S13 and S14 shown in FIGS. 58 and 59, the α-transformations after the first and second heat treatments at 1200° C. were suppressed.

[36] Evaluation of Heat Resistance of the Seventh Synthesis Method (4)

The heat resistances of $SiO_2Al_2O_3$ powder obtained by drying and calcining $SiO_2Al_2O_3$ containing sol solution (the second sol) having $SiO_2$ concentration of 1 mass % and sol solution concentration of 10.31 mass % synthesized in Example 22 of the seventh synthesis method using aluminum nitrate as the aluminum compound (hereinafter, collectively referred to as the "present powder sample S15") was evaluated.

As the present powder sample S15, $SiO_2Al_2O_3$ containing sol solution having $SiO_2$ concentration of 1 mass % and sol solution concentration of 10.31 mass % obtained through Step #80 (#80A, #80B) to Step #82 of Example 22 was dried at 150° C. and subsequently pulverized into a powder, and the powder was calcined at 1000° C. for 5 hours (initial heat treatment) in the air, so that $SiO_2Al_2O_3$ powder (present sample S15A) was prepared. In addition, a present sample S15B obtained by adding the first heat treatment at 1200° C. for 5 hours to the present sample S15A, and a present sample S15C obtained by adding the second heat treatment at 1200° C. for 30 hours to the present sample S15A were prepared.

Table 23 below shows the measurement results of the respective specific surface areas (m²/g) of the present samples S15A to S15C obtained from $SiO_2Al_2O_3$ containing sol solution having sol solution concentration of 10.31 mass % synthesized in Example 22 of the seventh synthesis method. For comparison purposes, the measurement results of the specific surface areas of the present samples SIA to SIC obtained from $SiO_2Al_2O_3$ containing sol solution having sol solution concentration of 2.5 mass % synthesized by the first synthesis method (Example 1) are also shown in Table 23.

TABLE 23

| Sol solution concentration (mass %) | Sample | Specific surface area (m²/g) | | |
| --- | --- | --- | --- | --- |
| | | (1000° C. 5 h) S15A/S1A | (1200° C. 5 h) S15B/S1B | (1200° C. 30 h) S15C/S1C |
| 10.31 | S15A-S15C | 144 | 18 | 16 |

TABLE 23-continued

| Sol solution | | Specific surface area (m²/g) | | |
|---|---|---|---|---|
| concentration (mass %) | Sample | (1000° C. 5 h) S15A/S1A | (1200° C. 5 h) S15B/S1B | (1200° C. 30 h) S15C/S1C |
| 2.5 | S1A-S1C | 122 | 24 | 15 |

As shown in Table 23, even if the sol solution concentration is increased to 10 mass % or more in Example 22 of the seventh synthesis method, it has the same heat resistance as the case where $SiO_2Al_2O_3$ containing sol solution is synthesized by the first synthesis method. From this, it was confirmed that the seventh synthesis method is an effective means for preparing a high concentration sol.

Furthermore, as a preferred implementation, in the sol solution preparation step (Step #71) of the present forming method described in the seventh embodiment, $SiO_2Al_2O_3$ containing sol solution or Ba-added $SiO_2Al_2O_3$ containing sol solution may be prepared using the seventh synthesis method instead of any of the first to sixth synthesis methods.

Modifications of the First to Eighth Embodiments

The present synthesis method and the present forming method have been described in detail through the first to eighth embodiments using examples. However, $SiO_2$ concentration, sol solution concentration, additive amount of the specific additive, the additive amount of the barium compound, and the like used in the examples of the respective embodiments (Example 1 to Example 22) are only examples, and the present synthesis method and the present forming method can be appropriately modified to the extent that the desired effects can be achieved.

INDUSTRIAL APPLICABILITY

The present invention is suitably used for synthesizing $SiO_2Al_2O_3$ containing sol solution for forming silica-added porous alumina on various substrate surfaces, and for forming a heat-resistant porous alumina film.

The invention claimed is:

1. A method for synthesizing SiO2Al2O3 containing sol solution for forming a porous alumina to which silica is added, the method including:
    preparing an alkoxysilane solution comprising an alkoxysilane, water, an alcohol, and an inorganic acid;
    preparing an aluminum solution comprising an aluminum compound and water, the aluminum compound being selected from among aluminum nitrate, sodium aluminate, aluminum chloride, and aluminum sulfate;
    precipitating a precipitate of aluminum hydroxide in the aluminum solution;
    filtering the precipitate from the aluminum solution, and washing the filtered precipitate with water to prepare a precipitate cake;
    preparing Al2O3 containing sol solution, in which boehmite particles are dispersively present as sol particles, by preparing a slurry solution with adding water to the precipitate cake, performing a pH adjusting treatment on the slurry solution, and thereafter performing an autoclave treatment on the slurry solution; and
    preparing the SiO2Al2O3 containing sol solution, in which sol particles with silica bonded to boehmite particles are dispersively present, by adding the alkoxysilane solution to the Al2O3 containing sol solution,
    wherein the pH adjusting treatment on the slurry solution controls pH value of the slurry solution within a specific pH range so that a solution state of the Al2O3 containing sol solution after the autoclave treatment is a sol state.

2. The method according to claim 1, wherein
    in the precipitating of the precipitate, the aluminum solution is heated under reflux and then subjected to a pH adjusting treatment to precipitate the precipitate.

3. The method according to claim 1, wherein
    the specific pH range is in a range of 3.8 or more and 7.8 or less when the aluminum compound is any of the aluminum nitrate, the aluminum chloride, and the aluminum sulfate, and is in a range of 2.0 or more and 6.2 or less when the aluminum compound is the sodium aluminate.

4. The method according to claim 1, wherein
    in the preparing of the $Al_2O_3$ containing sol solution,
    a treatment temperature of the autoclave treatment is controlled to a specific treatment temperature within a range of 100° C. or higher and 200° C. or lower,
    a treatment time of the autoclave treatment is controlled within a specific time range in which a solution state after the autoclave treatment is a sol state, and
    the specific time range is within a range of 1 hour or more and 100 hours or less and varies depending on the specific treatment temperature and a content of Al2O3 in the Al2O3 containing sol solution after preparation.

5. The method according to claim 1, wherein the alkoxysilane is tetraethoxysilane (TEOS).

6. The method according to claim 1, further including preparing Ba-added SiO2Al2O3 containing sol solution by adding a barium compound to the SiO2Al2O3 containing sol solution prepared in the preparing of the SiO2Al2O3 containing sol solution.

7. The method according to claim 6, further including adding an organic solvent having a boiling point higher than that of water and a surface tension lower than that of water to the Ba-added SiO2Al2O3 containing sol solution prepared in the preparing of the Ba-added SiO2Al2O3 containing sol solution.

8. The method according to claim 1, further including adding an organic solvent having a boiling point higher than that of water and a surface tension lower than that of water to the SiO2Al2O3 containing sol solution prepared in the preparing of the SiO2Al2O3 containing sol solution.

9. The method according to claim 6, wherein the barium compound is at least one selected from among barium nitrate, barium hydroxide, barium chloride, and barium acetate.

10. The method according to claim 8, wherein the organic solvent is ethylene glycol or N,N-dimethylformamide.

11. The method according to claim 1, further including preparing Ba-added SiO2Al2O3 containing sol solution by adding an organic solvent having a boiling point higher than that of water and a surface tension lower than that of water and a barium compound to the SiO2Al2O3 containing sol solution prepared in the preparing of the SiO2Al2O3 containing sol solution.

12. The method according to claim 11,
    wherein the barium compound is at least one selected from among barium nitrate, barium hydroxide, barium chloride, and barium acetate, and
    wherein the organic solvent is ethylene glycol or N,N-dimethylformamide.

13. A method for forming a porous alumina film, the method including:

preparing SiO2Al2O3 containing sol solution which is a sol solution synthesized by using the method for synthesizing a sol solution according to claim 1;
applying the sol solution to a substrate surface;
drying a coating film of the sol solution; and
calcining the dried coating film of the sol solution.

\* \* \* \* \*